(12) United States Patent
Varon-Weinryb

(10) Patent No.: US 7,707,525 B2
(45) Date of Patent: Apr. 27, 2010

(54) RELIABILITY SIMULATION METHOD FOR A PCB ASSEMBLY

(75) Inventor: Abraham Varon-Weinryb, Ramat Gan (IL)

(73) Assignee: Expert Dynamics Ltd., Rama Gan (IL)

( * ) Notice: Subject to any disclaimer, the term of this patent is extended or adjusted under 35 U.S.C. 154(b) by 194 days.

(21) Appl. No.: 11/666,498

(22) PCT Filed: Mar. 7, 2007

(86) PCT No.: PCT/IL2007/000295

§ 371 (c)(1),
(2), (4) Date: Apr. 27, 2007

(87) PCT Pub. No.: WO2007/102155

PCT Pub. Date: Sep. 13, 2007

(65) Prior Publication Data

US 2008/0275672 A1    Nov. 6, 2008

(30) Foreign Application Priority Data

Mar. 8, 2006   (IL) .................................... 174186

(51) Int. Cl.
*G06F 17/50*   (2006.01)
(52) U.S. Cl. .................... 716/4; 716/1; 716/15
(58) Field of Classification Search .......... 716/1, 716/4, 15
See application file for complete search history.

(56) References Cited

U.S. PATENT DOCUMENTS 5,744,975 A * 4/1998 Notohardjono et al. ..... 324/760
5,958,556 A * 9/1999 McCutcheon ............... 428/172
7,260,509 B1 * 8/2007 Brand et al. .................. 703/2
2005/0072234 A1 * 4/2005 Zhu et al. ..................... 73/579

OTHER PUBLICATIONS

Jing-En Luan et al.: "Effect of Impact Pulse Parameters on Consistency of Board Level Drop Test and Dynamic Responses" Electronic Components and Technology, 2005. ECTC '05. Proceedings Lake Buena Vista, FL, USA May 31-Jun. 3, 2005, Piscataway, NJ, USA IEEE, May 31, 2005, pp. 665-673.
Trembinski T et al: Performing the AVIP Durability Analysis Using the Finte Element Method: Proceedings of the National Aerospace and Electronics Conference. (NAECON). Dayton, May 24-28, 1993, New York, IEEE, US, vol. vol. 2, May 24, 1993, pp. 738-750.

(Continued)

*Primary Examiner*—Thuan Do
*Assistant Examiner*—Magid Y Dimyan
(74) *Attorney, Agent, or Firm*—Venable LLP; Robert Kinberg; Todd R. Farnsworth

(57) ABSTRACT

The present invention relates to a method for finding design weakness and potential field failure of a PCB assembly which includes components, comprising the steps of: (a) creating a model of the PCB assembly by which natural frequencies and mode shapes of the PCB assembly can be determined; (b) performing a natural frequencies simulation for determining natural frequencies and mode shapes of the PCB assembly; and (c) analyzing said determined natural frequencies and mode shapes and identifying local dominant oscillations of components, components identified as having a local dominant oscillation in at least one of said determined mode shapes are identified as components having a relatively high potential of field failure.

58 Claims, 52 Drawing Sheets

OTHER PUBLICATIONS

Wang Frank Fan: "Modified highly accelerated life test for aerospace electronics" Therm. Phenom Electron Syst Proc Intersoc Conf; Thermomechanical Phenomena in Electronic Systems -Proceedings of the Intersociety Conference 2002, 2002, pp. 940-945.

Lall P et al: "Failures-Envelope Approach to Modeling Shock and Vibration Survivability of Electronic and MEMS Packaging" Electronic Components and Technology, 2005. ECTC '05 Proceedings Lake Buena Vista, FL, USA May 31-Jun. 3, 2005, Piscataway NJ, USA, IEEE, May 31, 2005, pp. 480-490.

Tong Yan Tee et al: "Advanced experimental and simulation techniques for analysis of dynamic responses during drop impact" Electronic Components and Technology, 2004. ECTC '04. Proceedings Las Vegas, NV, USA Jun. 1-4, 2004 Piscataway, NJ, USA, IEEE, vol. 1, Jun. 1, 2004, pp. 1088-1094.

International Search Report dated Oct. 30, 2007, issued in International Appl. No. PCT/IL2007/000295 together with a Written Opinion of the International Searching Authority.

* cited by examiner

Fig. 1 PRIOR ART (HYPOTHETICAL)

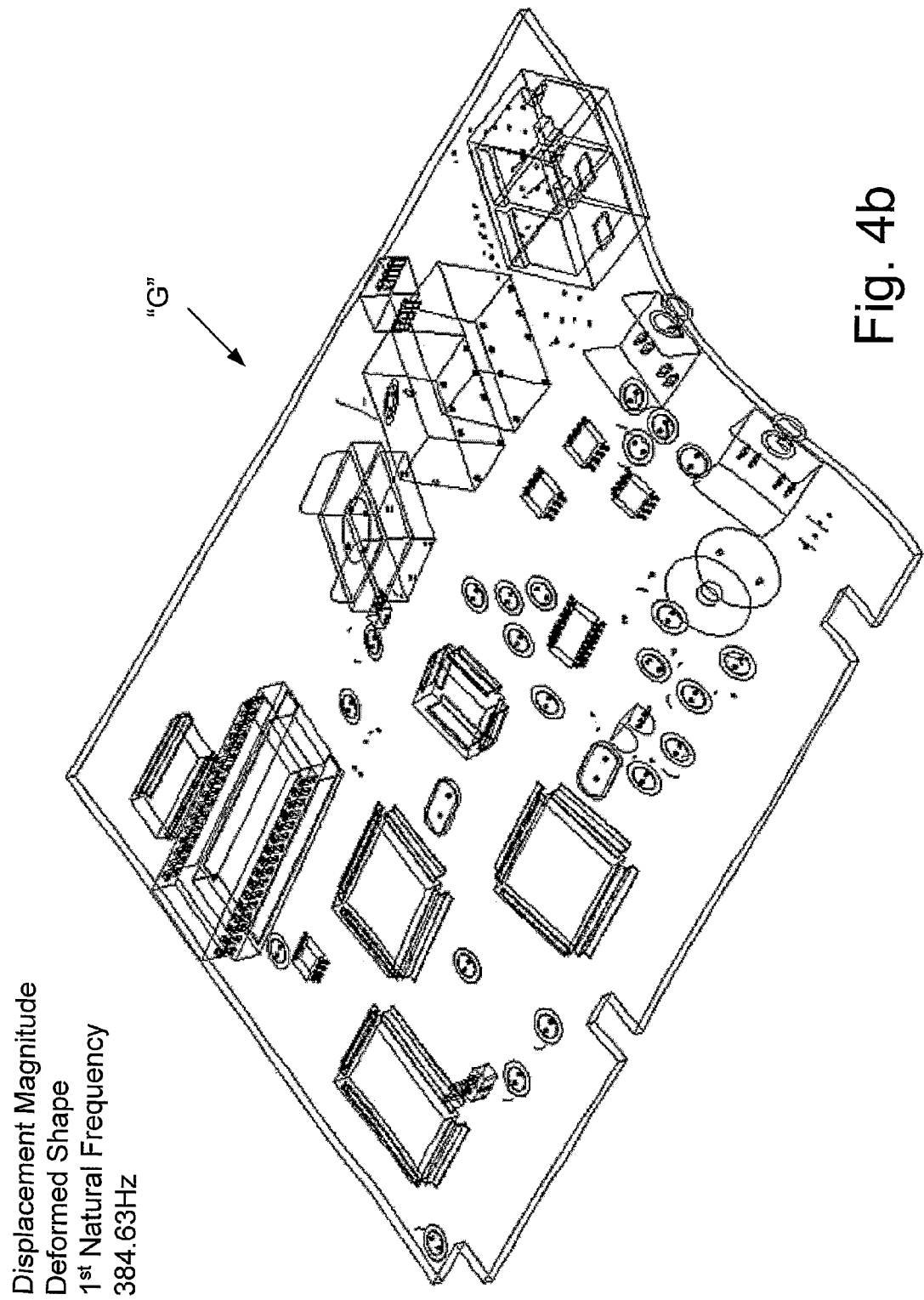

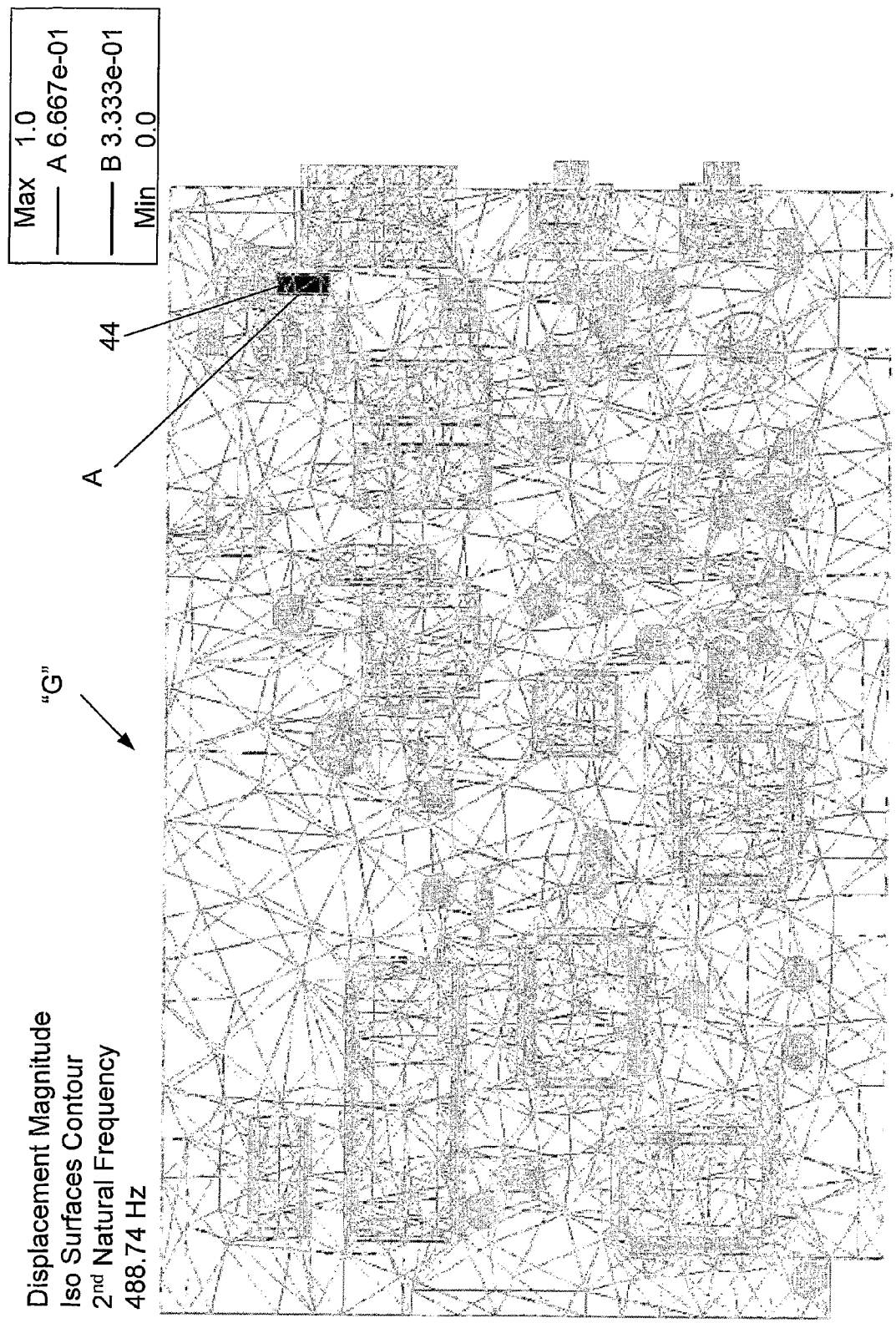

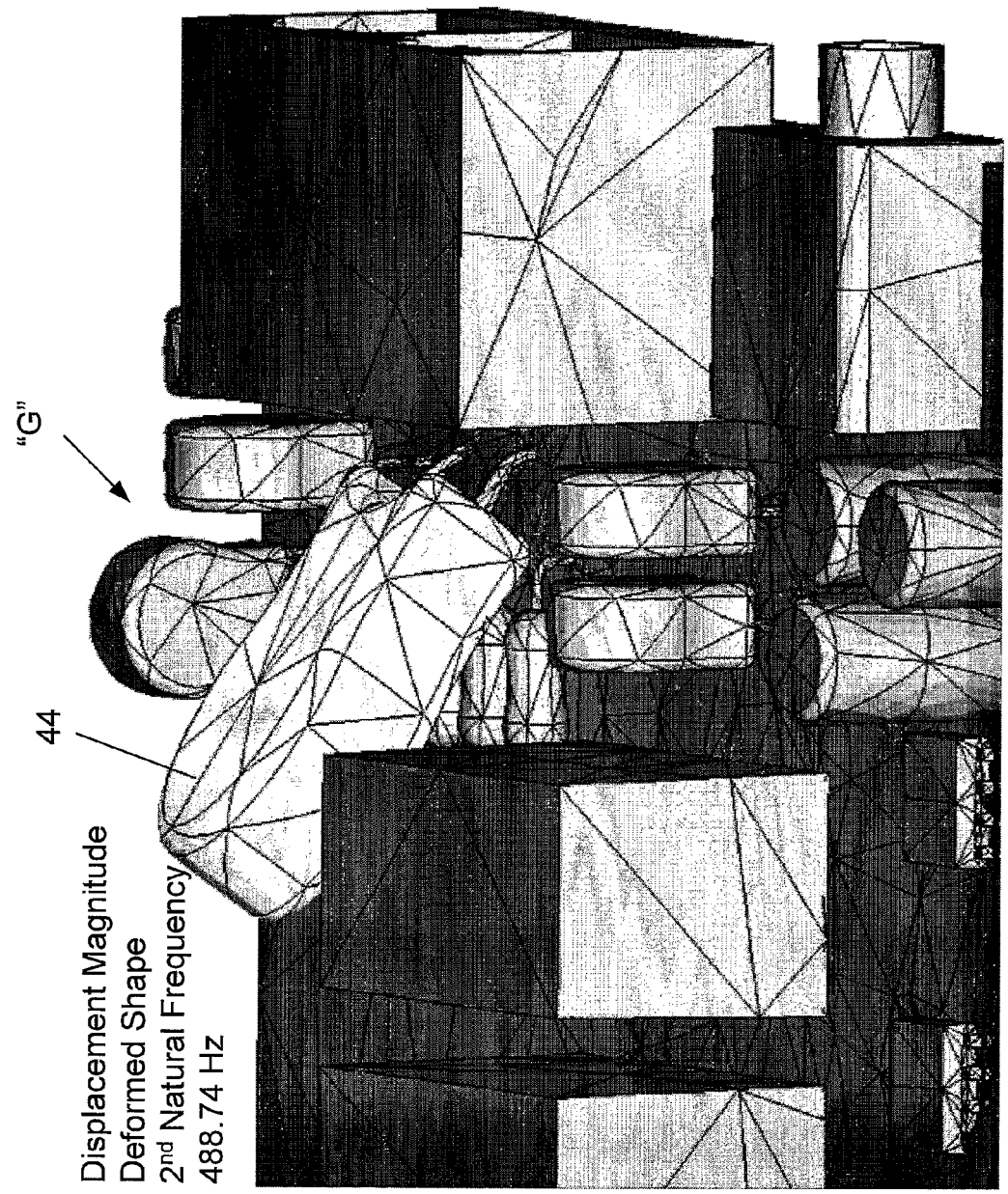

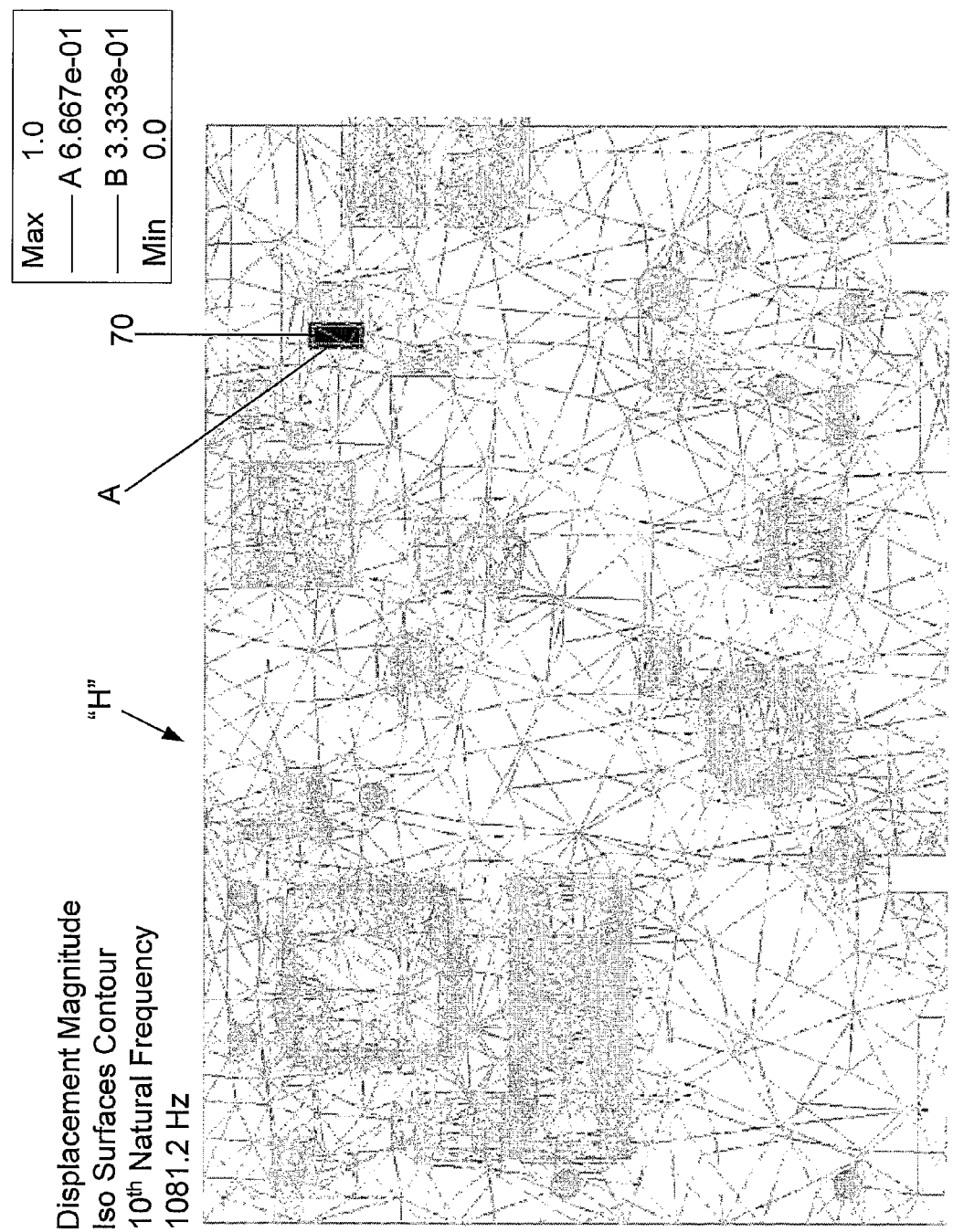

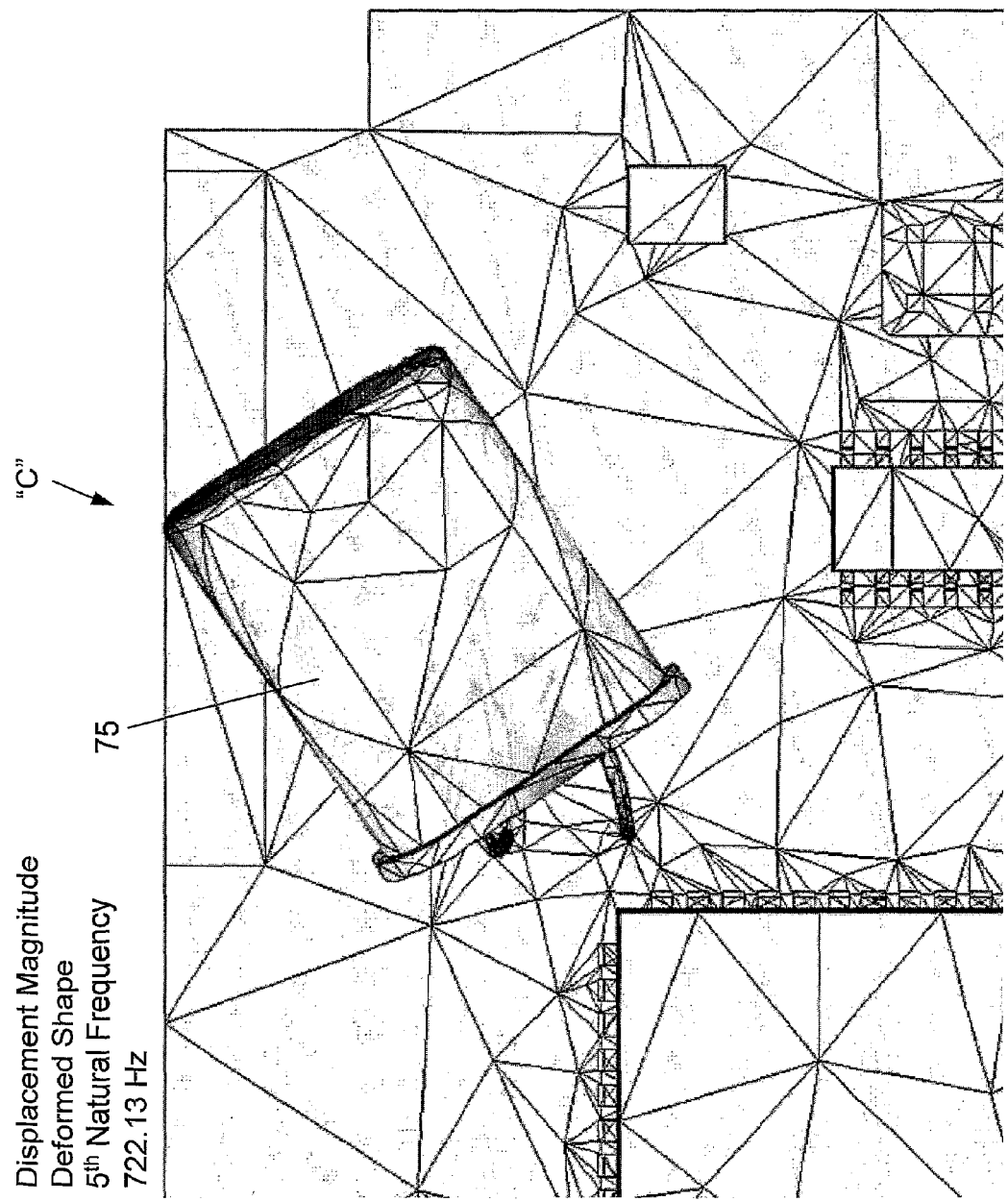

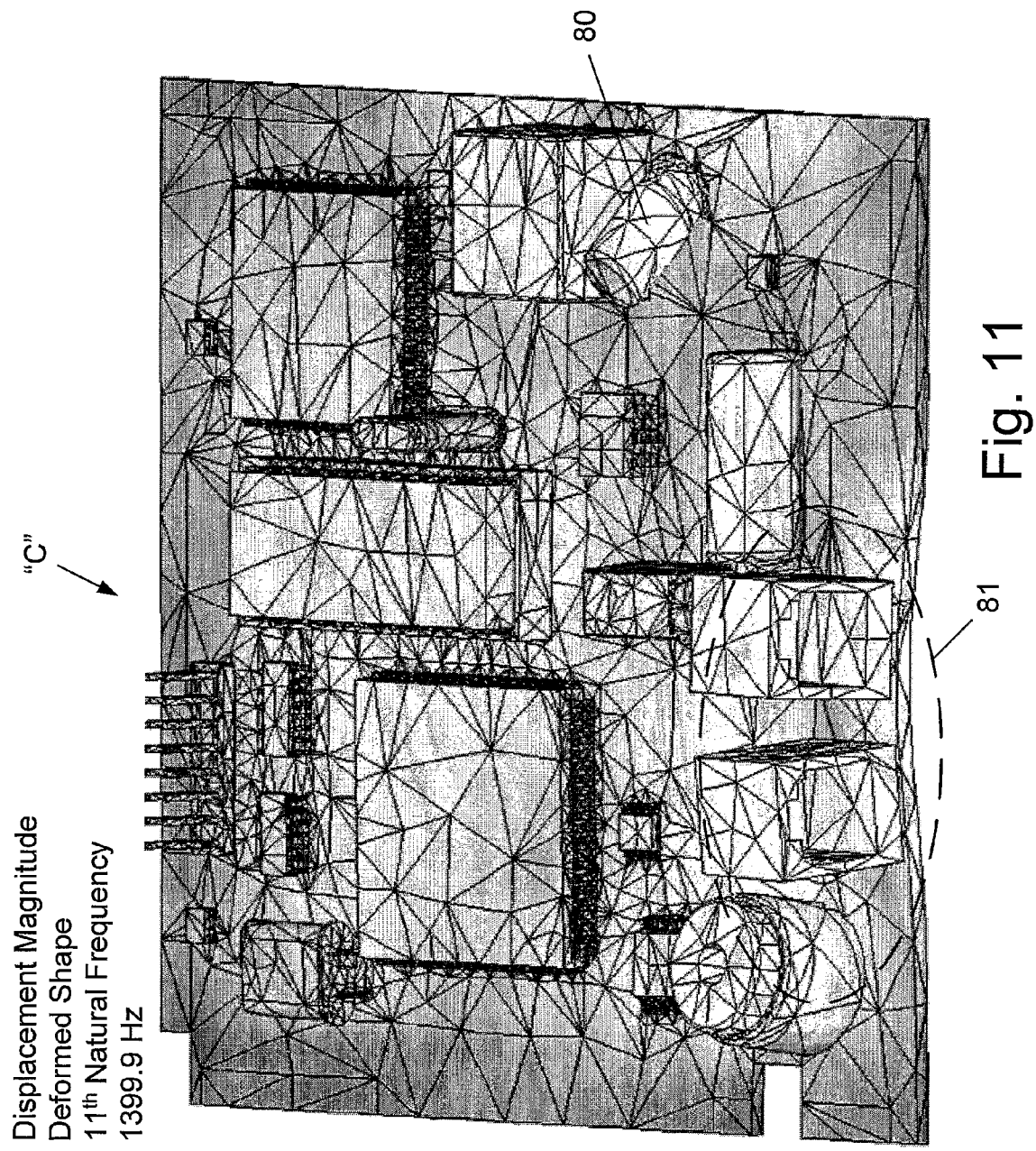

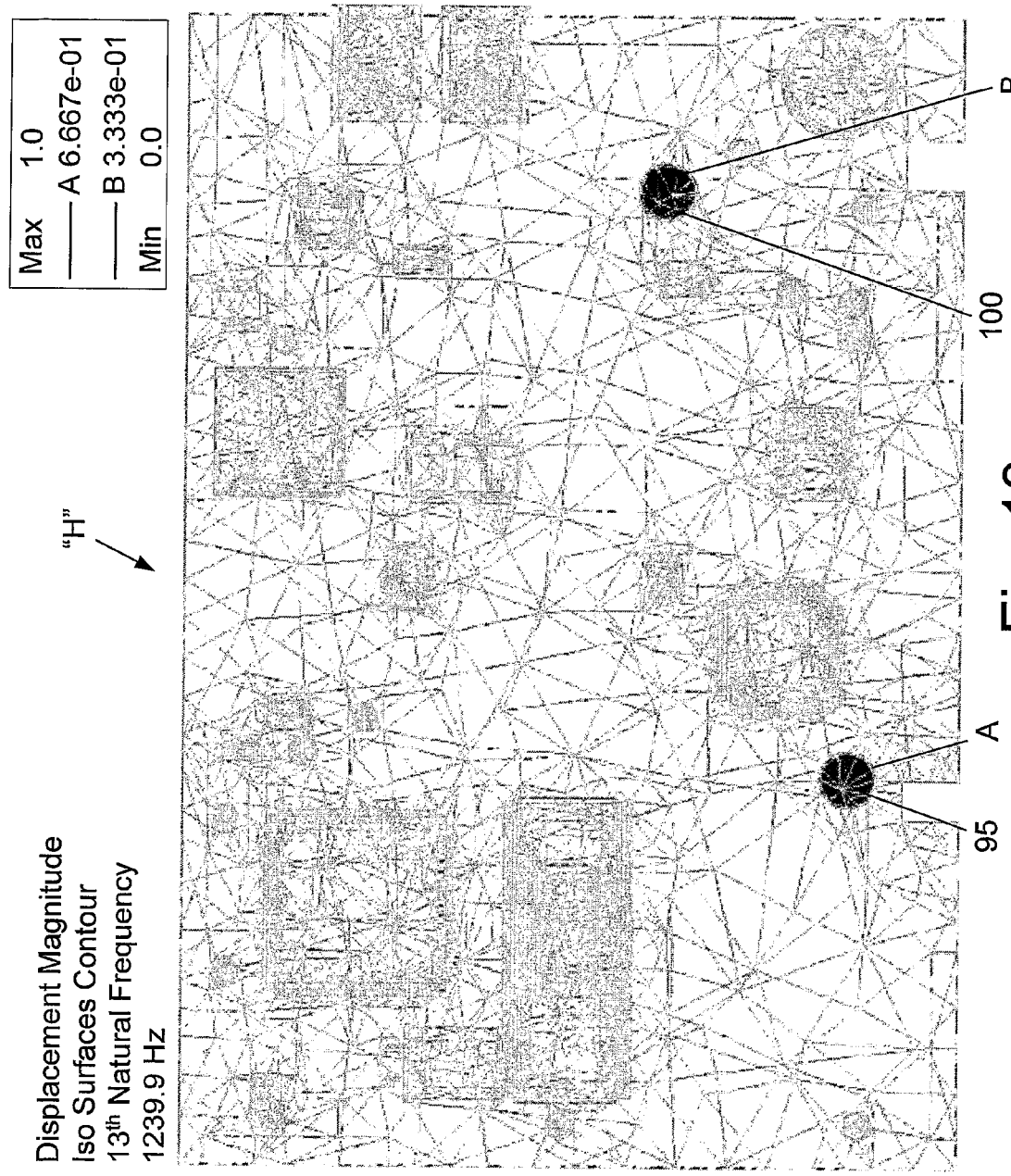

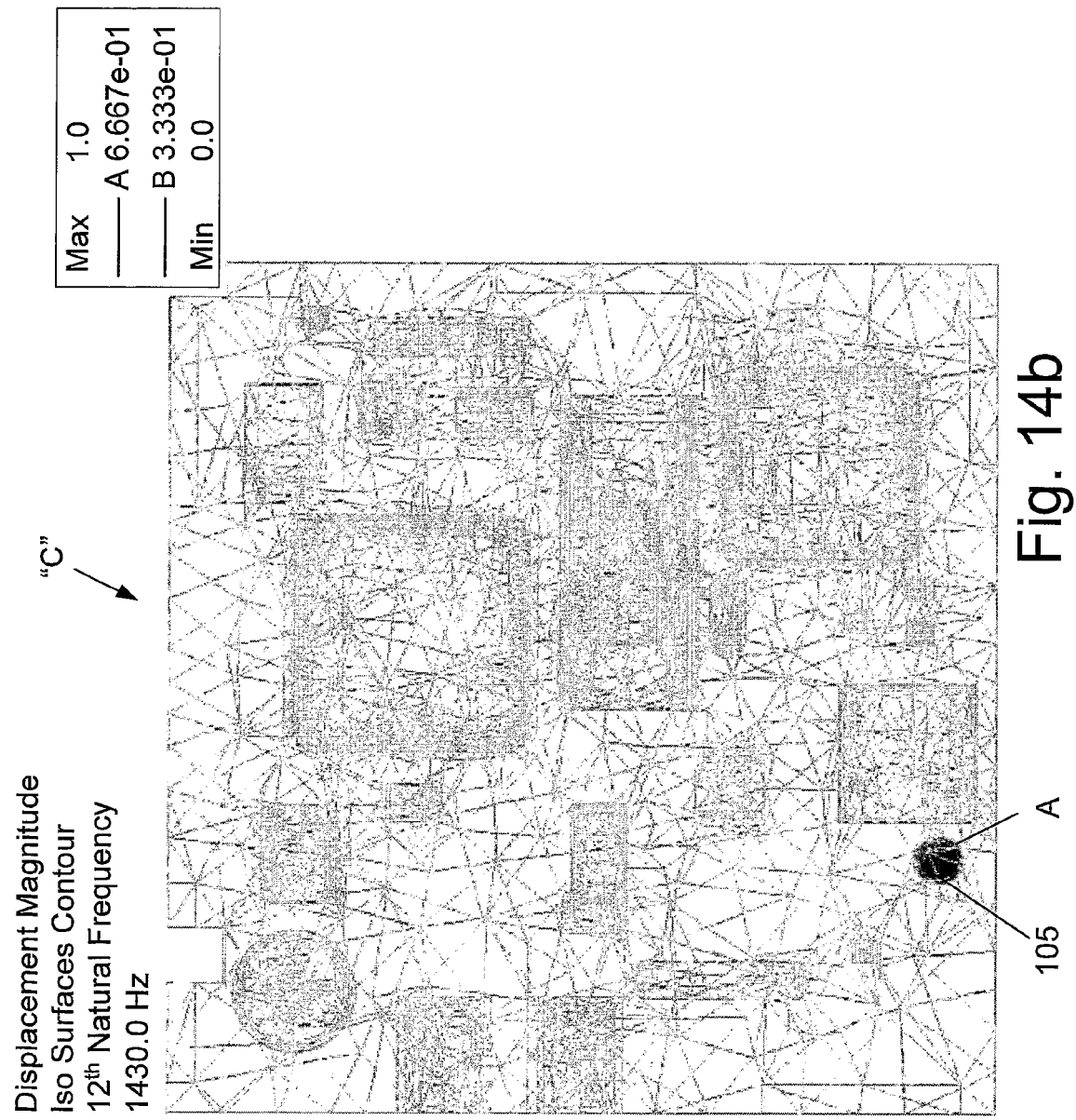

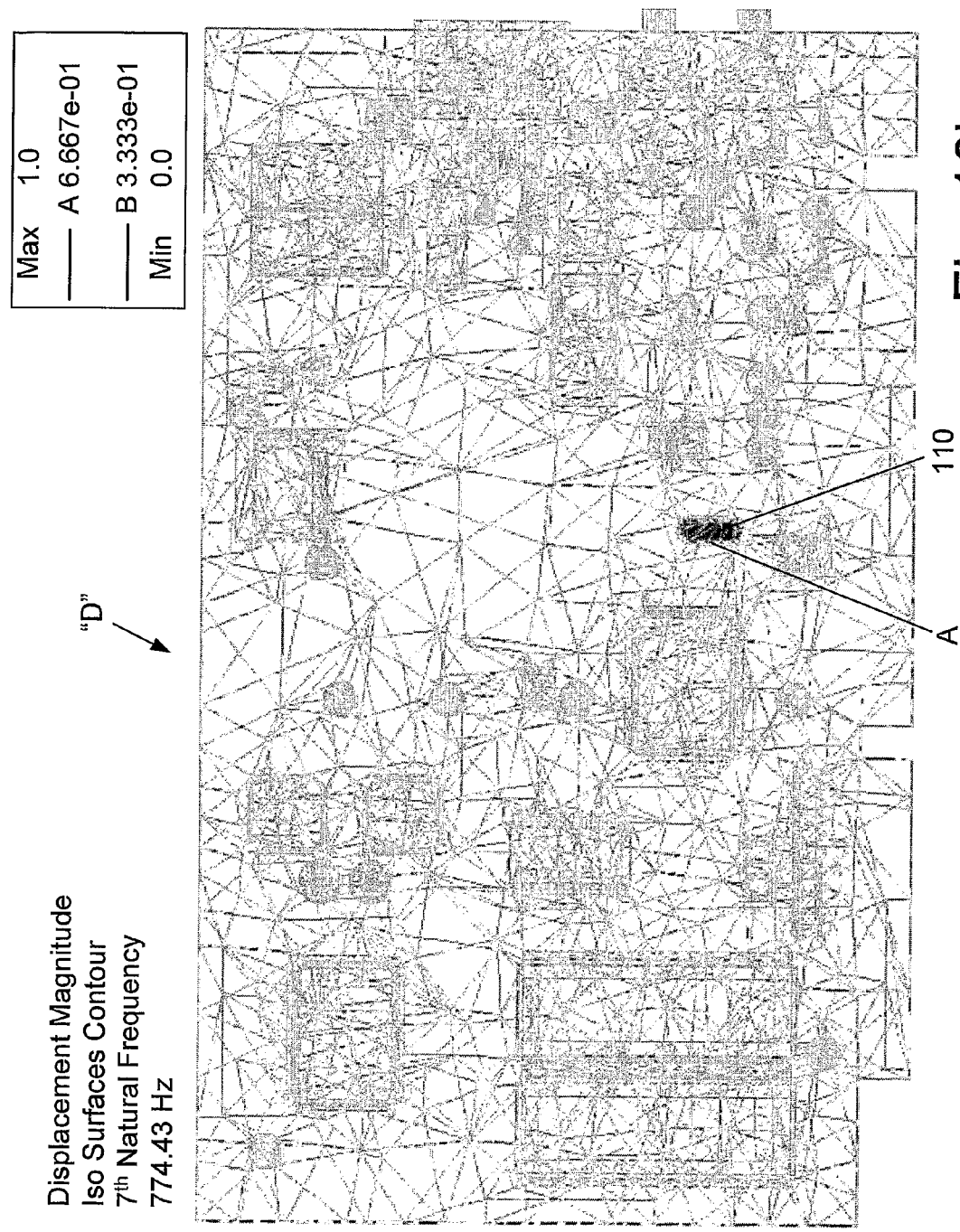

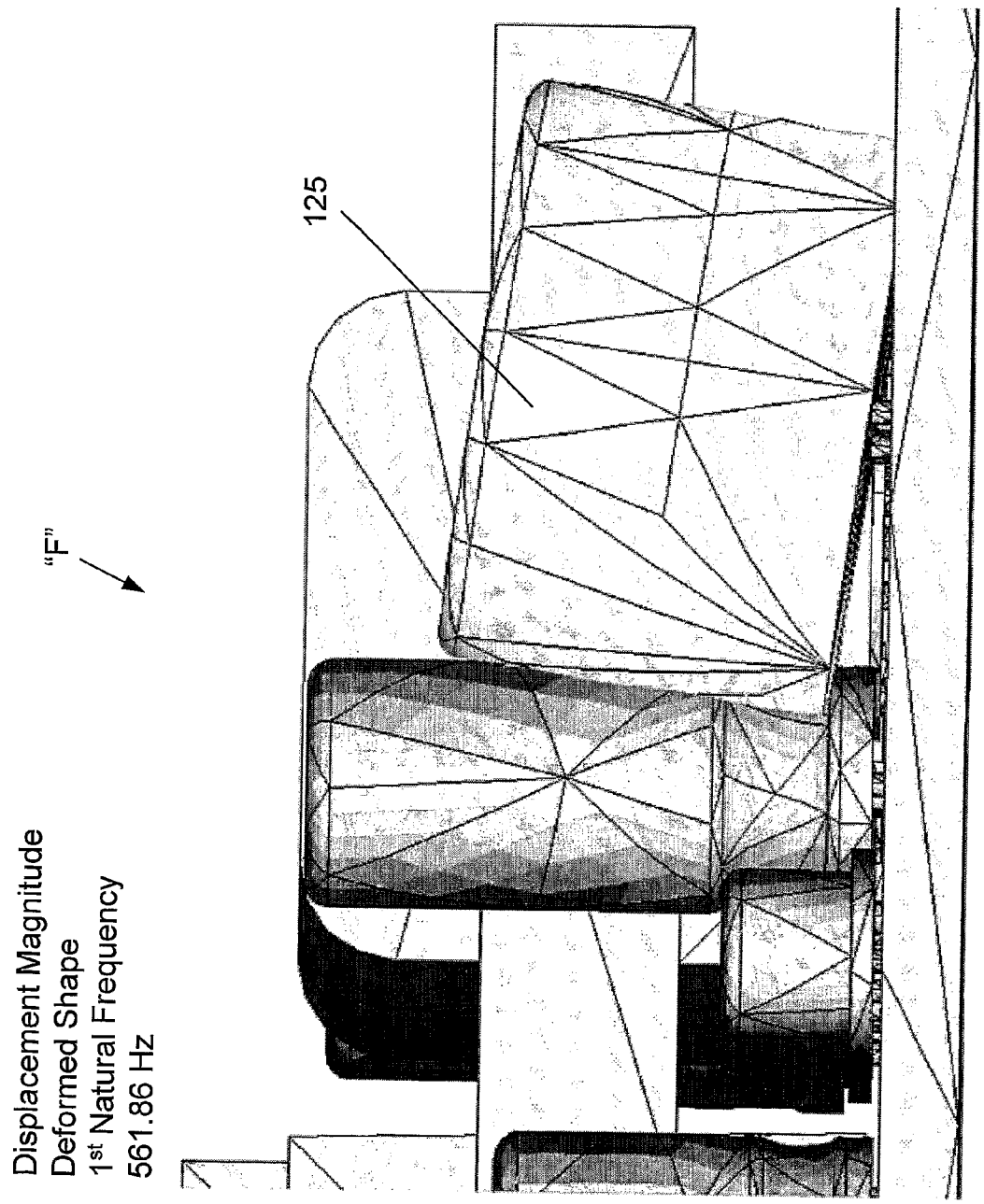

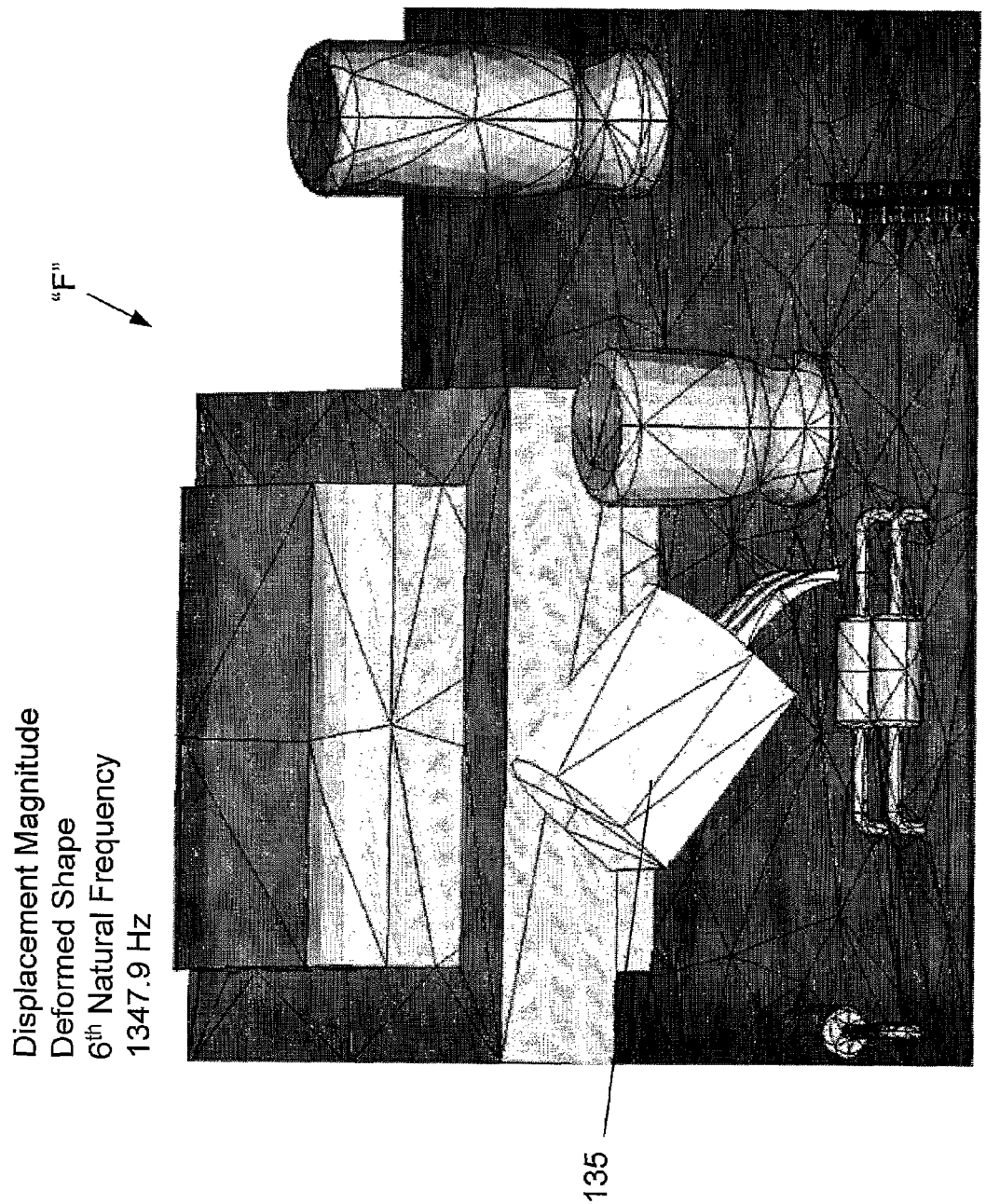

Fig. 30

| No. of failures in each frequency range (of natural frequencies) [Hz] | | | | Last natural frequency required for identifying all failures [Hz] | Last natural frequency index required for identifying all failures | Number of components failed in the test but not in the simulation | Number of components failed in the simulation out of those failed in the laboratory HALT test | PCB index |
|---|---|---|---|---|---|---|---|---|
| 1.5K to 2.0K | 1K to 1.5K | 500 to 1K | 0 to 500 | | | | | |
| 1 | 1 | 2 | 1 | 164.1 | 13 | 0 | 5 out of 5 | 1 |
| 0 | 0 | 6 | 1 | 814.85 | 13 | 2 | 7 out of 9 | 2 |
| 0 | 4 | 1 | 2 | 1203.30 | 12 | 1 | 7 out of 8 | 3 |
| 0 | 0 | 2 | 0 | 870.00 | 11 | 0 | 2 out of 2 | 4 |
| 3 | 0 | 1 | 0 | 1725.65 | 17 | 0 | 4 out of 4 | 5 |
| 0 | 0 | 0 | 1 | 185.08 | 4 | 0 | 1 out of 1 | 6 |
| 0 | 0 | 3 | 3 | 575.31 | 12 | 0 | 6 out of 6 | 7 |
| 0 | 5 | 1 | 0 | 1324.7 | 14 | 0 | 6 out of 6 | 8 |
| 0 | 0 | 5 | 3 | 787.10 | 11 | 1 | 8 out of 9 | 9 |
| 0 | 2 | 2 | 0 | 1376.87 | 7 | 0 | 4 out of 4 | 10 |
| 4 | 12 | 23 | 11 | | | 4 | 50 out of 54 | |

RELIABILITY SIMULATION METHOD FOR A PCB ASSEMBLY

FIELD OF THE INVENTION

The field of the invention relates to a method and system for carrying out reliability tests for Printed Circuit Boards (PCB) assemblies and related equipment. More particularly, the invention relates to a method and system for performing a simulated HALT test or other reliability or verification test in an efficient, simple, and reliable manner, which can be easily performed as early as during an initial equipment development stage, or at any later stage, and which does not require the physical availability of the tested equipment, or components thereof. In one preferred case, a simulation for a HALT test of a PCB with all the components assembled on it is demonstrated, and the results which show very high correlation to the results of a real HALT test are given.

BACKGROUND OF THE INVENTION

The issue of reliability and durability, in terms of failure rate and life span is one of the most important factors involved in the development of electronic equipment. There is a continuously growing need in the electronic industry for efficient tools for optimizing hardware design, in terms of reliability and durability.

Almost any mechanical or electronic equipment is subjected to varying environmental conditions, such as random vibrations, shakes, dynamic shocks, temperature variations, etc. Such varied conditions may lead to functional failures of the equipment. The designer, manufacturer, supplier and customer strive to avoid such failures for obvious reasons. For the purpose of determining the durability and reliability of equipment, and in order to forecast and eliminate future failures, various tests of the equipment (also referred herein as "product") are conventionally performed during the design and manufacturing cycles. These tests may apply a variety of dynamic and thermal loads on the tested equipment, such as random vibrations, dynamic shocks, etc., in order to identify vulnerable components that may fail.

One important and most accepted reliability test is known in the art as the Highly Accelerated Life Testing (HALT). The HALT test simulates and stimulates complex aspects of fatigue by means of applying random stresses in the form of random vibrations and varying temperature conditions. The stresses which are applied on the equipment during a HALT test typically exceed the most extreme expected field conditions, and are intended to reveal design vulnerabilities within a short period of time and before shipment of the product to the customer. While the traditional pass/fail testing approach does not always provide an adequate reliability safety margin, HALT provides a different approach: its philosophy is to enforce failure, not to pass a test.

The use of a HALT test effectively increases the operation margin of the product, creating a wider gap between the specified limits and the actual operational limits. The HALT test is performed in a chamber which applies vibration and thermal loads. Vibrations are the basis of most HALT procedures. The vibration approach which is used by HALT is special. Unlike traditional vibration testing techniques which use a single axis acceleration or excitation at a given time, the HALT exposes the product, which is mounted on a chamber table, to random vibrations in six degrees of freedom simultaneously, i.e., three translational directions and three rotational directions all at the same time. In addition to vibrations, some of the HALT test stages may apply other loading procedures such as hot-cold thermal transitions. As said, the purpose of HALT is to explore potential design weaknesses before introducing the product into real life operation. By simulating and accelerating the product aging, the HALT test reveals the product true reliability, and identifies time-related defects or design problems that may otherwise lie dormant for months or years. When the HALT test reveals faults in the tested product, design modifications are required and generally performed, followed by repetition of the HALT test, this time with the modified product. Such repeated tests and design modifications may occur several times, until satisfactory results are obtained.

Many types of laboratory tests are simulated using computer software. The performance of a computer simulation saves significant time and costs in comparison with a physical laboratory test, which requires expensive testing equipment, staff, and a significant amount of time for pre-test set-up, and for the test itself. In addition, obviously, a laboratory test requires a physical prototype, while a computer simulation is preferably carried out early in the design cycle, during the initial design process, and before a prototype is available. There are several typical procedures for performing such computer simulations. One of the most common procedures is the finite element technique, which can analyze the tested equipment behavior under various dynamic regimes of vibrations and thermal loads. The finite elements analysis technique can handle several dynamic regimes, including: (a) shocks in which the force or acceleration vary with time; (b) dynamic frequency or harmonic response where the model is analyzed in the frequency domain; and (c) dynamic random response where the model is subjected to a single-axis random vibration which is defined in terms of PSD. The term PSD stands for Power Spectral Density, or more particularly, to the power of random vibration intensity in mean-square acceleration per frequency unit ($g^2$/Hz).

As said, the HALT laboratory test has been accepted in the art as one of the most reliable test for forecasting future failures. However, a simulation for a HALT test has not been provided yet. As noted, the HALT test applies simultaneous vibrations in six degrees of freedom, while all prior art finite elements solutions, including PSD finite element analysis, operate on a single axis dynamic regime at each given time. The art has not yet provided a simulation for a HALT test, or for other simultaneous-multi-axes loading tests for the purpose of forecasting failures in electronic or mechanical equipment.

It is therefore an object of the present invention to provide a simulation for reliability, robustness, or fatigue test, which can be performed without any need for physical testing facilities and without a need to have the physical tested object (i.e., the tested product itself).

It is another object of the present invention to provide a simulation for a HALT test, which can be performed without any need for physical testing facilities and without a need to have the physical tested object.

It is another object of the present invention to provide a simulation for a simultaneous multi axes loading test, which can be performed without any need for physical testing facilities and without a need to have the physical tested object.

It is another object of the present invention to provide a simulation for a reliability test designed to explore operational margins of a tested product, or to reveal the weakest components of the tested product, which can be performed without any need for physical testing facilities and without a need to have the physical tested object.

It is still an object of the present invention to provide such a simulation which can be performed as early as during an initial development stage of the product, for example, during the layout or initial design stages, or when a physical prototype of the tested product is not yet available.

It is another object of the present invention to save time and costs, by enabling the elimination of future failures at the early stages of the product development, and by eliminating or reducing the need of physical laboratory tests including HALT or any other laboratory test.

It is a particular object of the present invention to enable using the simulation for analyzing the reliability and robustness of the design of electronic boards and related equipment in the PCB industry.

Other objects and advantages of the present invention will become apparent as the description proceeds.

SUMMARY OF THE INVENTION

The present invention relates to a method for finding design weakness and potential field failure of a PCB assembly which includes components, comprising the steps of: (a) creating a model of the PCB assembly by which natural frequencies and mode shapes of the PCB assembly can be determined; (b) performing a natural frequencies simulation for determining natural frequencies and mode shapes of the PCB assembly; and (c) analyzing said determined natural frequencies and mode shapes and identifying local dominant oscillations of components, components identified as having a local dominant oscillation in at least one of said determined mode shapes are identified as components having a relatively high potential of field failure.

Preferably, the method further comprises a step of predefining Mode Shape Types and assigning a Threat Weight to each Mode Shape Type, wherein said step of analyzing comprises a step of matching between the determined mode shapes and said predefined Mode Shape Types, thereby to determine the corresponding Threat Weight for each component identified as having a local dominant oscillation in at least one of said determined mode shapes.

Preferably, two or more Mode Shape Types relating to a local dominant oscillation appearing in a same component in more than one natural frequency indicate a higher Threat Weight in comparison to a case when a single Mode Shape Type relating to a local dominant oscillation appears in a same component in only one natural frequency.

Preferably, a Mode Shape Type relating to a dominant pure local oscillation of a component indicates a higher Threat Weight to said component, in comparison to a Mode Shape Type of a dominant local oscillation of same component which is not pure.

Preferably, the method further comprises one or more of the following limitations: (a) limiting the frequency range of natural frequencies within the simulation; (b) limiting the natural frequency simulation to a range of a predetermined number of first natural frequencies; and (c) limiting the method results to the finding of the first predetermined number of components having a relatively high potential of field failure.

In one important embodiment of the invention, the method is used for forecasting the results of a HALT laboratory test. In such a case, the method may be calibrated to resemble a specific HALT machine of a specific manufacturer, for better compatibility with a HALT test performed by said machine. Preferably, said machine has specific PSD loading regime curves, and said calibration is obtained by considering a higher threat to components having a dominant local oscillation which happens to be within a frequency spectrum in which said machine provides a relatively high PSD level of $g^2/Hz$ compared to other frequencies within the relevant frequencies range, and vise versa, by considering a lower threat to components having a dominant local oscillation which happens to be within a frequency spectrum in which said machine provides a relatively low PSD level of $g^2/Hz$ compared to other frequencies within said relevant frequencies range.

In a more general embodiment of the invention, the method is used for forecasting the results of a laboratory test for finding design weakness, and for finding potential field failure of a PCB assembly.

Preferably, the method is used for performance at an early stage of a PCB assembly design, a stage which is earlier than the stage in which a prototype of the PCB assembly is available.

In one aspect of the invention, the method may be used as a complementary process to a HALT laboratory test.

Preferably, the created model is a finite element model.

Preferably, the created model includes modeling of the PCB components leads. Preferably, the created model also includes modeling of the soldering joints. Preferably, the model also includes modeling of coatings.

In an embodiment of the invention, the model is a "p element" mesh. Preferably, the entire mesh is a volume "p element" mesh. In another embodiment, the model is a finite element "h" model.

Optionally, thermal aspects are considered.

In one embodiment, a stiffness matrix of said finite element model is updated based on a pre thermal-stress analysis.

Optionally, material properties applied to the model are updated based on temperature-related assumptions prior to the step of performing a natural frequencies simulation.

Optionally, the temperature assumptions are based on a thermal mapping obtained from a steady state or transient thermal simulation. In still another embodiment of the invention, the model is a finite differences model.

In still another embodiment of the invention, the model is a finite volume model.

In still another embodiment of the invention, the model is a boundary element model.

Preferably, the modeling of some components is detailed and the modeling of other components is approximated.

Preferably, the mode shapes that are analyzed each presents displacement vectors. In one embodiment, said displacement vectors are spatial displacement vectors. In another embodiment, the mode shapes to be analyzed each presents displacement vectors in only one degree of freedom out of available-up to six possible degrees of freedom.

In another specific embodiment of the invention, the mode shapes to be analyzed each defines displacement vectors in only one plane.

In still another embodiment, the mode shapes to be analyzed each presents stress vectors.

In still another embodiment of the invention, the mode shapes to be analyzed each presents strain vectors.

In still another embodiment of the invention, the mode shapes to be analyzed each presents strain energy vectors.

In still another embodiment of the invention, the mode shapes to be analyzed each presents any eigenvectors available from a natural frequency simulation.

In still another embodiment of the invention, the mode shapes to be analyzed each presents a vector which is calculated as any mathematical combination of two or more eigenvectors available from a natural frequency simulation.

Preferably, a relatively high potential of field failure of a component is defined by examining two or more of said vectors.

Preferably, the Threat Weight is defined by examining two or more of said vectors.

In an embodiment of the invention, the creation of the model ignores some of the components. Preferably, the ignored components are those known as having one or more of the following: (a) extremely high reliability; (b) a very small size; (c) a very light weight; (d) a center of gravity which is very close to the board surface.

In an embodiment of the invention, the creation of the model approximates some of the components. Preferably, the ignored components are those known as having one or more of the following: (a) extremely high reliability; (b) a very small size; (c) a very light weight; (d) a center of gravity which is very close to the board surface.

Preferably, said components are represented by only considering their contribution to the mass of the model.

In an embodiment of the invention, said components are represented by considering their contribution to both the mass of the model and the stiffness of the model. Optionally, said approximated components are represented by altering properties of the modeling of the board itself. Optionally, the board of the PCB assembly is modeled using a multi-layer laminate composite plate element.

Optionally, the board of the PCB assembly is modeled using layers of volume elements.

Optionally, the board of the PCB assembly is modeled as a single isotropic layer.

In an embodiment of the invention, said model includes the PCB assembly together with its enclosure.

In an embodiment of the invention, the model includes more than one PCB assembly, together with the PCB assemblies casing.

Optionally, the model includes an entire assembly of electronic boards together with one or more additional parts.

Optionally, some of the components are modeled with their leads and some other components are approximated. Optionally, said approximation is achieved by modeling said components without modeling their leads.

Preferably, said approximated components are components that based on past experience are known as having a low potential of field failure.

BRIEF DESCRIPTION OF THE DRAWINGS

In the drawings:

FIGS. 4a and 4b illustrate the pre-defined Type 1 Mode Shape in displacement magnitude iso-surfaces and displacement magnitude deformed shape views respectively;

FIGS. 6a and 6b are displacement magnitude iso-surfaces and displacement magnitude deformed shape views respectively, illustrating Mode Shape Type 3.

FIG. 6c is an enlarged view of the displacement magnitude deformed shape illustrating the Mode Shape Type 3;

FIGS. 8a and 8b are displacement magnitude iso-surfaces views illustrating the pre-defined Mode Shape Type 4;

FIG. 10c is an enlarged view of the displacement magnitude deformed shape illustrated in FIG. 10b;

FIG. 11 is a displacement magnitude deformed shape view illustrating Mode Shape Type 6;

FIG. 13 is a displacement magnitude iso-surfaces illustrating Mode Shape Type 8;

FIGS. 14a and 14b are displacement magnitude deformed shape and displacement magnitude iso-surfaces views respectively illustrating Mode Shape Type 9;

FIGS. 16a and 16b are displacement magnitude iso-surfaces views illustrating Mode Shape Type 10;

FIGS. 23b and 23c are displacement magnitude deformed shape views relating to the mode shape of the first natural frequency of PCB "F";

FIGS. 28a, 28b and 28c are mode shape views relating to the sixth natural frequency of PCB "F";

FIG. 30 is a table summarizing the results of example 2; and

DETAILED DESCRIPTION OF PREFERRED EMBODIMENTS

As said, there is no finite elements solver or equivalent solver for HALT yet, although there are solvers in the art which can simulate random vibrations (PSD) in one axis, and which can simulate frequency response, and dynamic transient loads, all in one axis. However, there are no simulation solutions for HALT or any other similar dynamic regime that involves vibration loads which are applied simultaneously in more than one direction, up to six degrees of freedom.

Figure 1:
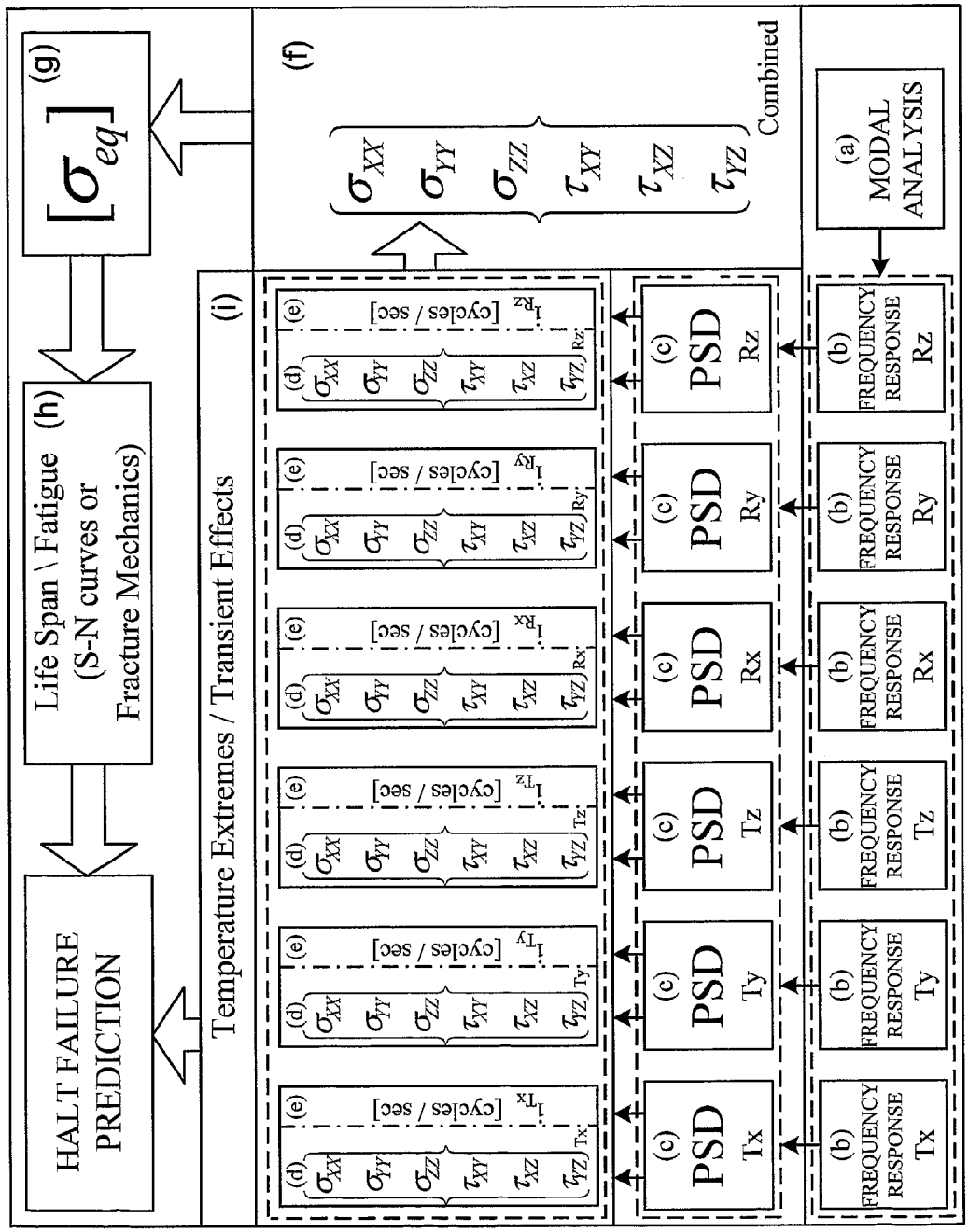
FIG. 1 illustrates the steps involved in a hypothetical simulation of a HALT test.

The difficulty in handling a HALT simulation is obvious. The HALT test involves the providing of a very complicated regime of loads on the product, which includes random vibrations in six degrees of freedom simultaneously. Let us assume that an accurate finite elements model has been prepared which included a mesh of nodes and elements with all required physical and material properties, as well as boundary conditions. As shown in FIG. 1, a hypothetical simulation of a HALT test, if such at all be tried to be performed, should involve performance of the following steps on the finite elements model:

a. Modal analysis: This step forms the basis for any dynamic simulation, and should find the natural frequencies of the product [in Hz];

b. Frequency response: This step involves a frequency response analysis of the model to a unit sine load. This analysis should be performed six times, one for each of the six degrees of freedom. Hereinafter, as is customary, the six degrees of freedom are indicated as follows: $T_x$—translation in x direction; $T_y$—translation in y direction; $T_z$—translation in z direction; $R_x$—rotation about x axis; $R_y$—rotation about y axis; and, $R_z$—rotation about z axis;

c. "Applying" PSD analysis on the finite elements model: In this step, a PSD loading curve in [$g^2$/Hz] as a function of the frequency should be applied to the model. The PSD (random vibration) analysis is a kind of a post processing procedure of the frequency response analysis. Again, the PSD stage should be performed six times, one for each of the six degrees of freedom;

d. PSD results (1): The PSD analysis results in an RMS stress tensor defining the normal and shear RMS stress values for each of the six separated PSD analyses. Hereinafter, as is customary, the stress vectors are indicated as follows: $\sigma_{xx}$—normal stress in x direction; $\sigma_{yy}$—normal stress in y direction; $\sigma_{zz}$—normal stress in z direction; $\tau_{xy}$—shear (tangential) stress in x-y plane; $\tau_{xz}$—shear (tangential) stress in x-z plane; $\tau_{yz}$—shear (tangential) stress in y-z plane. And;

e. PSD results (2): Using the PSD analysis, it is required to find the rate of sign change of the vibrations resulted from said PSD (in [cycles/sec]);

f. Finding an equivalent stress tensor: In this step, there is a need to find equivalent stress tensor resulted from said separate tensors that are separately obtained in step (d). This hypothetical step is problematic, and generally cannot be performed, since each of the RMS stress tensors is resulted from a different PSD values in terms of $\sigma^2$/Hz as a function of the frequency. Therefore, one cannot say, for example, that the combined RMS $\sigma_{xx}$ of PSD in Tx direction and PSD in Ty direction is $\sqrt{\sigma xx^2|_{TxPSD} + \sigma xx^2|_{TyPSD}}$ (because these are RMS values). This is the main reason why this step is only hypothetical;

g. Finding an equivalent stress scalar: This stress value is an equivalent scalar of the various tensor components of step (f). This equivalent stress value, if could be found, might have formed the basis for a following fatigue calculation. Again, this hypothetical step is also problematic, and generally cannot be performed, since each of the RMS stress values is originated from a different PSD value in terms of $\sigma^2$/Hz as a function of the frequency. A conventional calculation using, for example, Von Mises or Treska hypothesis will lead to wrong results. However, hypothetically, if such an equivalent stress value (in units of N/mm$^2$ or equivalent) would somehow be found, the procedure should have been continued to step (h);

h. Calculation of the Life Span/Fatigue: Assuming that the equivalent stress value of step (g) could somehow be calculated (although, as said, presently there is no knowledge for how such a calculation can be performed), a life span/fatigue calculation should follow, while considering the sign rate of change of step (e), as well as the equivalent stress of step (g). This step (h) might use fracture mechanics calculations or fatigue S—N diagrams calculations.

i. Thermal effects on the life span/fatigue calculation: The effects of thermal loads, both on the previous stress calculations and on the properties of the materials involved, should also be taken into account while trying to find the life span/fatigue results of step (h).

All the above complicated procedure may reflect the steps that have to be taken in order to simulate a HALT test, or more particularly, to provide the results of a HALT test. However, the performing of the above procedure, or equivalent thereof, is most probably impossible, as it involves lengthy, extremely complicated steps (of which some are unsolved yet), which result in accumulated analytical, numerical, and other errors and inaccuracies. Even if the procedure would somehow be completed, the results would most probably be extremely inaccurate and therefore unacceptable. Said procedure is so complicated, that there is neither knowledge of how to successfully complete it, nor there exists any alternative procedure for obtaining the results of a HALT test (without executing the laboratory physical test itself).

The present invention overcomes the drawbacks resulting from the need to perform a physical HALT test, by providing a simulation to said physical test. The results of the simulation of the present invention have shown extremely high correlation to a real physical HALT test. The simulation of the present invention can be performed in a much cheaper and faster manner in comparison with a real physical HALT test, and not less important, the method of the present invention does not require any physical equipment nor the tested product itself, and therefore can be performed as early as at the initial stages of the product development, or during any other of the stages of the product development process. In other words, the present invention does not require waiting for a physical prototype to be available in order to carry out the reliability inquiry which a physical HALT test enables, and it therefore enables forecasting failures and correcting them at the very initial stages of the product design and development.

Figure 2:
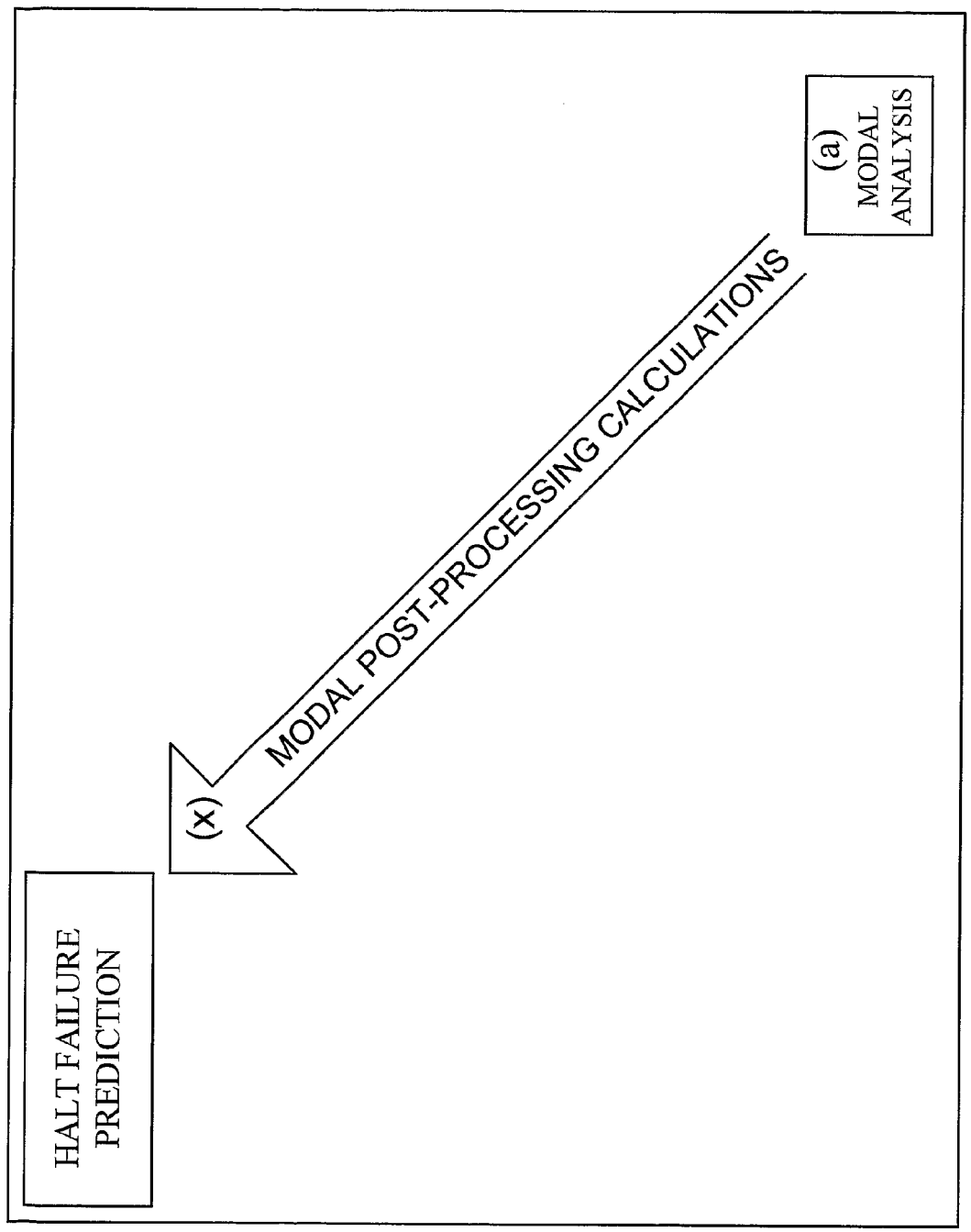
FIG. 2 briefly symbolically and generally illustrates the main steps of the method of the present invention.

It has been found by the inventors that said very complicated, and at least partially hypothetical procedure of FIG. 1 can be substituted with a significantly simplified procedure. The present invention eliminates most of the steps of the very complicated hypothetical method of FIG. 1. According to the present invention, the first step of modal analysis (a) is first performed (see FIG. 2). Next, a relatively simple step (X) which involves post processing operations is performed on the modal analysis results, leading directly to the final HALT failure prediction results, i.e., to the prediction of the failed components. In such a manner, the very complicated steps (b), (c), (d), (e), (f), (g), (h), and (i), of which some are hypothetical and cannot be performed in practice, are all eliminated.

Such a simplification to the procedure of obtaining a HALT test results looks impossible at a first glance. However, a careful examination of the principles of the HALT test procedure leads to the theoretical physical basis which explains the breakthrough of this invention. The explanation lies in the main difference between the conservative (not HALT) loading regimes and the vibration regime of HALT. Each regular (not HALT) PSD test tries to simulate specific environmental conditions, each having specific direction, amplitude and frequency ranges. For example, a specific PSD load applied in translation z axis direction may represent a typical random acceleration in z axis resulting from driving on a rough road. HALT test, on the other hand, tries to stimulate the tested product in any possible way. The HALT stimulates a product by applying high acceleration vibrations in wide amplitude and spectrum ranges, in six degrees of freedom simultaneously, and, at some stages, by adding some thermal loads. The difference in approach between the HALT and the conservative testing regimes is significant from both the quality and quantity aspects, as follows.

While dealing with a conventional (not HALT) dynamic simulation, there is no injective (one to one) relationship between the modal analysis solution resulting in finding of the natural frequencies and eigenvectors of the model, based on the equation $[k]\{u\}+[m]\{u"\}=0$ and between the full dynamic solution of the given model which is subjected to a dynamic excitation of any kind, based on the equation $[k]\{u\}+[c]\{u'\}+[m]\{u"\}=\{f\}_t$, wherein $[k]$ is the stiffness matrix, $[c]$ is the damping matrix, $[m]$ is the mass matrix, $\{f\}_t$ is the loads vector, $\{u\}$ is the displacement vector, $\{u'\}$ is the velocity vector, and $\{u"\}$ is the acceleration vector.

The reason for the lack of direct relationship in case of conventional dynamic simulation, including conventional PSD simulation is, because in a conventional dynamic simulation the load is applied to the model in a single axis at a predefined limited range of spectrum and amplitudes. This is true for all types of conventional dynamic analyses including PSD, frequency response, and transient response. In all these cases, only those natural frequencies and related eigenvectors whose mode shapes match the direction of the external excitation, and whose vibration frequencies match the frequency of the external excitation, will participate in the dynamic excitation of the simulated product, a participation that will in turn eventually lead to fatigue stresses. However, a dynamic stimulation such as in a HALT test initiates a dynamic excitation in all directions (degrees of freedom) simultaneously, at a wide range of frequency spectrum, and using gradually increasing load amplitudes up to high levels. This results in a dynamic excitation in which all dominant natural frequencies of the product participate. Therefore, in this case of HALT or similar procedure, there is an injective (one to one) relationship correlation between the solution of the natural frequencies problem (modal analysis, sometimes referred to as an eigenvalue problem), and the solution of the full dynamic problem. Therefore, a basic principle of the present invention is the discovery by the inventor that PCB components which fail in a HALT test are those components which are "active" in the eigenvalue solution, in a way that will be explained in depth hereinafter, i.e., they have a relatively significant displacement amplitude as can be observed when examining various mode shapes of the natural frequencies of the examined model (whether 3D amplitudes or specific direction amplitudes) compared to the PCB board and compared to other components. In other words, said components have a dominant oscillation as can be observed when examining various mode shapes corresponding to the natural frequencies of the PCB assembly model. Therefore, by using a short computational post processing procedure [marked (X) in FIG. 2], the solution of the natural frequency problem (which is a relatively simple problem) leads almost directly to the results of the extremely complex HALT problem.

It should be noted that the present invention can essentially be applied to various products, for example, PCB assemblies together with their enclosure or casing and other parts, e.g., a plastic housing or metal chassis or basket to which the PCB assemblies are mounted, with some necessary adaptations. However, as presently the HALT test is mostly applied to a PCB assembly, the following example will assume that the product in question is a PCB assembly. The term PCB assembly (Printed Circuit Board assembly or PCBA) in this invention refers to a Printed Circuit Board to which components are assembled, or to any other type of an electronic board with components, or to any other type of electronic circuit. Although the art some times refers to the term PCB as a printed circuit bare-board, the term PCB in this application also refers to a PCB assembly in its wider definition as stated above (i.e., a printed circuit board including the assembled components or any other type of an electronic board with components, or any other type of electronic circuit). The components may typically be located on the top and/or bottom of the board. Said components assembled to the board may possibly include passive and active electronic components, electromechanical components, mechanical components (for example, stiffeners) and other types of components. The components are usually attached to the board. In a specific case, a component may be attached to another component, which in turn is attached to the board. Yet in another specific case, a secondary board with components assembled to it is attached to a main board via spacers. Therefore, the present invention can be applied to many types of electronic circuits and electronic boards in a similar manner as to the conventional Printed Circuit Boards. It still should be noted that the present invention can be applied to an assembly of more then one PCB, and their corresponding structure or chassis or basket to which said PCBs are assembled, all analyzed together.

The method of the invention generally comprises the following steps:

a. Mode Shape Types Pre-Definition: For the purpose of this application the term "Mode Shape Type" is defined. The step of Mode Shape Type pre-definition involves the pre-defining of possible Mode Shape Types, i.e. types of mode shapes—each having specific characteristics as discussed hereinafter. The step also involves the designation of a Threat Weight to each Mode Shape Type. A Threat Weight is an indication for the likelihood of a component failure: a higher Threat Weight when related to a component indicates a higher likelihood of a failure, i.e., it is an indication of a higher potential reliability problem. More particularly, this step designates for each possible Mode Shape Type the relationship between this type and the existence of a possible reliability threat (i.e., design weakness) to one or more of the PCB components. This step is general, and is defined once. Once this definition is made, it can be used for all PCBs of any design.

b. Model creation: In this step, a detailed finite elements mesh model of the analyzed PCB product is created. The model has to include the board itself, as well as the PCB components. Typically, the mesh model has to include and take into account the component leads.

c. Performing a natural frequencies simulation: In this step, a modal analysis of the PCB is performed, resulting in finding the natural frequencies of the model, and their corresponding mode shapes. The term "mode shape" usually refers in the art to the deformed shape of an object, which is correlated to its specific natural frequency (eigenvalue). Although throughout most parts of this application the term "mode shape" relates to said conventional definition of displacement magnitude vector (i.e. the deformed shape), which is obtained from the directional translation eigenvectors, this term is sometimes extended in the application, to include other eigenvectors as well, as explained hereinafter. This step is generally performed for a typical relevant predefined frequency range. The range may typically cover the range used in a specific HALT test, or otherwise be defined as discussed hereinafter.

d. Analysis and deriving conclusions: In this step, for each natural frequency and corresponding mode shape found, an analysis is made by comparing the mode shapes found in said simulation with said predefined Mode Shape Types to determine the vulnerable components.

While steps (a) and (d) above are unique to the present invention, steps (b) and (c) represent a model creation and simulation of natural frequencies which are preferably performed using the known finite element technique. Other techniques, including but not limited to the finite differences method, the finite volume method, and the boundary element method, may be considered to be used for steps (b) and (c), as long as the natural frequencies and a corresponding mode shapes solution is obtained.

The method of the invention will now be described in more details.

a. Mode Shape Types Pre-Definition

As said, for the purpose of this application the term "Mode Shape Type" is defined. Various Mode Shape Types are defined, each having specific characteristics as discussed hereinafter. As for the term "mode shape" itself, in the following discussion, and until otherwise explicitly stated, the term "mode shape" refers to the spatial displacement (i.e. deformed shape) relating to a specific natural frequency. As said, the method of the present invention is based on analyzing the mode shape of each natural frequency within a typical given range, and, based on each analyzed mode shape, the method possibly provides a Threat Weight to one or more components which indicates the extent of weakness of said one or more components. More particularly, the method correlates between the eigenvectors solution defining the mode shapes and between a design weakness of specific PCB components that may lead to a field failure or to failure during a reliability test such as HALT. In order to achieve this goal, the relative amplitudes of the mode shapes of natural frequencies oscillations are examined. It has been found by the inventors that some Mode Shape Types are more responsible to failure of PCB components than others. Moreover, by analyzing found mode shapes and comparing them to Mode Shape Types, it is possible to reveal which of a PCB components will actually fail in the field or during a HALT test. Therefore, in this step, Types of mode shapes and their corresponding Threat Weights are pre-defined.

Figure 3A:
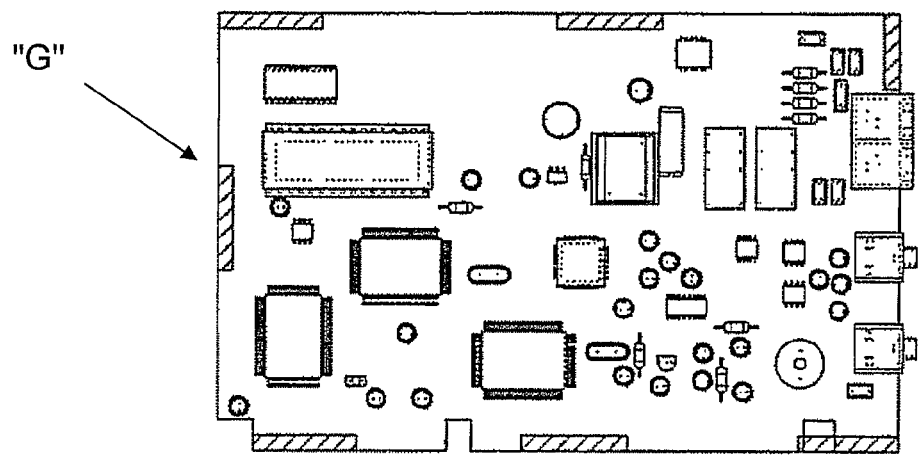
FIGS. 3a and 3b is a drawing showing a PCB "G" in top and perspective views respectively.
Figure 3B:
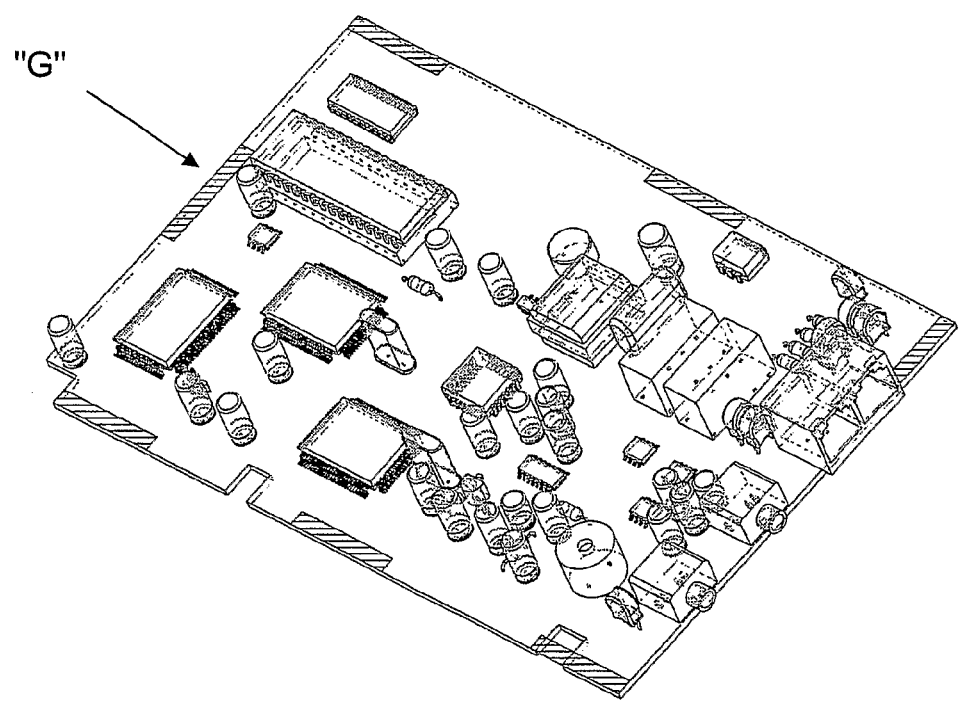
Figure 3C:
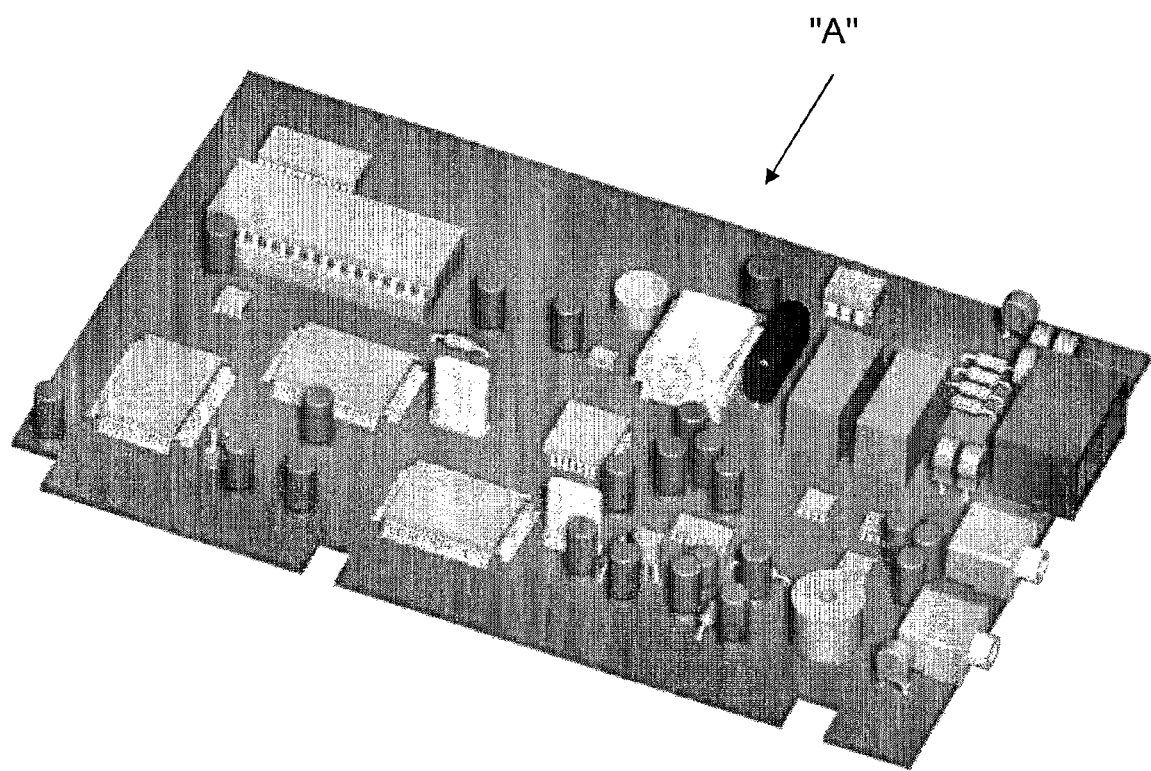
FIG. 3c is a picture showing the same PCB in a perspective view. This PCB is used for explaining several of the Mode Shape Types.
Figure 4A:
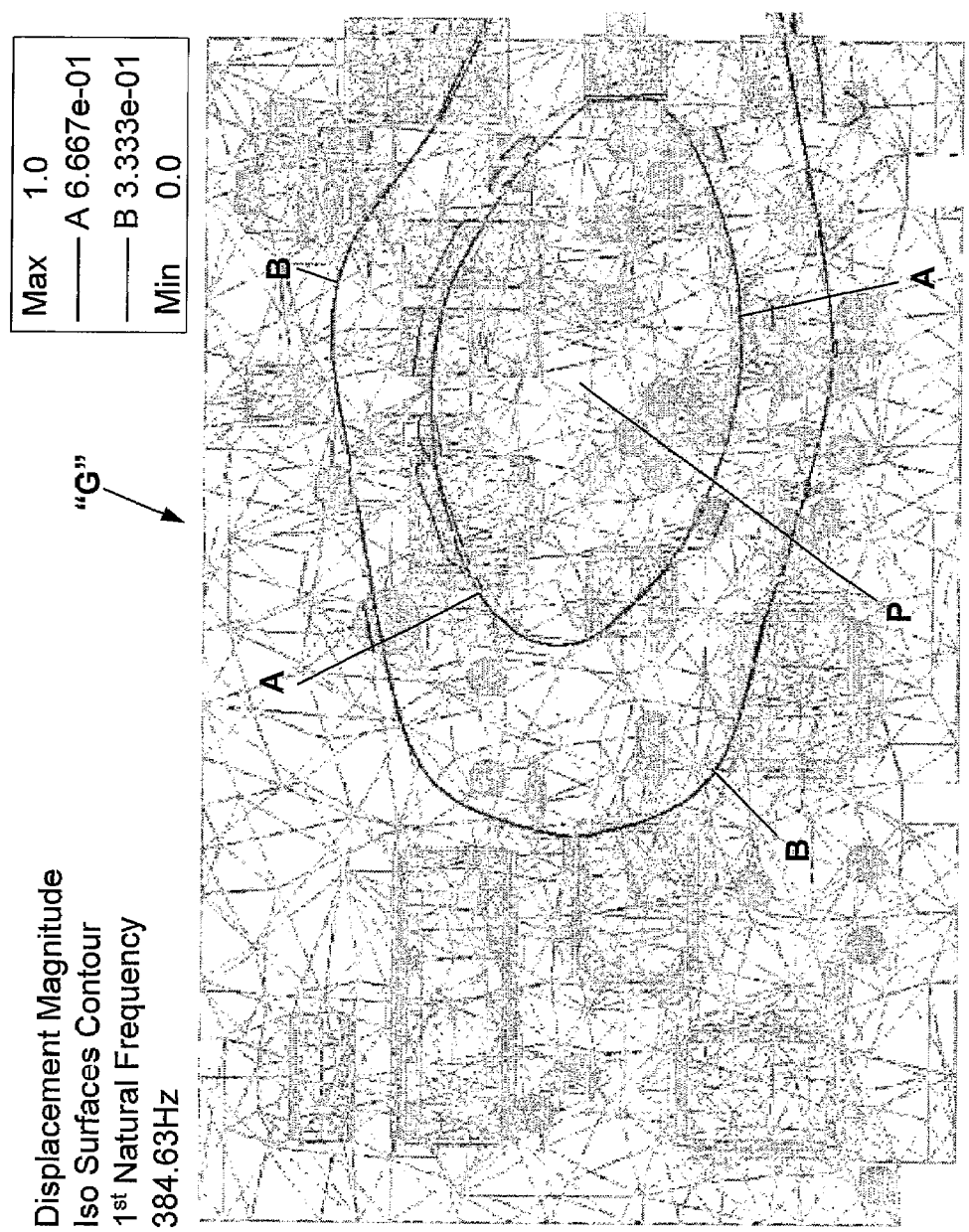

Following are several specific Mode Shape Types and their corresponding Threat Weight. FIGS. 3a and 3b show a drawing of a PCB "G" in top and perspective view respectively. FIG. 3c is a picture showing the same PCB in a perspective view. This PCB "G" is used as an example, for explaining the following Mode Shape Types 1, 2, and 3. PCB "G" is an example of a PCB which contains various components. It should be noted that the Mode Shape Types names and their order, as described hereinafter, are arbitrary:

1. Mode Shape Type 1: Mode Shape Type 1 is characterized by a displacement of the oscillating board, which is vibrating, usually at some kind of bending or twisting movement, while the components located at the bending or twisting regions move together with the board. Mode Shape Type 1 has one central point of maximal amplitude. The components that move together with the board are some or all of the board components, depending on the size of the oscillated area. It has been found by the inventors that Type 1 oscillation has a low Threat Weight. More particularly, Type 1 threat generally does not indicate failure of a specific component. For example, FIGS. 4a and 4b illustrate the Type 1 Mode Shape in iso-surfaces contour and deformed shape views respectively. FIG. 4a illustrates displacement magnitude by using iso-surfaces contour. The iso-surface contour represents the collection of all points in the board which have the same parameter value, i.e., same amplitude level (displacement magnitude) in this case. It should be noted that in a modal analysis, as known in the art, all eigenvectors are normalized. The only absolute output value is the natural frequency value itself. The eigenvectors represent relative values. Therefore, the amplitude range is normalized to the range of zero (no deformation) to one (max deformation). In this example, the board is oscillating at 384.6 Hz, which happens to be in this example the first natural frequency. It can be seen in FIG. 4a that the highest amplitude of the oscillation is located at central point P, while the 66.6% border and 33.3% border of the amplitude level are indicated by contours A and B respectively, which represent the iso-surfaces contours. It should be noted that FIG. 4a (as well as all the following figures showing a displacement magnitude iso-surfaces contour) was originally generated in color, and the figure as provided is a transformation from the color version. In the color version contour A is marked using a red color, and contour B is marked using a blue color. All regions within contour A have a displacement magnitude in the range 0.66 to 1.0. All regions between contours A and B have a displacement magnitude in the range 0.33 to 0.66, and all regions outside contour B have a displacement magnitude in the range 0.0 to 0.33. FIG. 4b illustrates the same displacement magnitude of the first natural frequency of the board, by displaying the deformed shape. It should be noted that the deformation of the PCB is displayed in an enlarged scale, in order to make the deformation visible. It should also be noted that the finite element mesh used in this model is invisible in FIG. 4b, and visible in FIG. 4a.

Figure 5A:
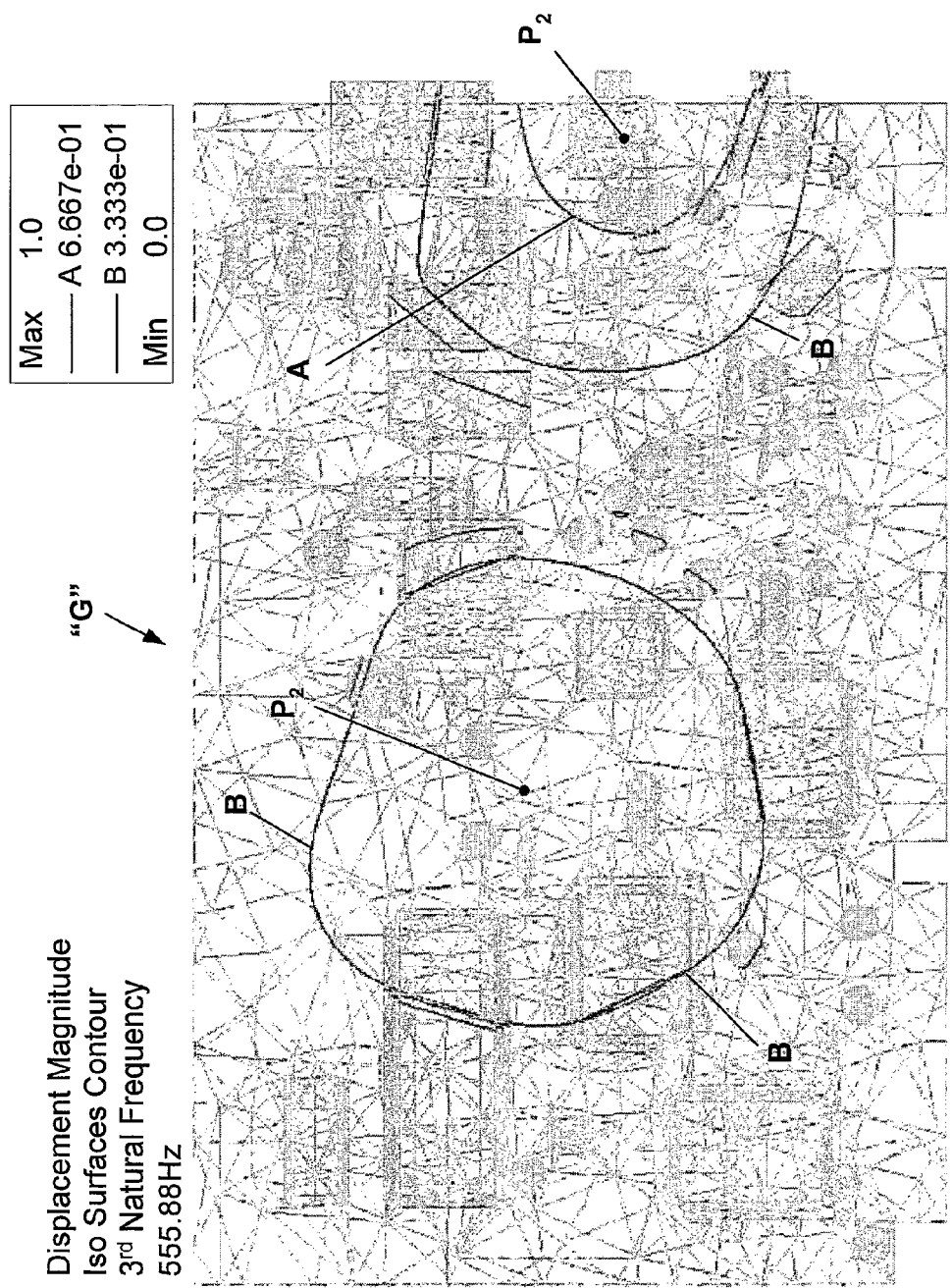
FIGS. 5a and 5b show Mode Shape Type 2 having two maximal central points P1 and P2, in displacement magnitude iso-surfaces and deformed shape views respectively.
Figure 5B:
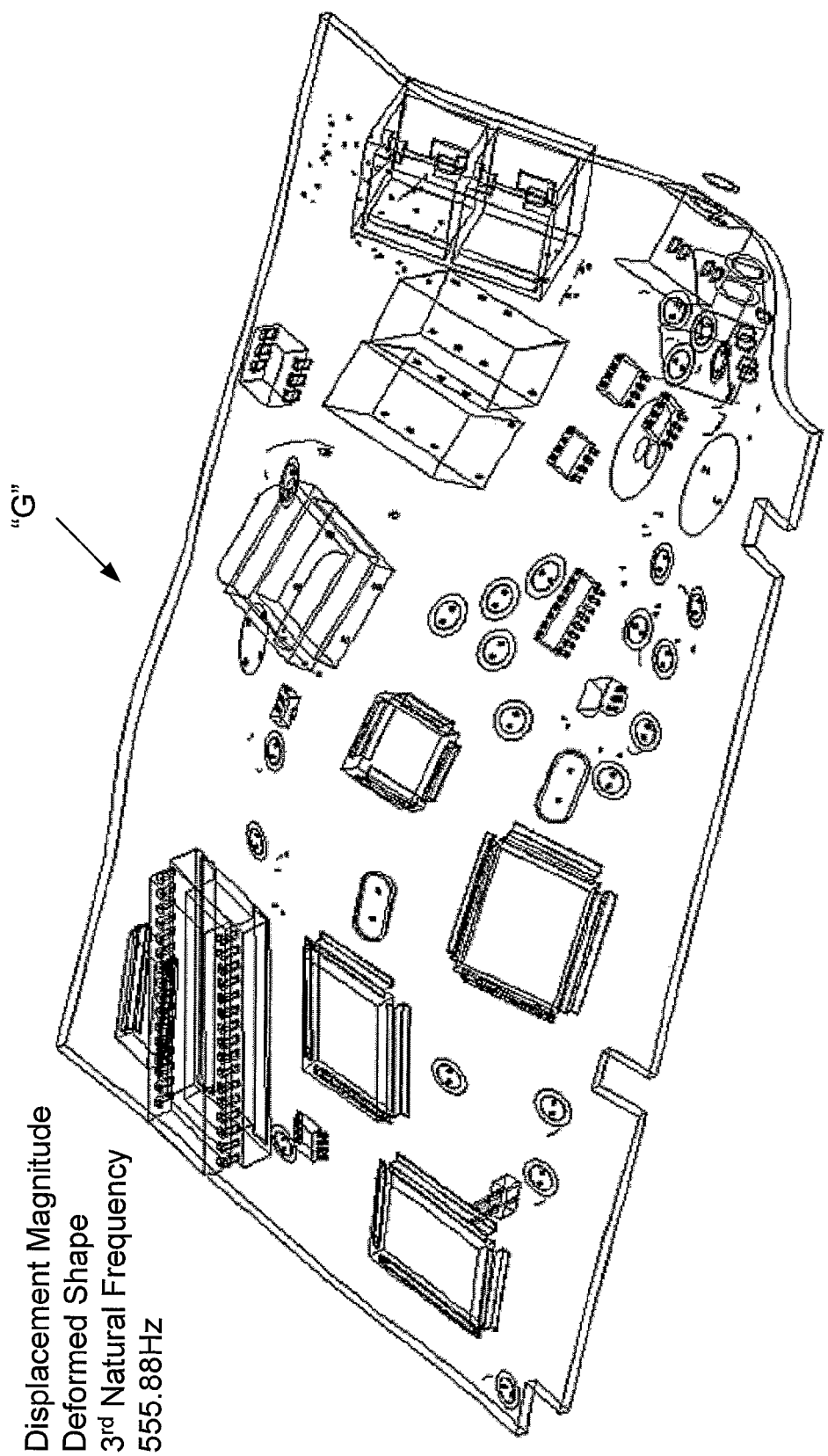

2. Mode Shape Type 2: Mode Shape Type 2 is characterized by a displacement of the board, which is oscillating, in a similar manner as of Mode Shape Type 1, however, in this case with two or more central points, i.e., two or more local maximal amplitude points, of course not necessarily having an equal amplitude level. FIG. 5a is a displacement magnitude iso-surfaces view, illustrating Mode Shape Type 2 having two maximal central points P1 and P2 respectively. In this case, the board oscillates at 555.8 Hz which happens to be the third natural frequency of the board. FIG. 5b illustrates the deformed shape of the same third natural frequency of the board. It has been found by the inventor that Type 2 oscillation also has a low Threat Weight. More particularly, Type 2 Threat Weight generally also does not indicate failure of a specific component. As a matter of fact, it has been found by the inventor that Mode Shape Type 2 is even less sever, typically, in comparison with Mode Shape Type 1, as it is harder to find an actual external load that will excite the board in this relatively more complex mode shape.

Figure 6B:
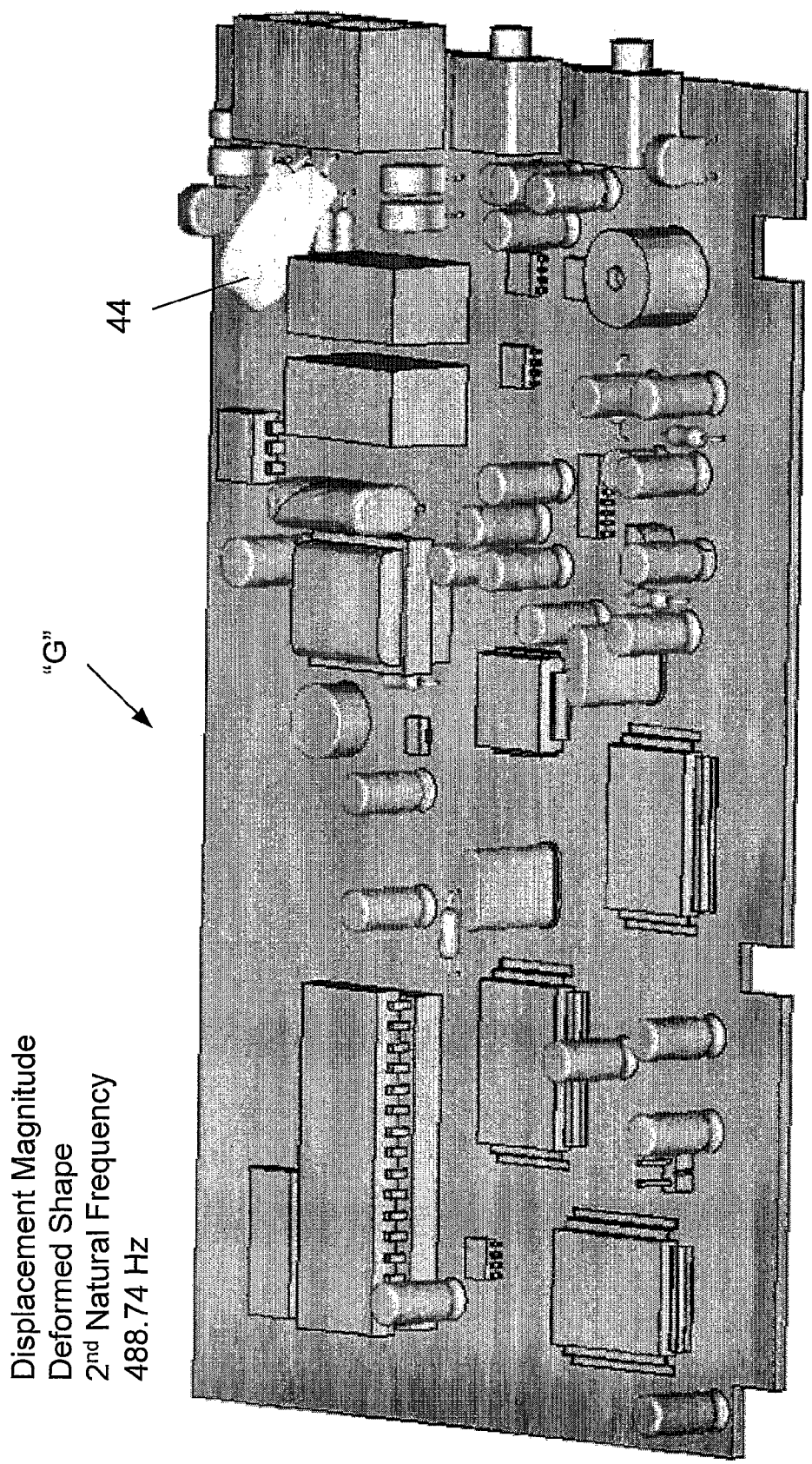

3. Mode Shape Type 3: Mode Shape Type 3 is characterized by a pure dominant local oscillation (the term "local" refers in this application to an oscillation of a single component, and "pure" indicates in this application that only the component oscillates) of a specific component. The rest of the board and all the other components do not oscillate at all, and are stationary. It should be noted that a local oscillation of said component should be considered as pure also when there is relatively small vibration of the rest of the board or the other components. Said small vibration of other parts of the boards and of other components might occur since: (a) these are analog physical phenomena and not a zero/one binary behavior (b) there are numeric inaccuracies in the simulation. Therefore in the context of the present invention a component oscillation is pure if the amplitude displacement of any other part of the PCB (including all other components) is of a small percentage (which may be predefined) of the amplitude displacement of said component. In other words, Mode Shape Type 3 relates to an oscillation of a single component. It has been found by the inventor that Mode Shape Type 3 oscillation has a very high Threat Weight with respect to the oscillating component. This is related to several reasons, including but not limited to the facts that: (a) such a local mode will cause significant fatigue, as it relates to normal and/or shear stress in the component; (b) the deformation of the component relative to the board is large; (c) the mass participation factor of the component is significant, i.e. all of the component mass participates in this mode shape vibrations; and (d) the mode shape is rather simple, therefore it is very easily dynamically excited, unlike complex mode shapes which are practically hard to excite. In other words, when using a 6 DOF excitation at a rather large frequency range, as performed, for example, in HALT, this Mode Shape Type 3 oscillation will be necessarily excited, leading to a significant fatigue to the corresponding component, resulting in an expected failure of said component. Therefore, it has been found by the inventor that the appearance of a Type 3 Mode Shape is a strong indication for a design weakness which is highly expected to be revealed in a laboratory HALT test (though it is not necessarily a design weakness in terms of a specific conventional one-axis-limited-range loading regime). FIG. 6a is a displacement magnitude iso-surfaces contour view of a Mode Shape Type 3, showing a single component, in this case a ceramic disc capacitor 44, which oscillates at 488.7 Hz, which happens to be the second natural frequency of the board. It should be noted that the iso-surfaces contour A borders the component 44, indicating its high displacement magnitude. Both contours A and B (B is not visible in the view) are limited to component 44) FIG. 6b shows the deformed shape of the same natural frequency. It can be seen that component 44 is deformed relative to its original position (i.e., while originally it was vertical with respect to the board, it can be seen that it is slanted in this figure). It should be noted that FIG. 6b (as well as all the following figures showing a displacement magnitude deformed shape) was originally generated in color, and the figure as provided is a transformation from the color version. In the color version, differences in colors indicated the amplitude of vibration (e.g., red for the 0.66 to 1.0 range, etc.), according to a color legend, which is not included in the figure, as it is in grayscale in this application. FIG. 6c is an enlarged view of the region of the same component 44. It should be noted that the finite element mesh is visible in FIGS. 6a and 6c, and invisible in FIG. 6b.

Figure 7A:
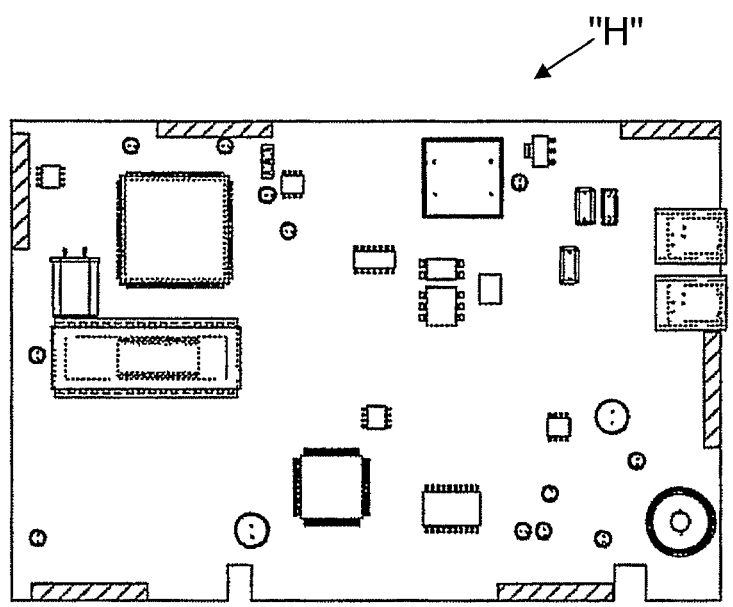
FIGS. 7a and 7b show a drawing of a PCB "H" in top and perspective views respectively.
Figure 7B:
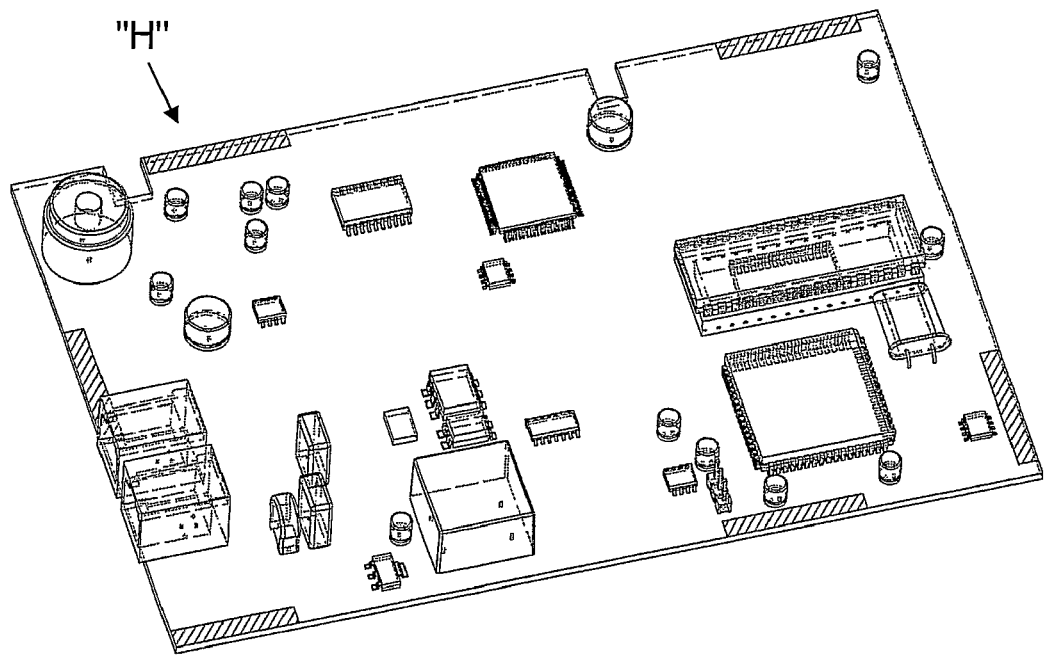
Figure 7C:
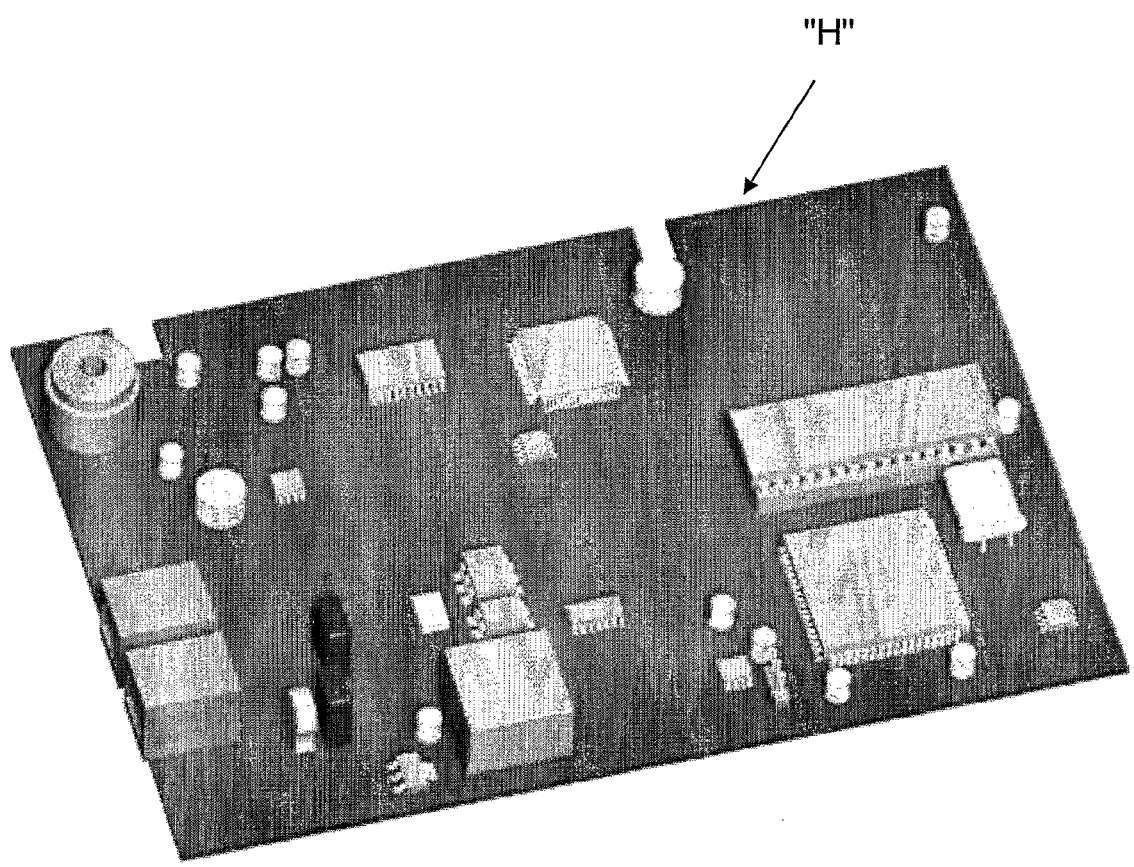
FIG. 7c is a picture showing the same PCB in perspective view. Said PCB "H" is used for explaining several of the pre-defined Mode Shape Types.
Figure 8B:
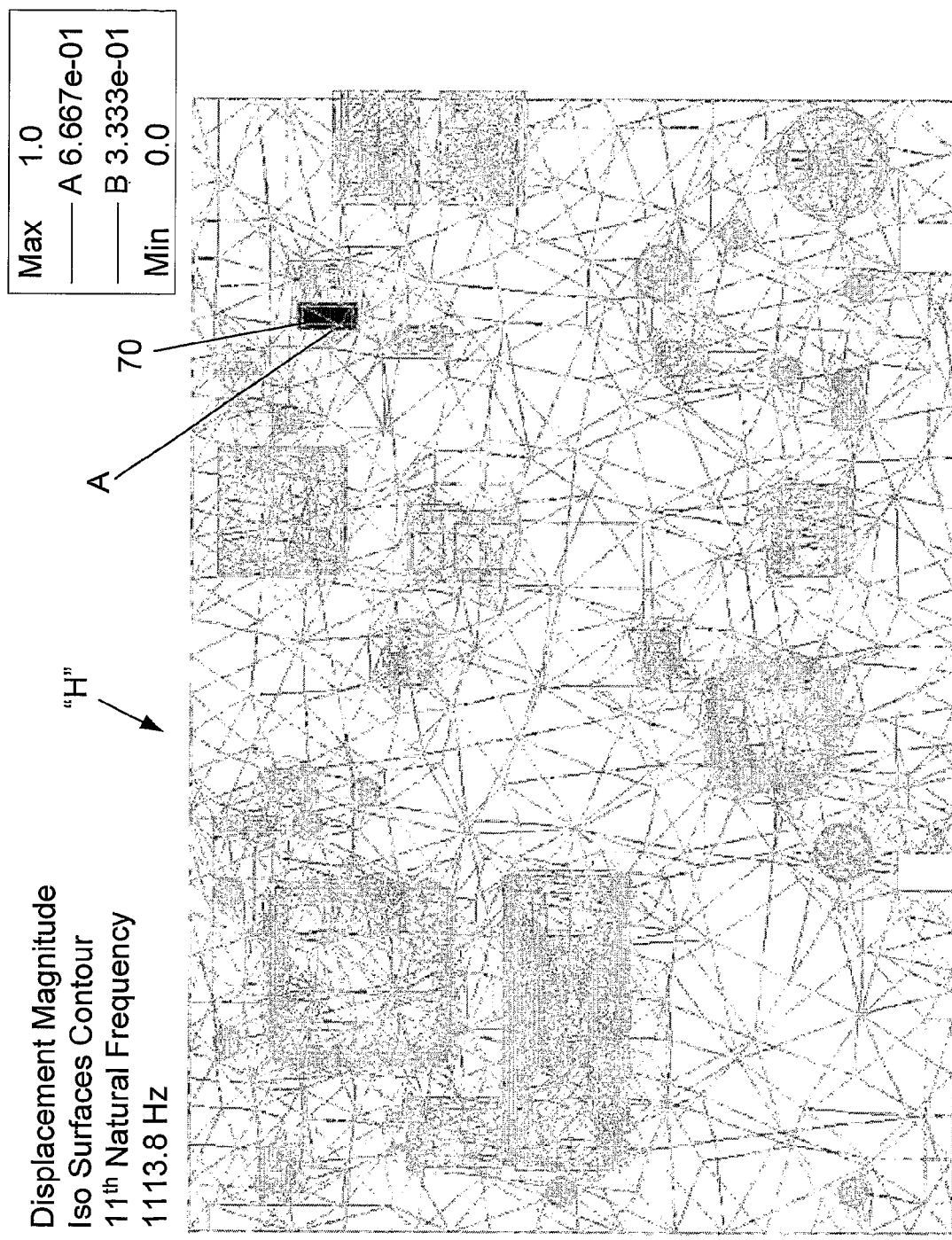

4. Mode Shape Type 4: Mode Shape Type 4 is similar to Mode Shape Type 3. However, in Type 4 a same component oscillates in two or more different natural frequencies. Each of said oscillations separately, is a Type 3 oscillation of the same component, having a same oscillation direction, for example, a bending x translation. As in Type 3, the rest of the board and all the other components do not oscillate at all, and are stationary. In other words, Mode Shape Type 4 relates also to a single component oscillation similar to Type 3. It has been found by the inventor that Type 4 oscillation also has a very high Threat Weight. The threat weight of Mode Shape Type 4 is even higher than of Mode Shape Type 3. The theoretical explanation for said even higher Threat Weight is that when subjected to six DOF wide frequency range vibration (such as in HALT) said component has a chance to be excited in two different excitation frequencies. FIGS. 7a and 7b show a drawing of a PCB "H" in top and perspective view respectively. FIG. 7c is a picture showing the same PCB in perspective view. FIGS. 8a and 8b are displacement magnitude iso-surfaces contours views of two mode shapes, referring to the $10^{th}$ (1081.2 Hz) and $11^{th}$ (1113.8 Hz) natural frequencies of the PCB "H" respectively. The figures show a same component, in this case a film capacitor 70, which oscillates at a pure local oscillation, same direction, in each of said two mode shapes.

Figure 9A:
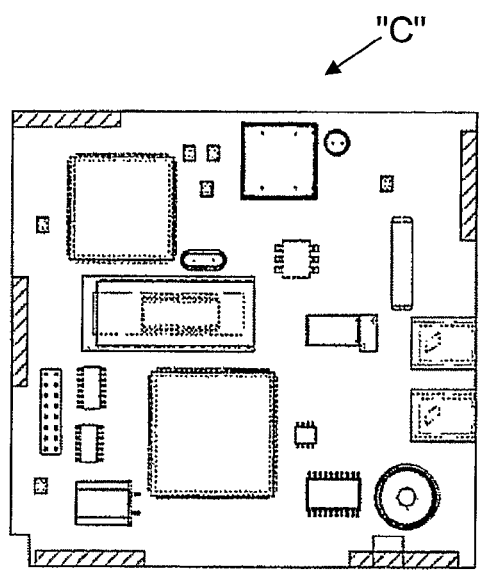
FIGS. 9a and 9b show a drawing of a PCB "C" in top and perspective views respectively.
Figure 9B:
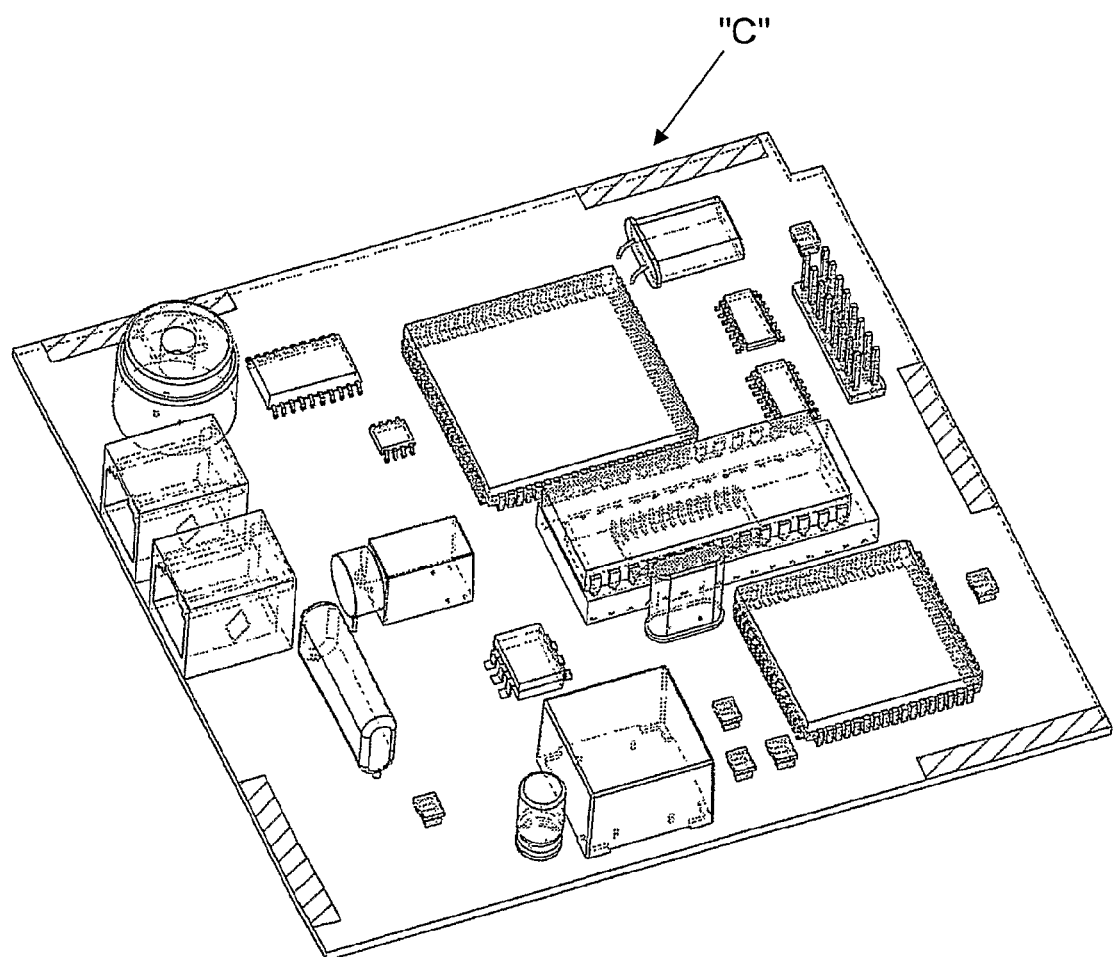
Figure 9C:
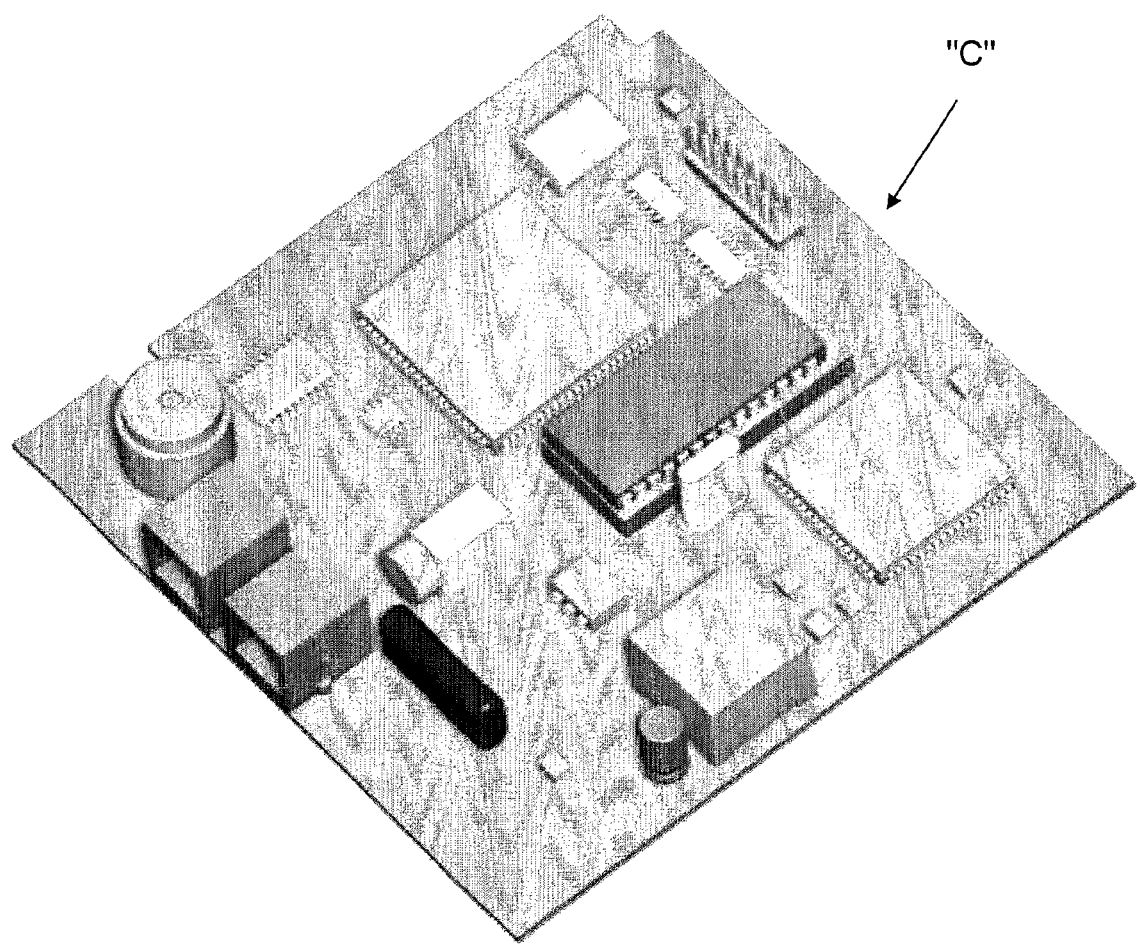
FIG. 9c is a picture showing the same PCB in a perspective view. Said PCB "C" is used for explaining several of the predefined Mode Shape Types.
Figure 10A:
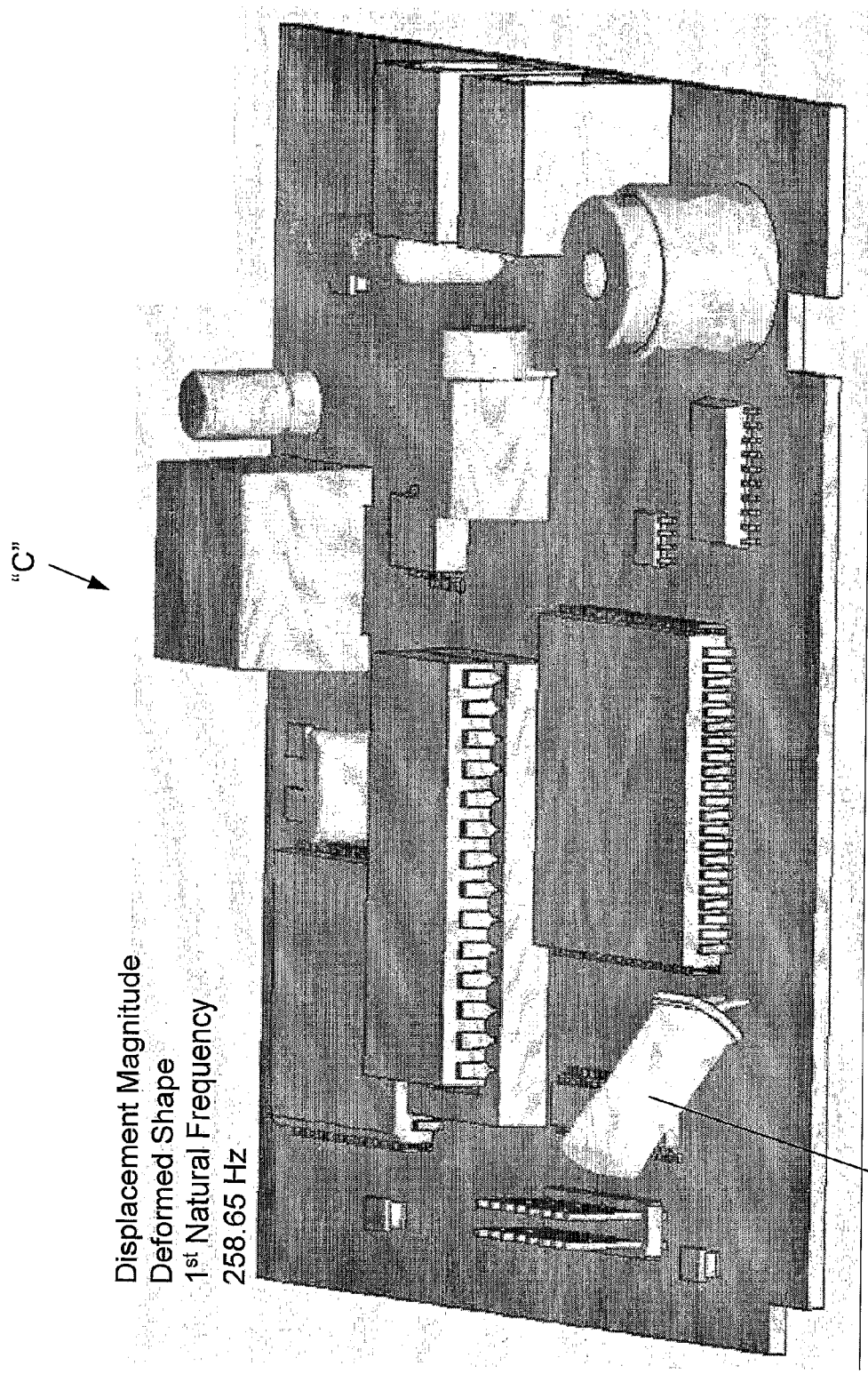
FIGS. 10a and 10b are displacement magnitude deformed shape views illustrating Mode Shape Type 5.
Figure 10B:
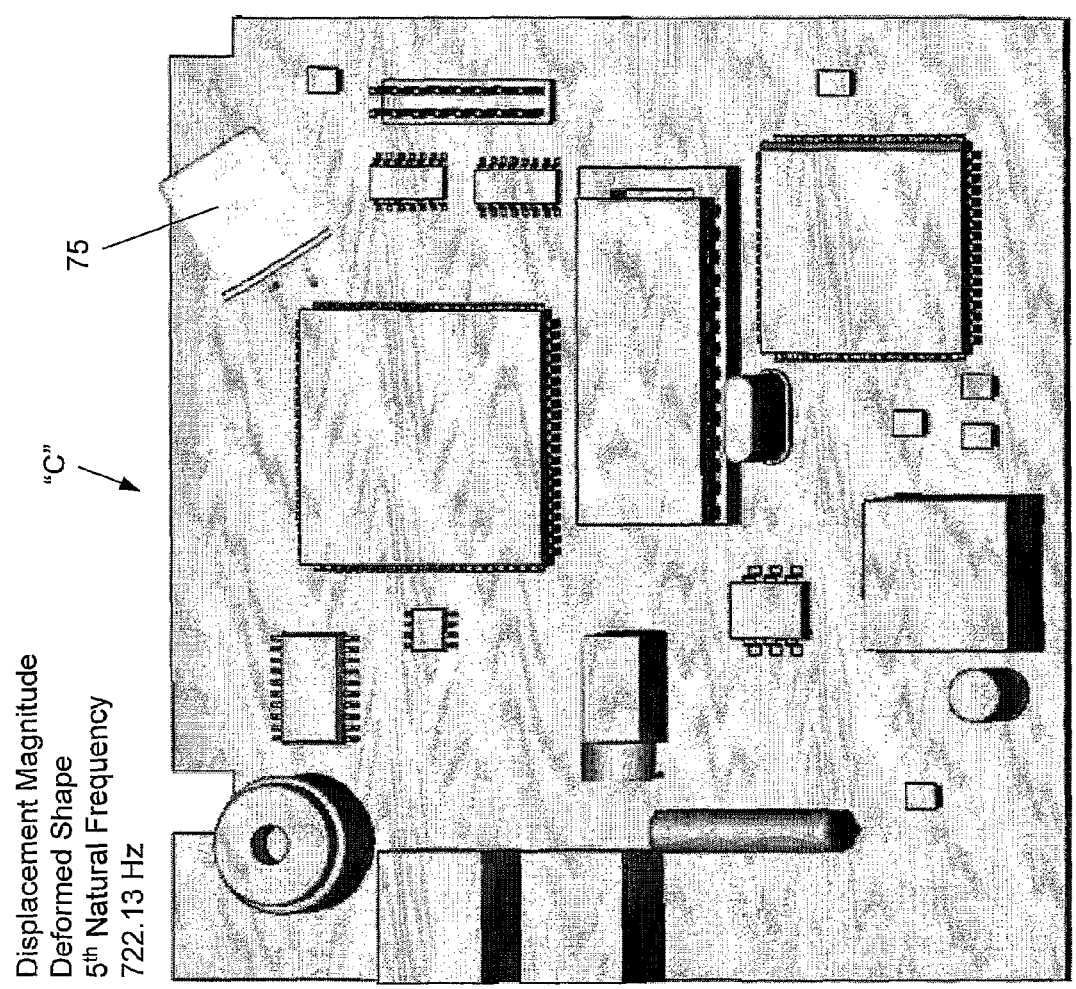

5. Mode Shape Type 5: Mode shape Type 5 is similar to Mode Shape Type 4. In similarity to Mode Shape Type 4, a same component oscillates in two or more different natural frequencies. Each of said oscillations separately, is a Type 3 oscillation of the same component. However, the direction of the oscillation is different in each mode shape, thus each causing a stress at a different location within the component, and sometimes even the stress type is different. For example, suppose that said component lead is bending as a result of the oscillation. One mode shape may cause bending in an x axis direction, while another mode shape may cause a bending in y axis direction (or any arbitrary direction). Typically, the maximal normal stress at the outer fiber of the cross section of the bending lead of the component evolves at different locations around the circumference of the lead's cross section. Yet in another example, one mode shape may cause bending in a certain direction, while another mode shape may cause twisting about a certain axis. Obviously, the main stress in one of said mode shapes is a normal stress (tension and compression) at the outer fiber of the cross section of the bending object (though there are also shear stresses), while the main stress in the other of said mode shapes is a shear (tangential) stress. Therefore, Mode Shape Type 5 is characterized by two or more mode shapes of a pure local oscillation (each is a Type 3 Mode Shape), in a same component, but vibrating in different directions. As in Type 3, the rest of the board and all the other components do not oscillate at all, and are stationary. In other words, Mode Shape Type 5 relates also to a single component oscillation similar to Types 3 and 4. It has been found that Type 5 oscillation also has a very high Threat Weight, possibly higher than of Mode Shape Type 3. FIGS. 9*a* and 9*b* show a drawing of a PCB "C" in top and perspective view respectively. FIG. 9*c* is a picture showing the same PCB in a perspective view. FIGS. 10*a* and 10*b* are the displacement magnitude deformed shape views of two mode shapes, referring to the first (258.7 Hz) and the fifth (722.4 Hz) natural frequencies of the PCB respectively. The figures show a same component, in this case a crystal 75, which oscillates at a pure local oscillation in each of said two mode shapes, but in the said first of two mode shapes the crystal bends, while in the second mode shape the crystal twists. FIG. 10*c* is an enlarged view of the region of the same component 75, oscillating in said $5^{the}$ natural frequency. It should be noted that the finite element mesh is visible in FIG. 10*c*, and invisible in FIG. 10*a*, 10*b*.

6. Mode Shape Type 6: Mode Shape Type 6 is a single mode shape of a specific natural frequency, which in similarity to Mode Shape Type 3, is characterized by a dominant local oscillation of a specific component, however it is not pure. In other words, while said component does oscillate in a clearly local nature, yet some of the rest of the board vibrates in a Type 1 like oscillation. It should be noted that if said Type 1 oscillation of the board occurs at the same region of the said component which oscillates in Type 3, said two oscillations (of the component and of the rest of the board) are distinct one from the other either by their amplitude levels or by their oscillation direction. It should also be noted that if said Type 1 and Type 3 oscillations would both be in same region of the PCB, and if they would both have similar oscillation amplitude levels and directions, they would have been merged to a Type 1 mode shape. The closer the situation is to said merged situation, the more dominant Type 1 threat becomes, resulting in the reduction of the total Threat Weight to a low weight. Mode Shape Type 6 therefore relates to a single component oscillation, i.e., a local oscillation, though not pure. It has been found that Type 6 oscillation also has a very high Threat Weight (Except if said merged situation occurs). FIG. 11 is a displacement magnitude deformed shape view of PCB "C" showing a single component, in this case an aluminum electrolytic capacitor 80, which oscillates at 1399.9 Hz, which happens to be the $11^{th}$ natural frequency of the board. At the same time, another region 81 of the PCB oscillates in Mode Shape Type 1. It can be seen that the component 80 is deformed relative to its original position. Since region 81 is at a totally different location, far away from component 80, the Threat Weight for component 80 is very high, same or close to as if it would have been a Type 1 Mode Shape.

Figure 12:
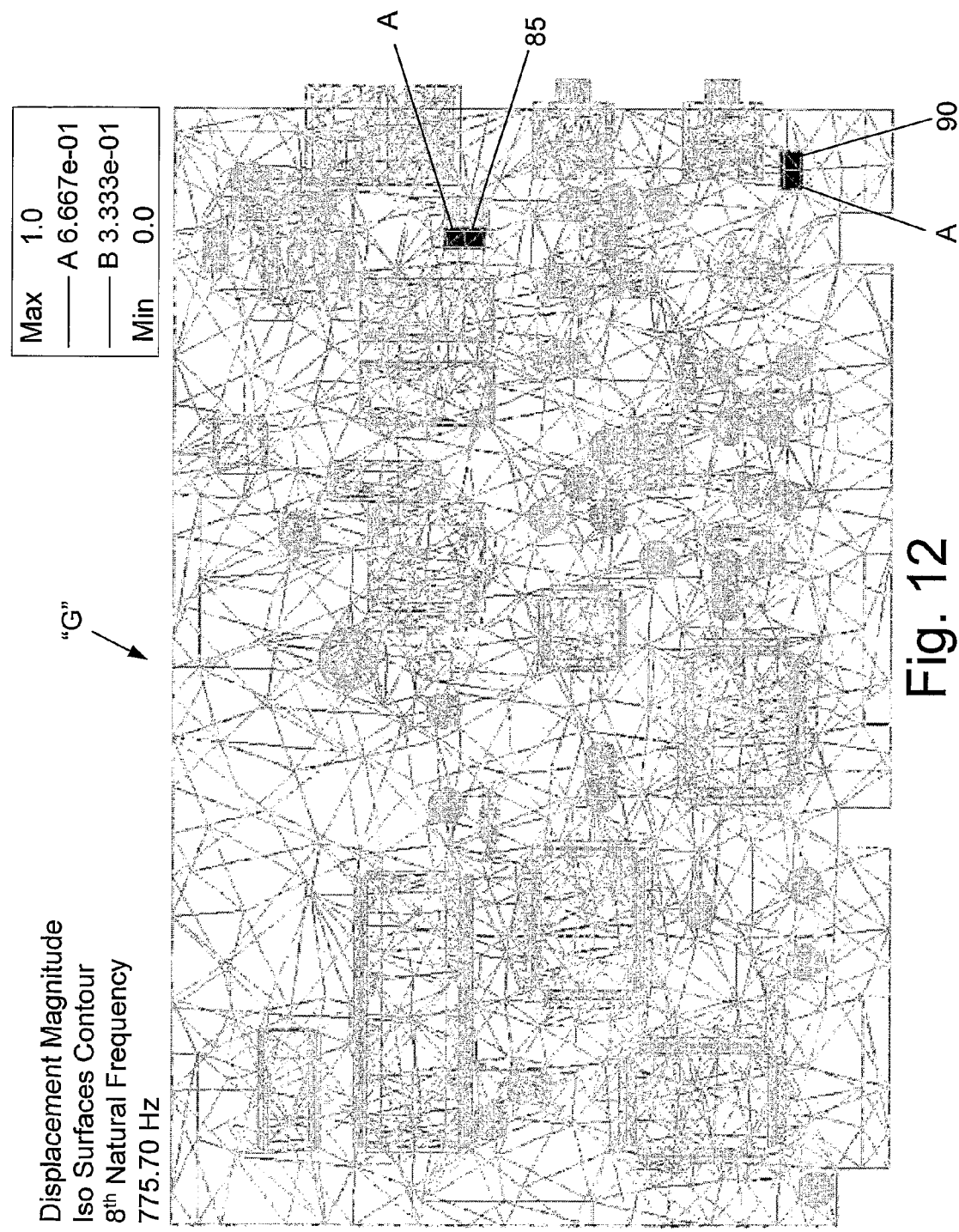
FIG. 12 is a displacement magnitude iso-surfaces view illustrating Mode Shape Type 7.

7. Mode Shape Type 7: Mode Shape Type 7 is similar to Mode Shape Type 3. It is characterized by a pure local oscillation of two or more specific components at the same mode shape (i.e., in a same natural frequency). The rest of the board and all the other components do not oscillate at all, and are stationary, similar to Type 3. It has been found that Type 7 oscillation also has a very high Threat Weight for each of said oscillated components, in similarity to Mode Shape Type 3. It should be noted that the more components are involved in said Mode Shape Type 7, the Threat Weight reduces if different oscillations directions of said components are involved. The reason for such observation is that the more components and vibration directions are involved, the harder it becomes to find an actual external load that will cause such a complex excitation. FIG. 12 is a displacement magnitude iso-surfaces view of a mode shape of PCB "G" showing two vibrating components 85 and 90, in this case ceramic disc capacitors, which oscillate at 775.7 Hz, which happens to be the $8^{th}$ natural frequency of the board. The Threat Weight for said components 85 and 90 is very high. However, it should be noted that said components 85 and 90 oscillate in two vertical directions (though it cannot be seen in FIG. 12). Thus, the Threat Weight is slightly lower then a Type 3 Threat Weight. If more components and more oscillation directions were involved, the Threat Weight would have been considered even less high to a certain extent.

8. Mode Shape Type 8: Mode shape Type 8 is similar to Mode Shape Type 7. It is characterized by a pure local oscillation of two or more specific components at the same mode shape (i.e., in a same natural frequency). The rest of the board and all the other components do not oscillate at all, and are stationary. However, the oscillation amplitude of one of the components is higher than of the other. It has been found that Type 8 oscillation also has a very high Threat Weight for each of said oscillated components, in similarity to Mode Shape Type 7. However, it should be noted that the Threat Weight is somewhat higher for those components whose amplitude levels represent higher levels of deformation. FIG. 13 is a displacement magnitude iso-surfaces view of a mode shape of PCB "H" showing two vibrating components 95 and 100, in this case aluminum electrolytic capacitors, which both oscillate at a frequency of 1239.9 Hz, which happens to be the $13^{th}$ natural frequency of the board. However, the oscillation amplitude of component 95 is significantly higher than the amplitude of component 100. It can be seen in FIG. 13 that component 95 is bordered with mark A which indicates that the deformed shape is within the upper third (i.e., 0.66-1.0 range) of the 0-to-1 deformation range, while component 100 is bordered with mark B meaning that within the border of the component the oscillation is in the range of between 0.33 to 0.66. It should be noted that the amplitude level comparison should be examined carefully: In said example, both components 95 and 100 have the same geometry and mechanical properties (i.e., they have identical packages). When said properties are the same, it is more probable that the component whose oscillation amplitude involves a larger deformation (which means a larger bending angle of the leads of the component in this example) is more likely to fail, and it will most probably fail first.

Figure 14A:
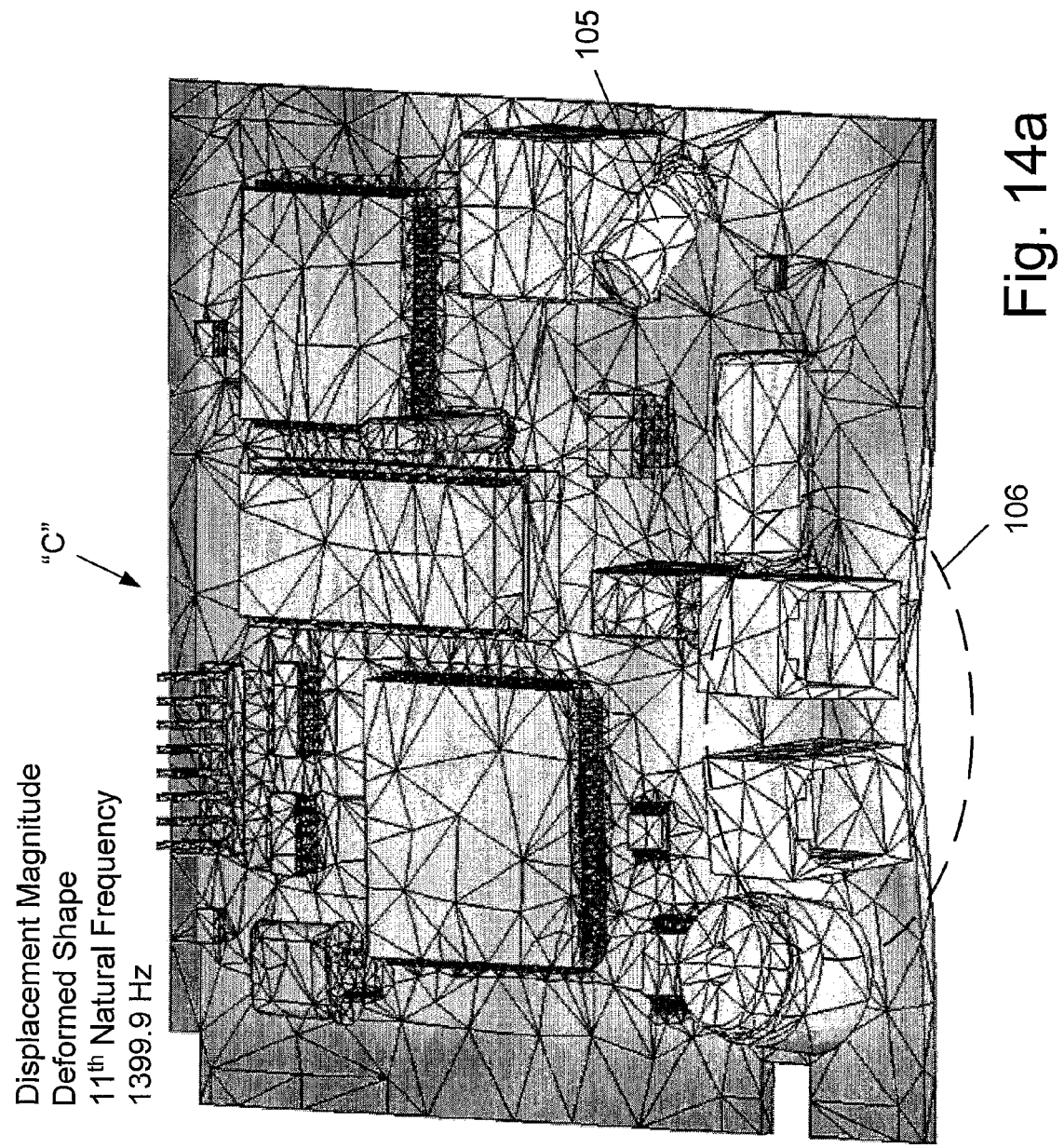

9. Mode Shape Type 9: Mode Shape Type 9 is similar to Mode Shape Type 4. As in Mode Shape Type 4, a same component oscillates in two or more different natural frequencies. At least one of said oscillations is a Type 3 oscillation of a component, yet at least one another mode shape is a Type 6 oscillation of the same component. In other words, Mode Shape Type 4 relates also to a single component oscillation. It has been found that Type 9 oscillation also has a very high Threat Weight, even higher than of Mode Shape Type 3, though it might be somewhat lower than Mode Shape Type 4. FIG. 14*a* is a displacement magnitude deformed shape view referring to the 11$^{th}$ (1399.9 Hz) natural frequency of PCB "C". FIG. 14b is displacement magnitude iso-surfaces contour view, of the 12$^{th}$ (1430.0 Hz) natural frequency of PCB "C". The figures show a same component, in this case an aluminum electrolytic capacitor 105, which oscillates at a pure local oscillation Type 3 in the 12$^{th}$ natural frequency, and at a local, though not pure, oscillation Type 6 in the 11$^{th}$ natural frequency (the region involved in said Type 6 oscillation is indicated in FIG. 14a as region 106).

Figure 15A:
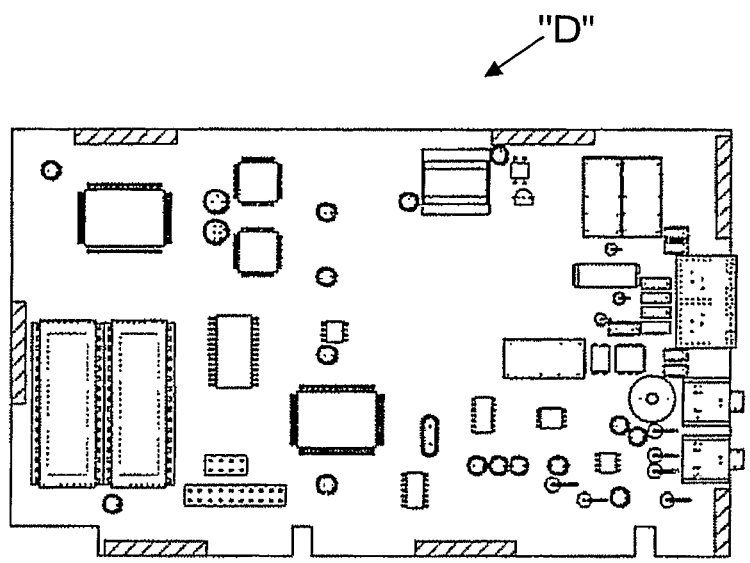
FIGS. 15a and 15b show a drawing of a PCB "D" in top and perspective views respectively.
Figure 15B:
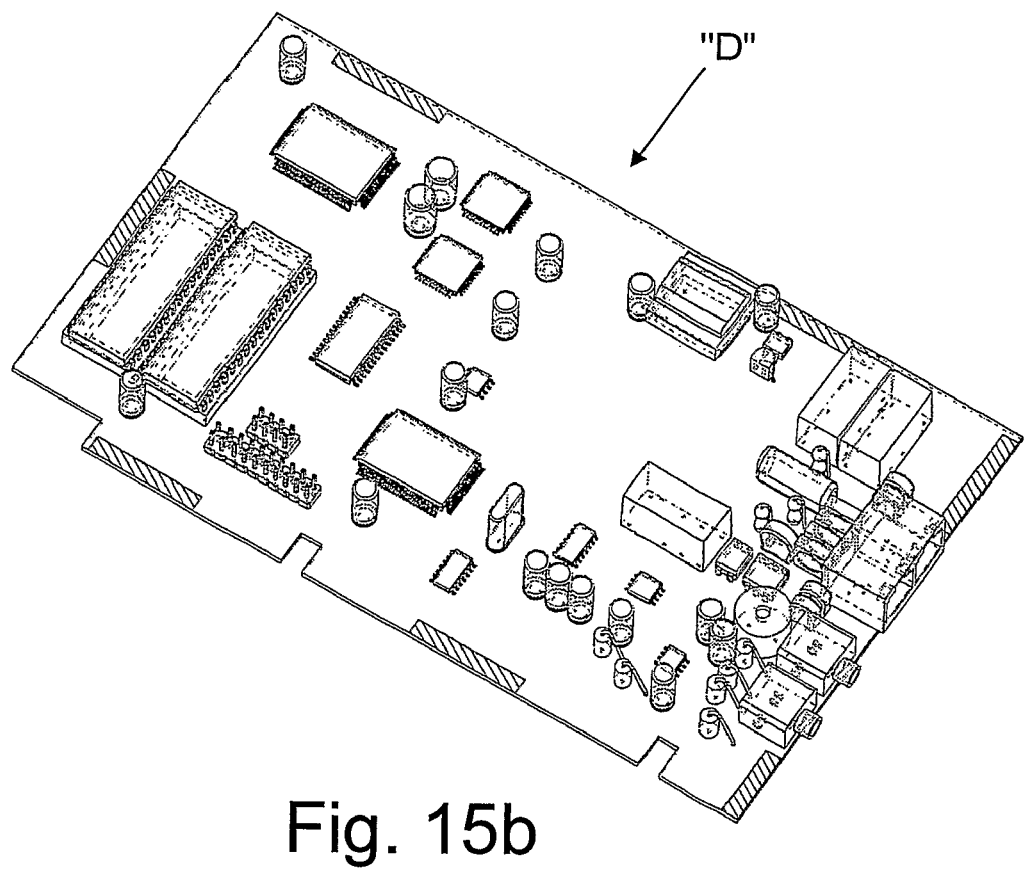
Figure 15C:
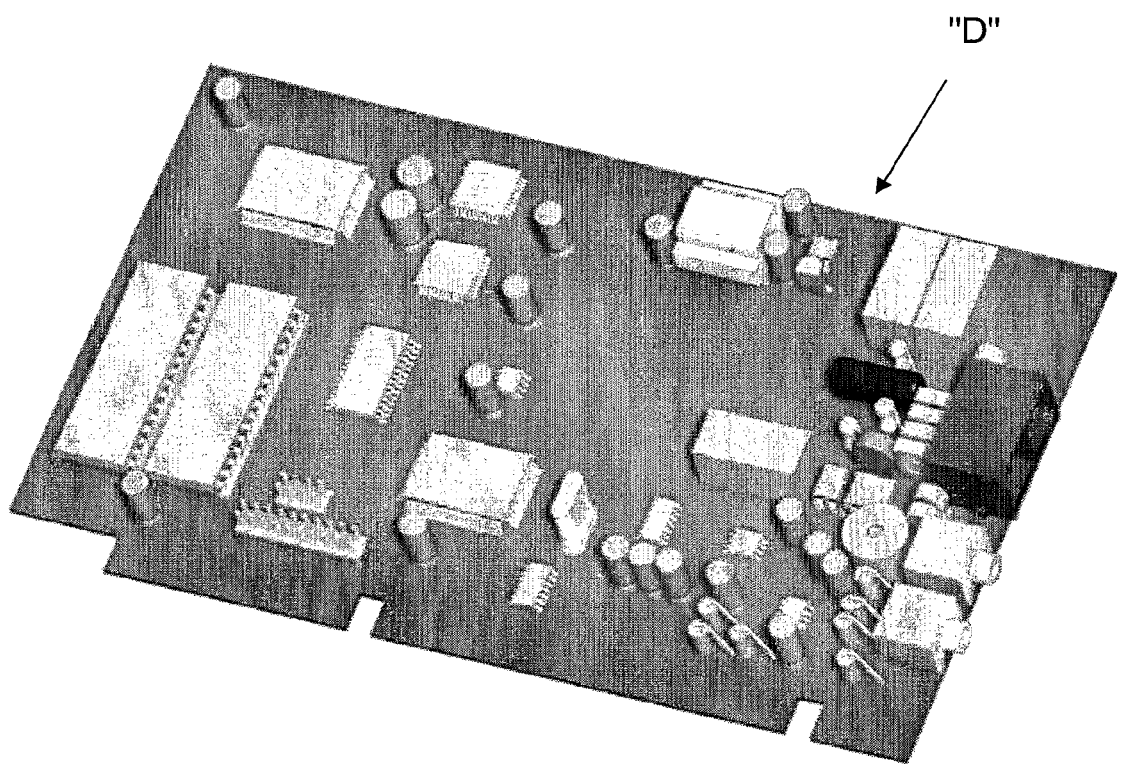
FIG. 15c is a picture showing the same PCB in perspective view. Said PCB "D" is used for explaining several of the predefined Mode Shape Types.
Figure 16A:
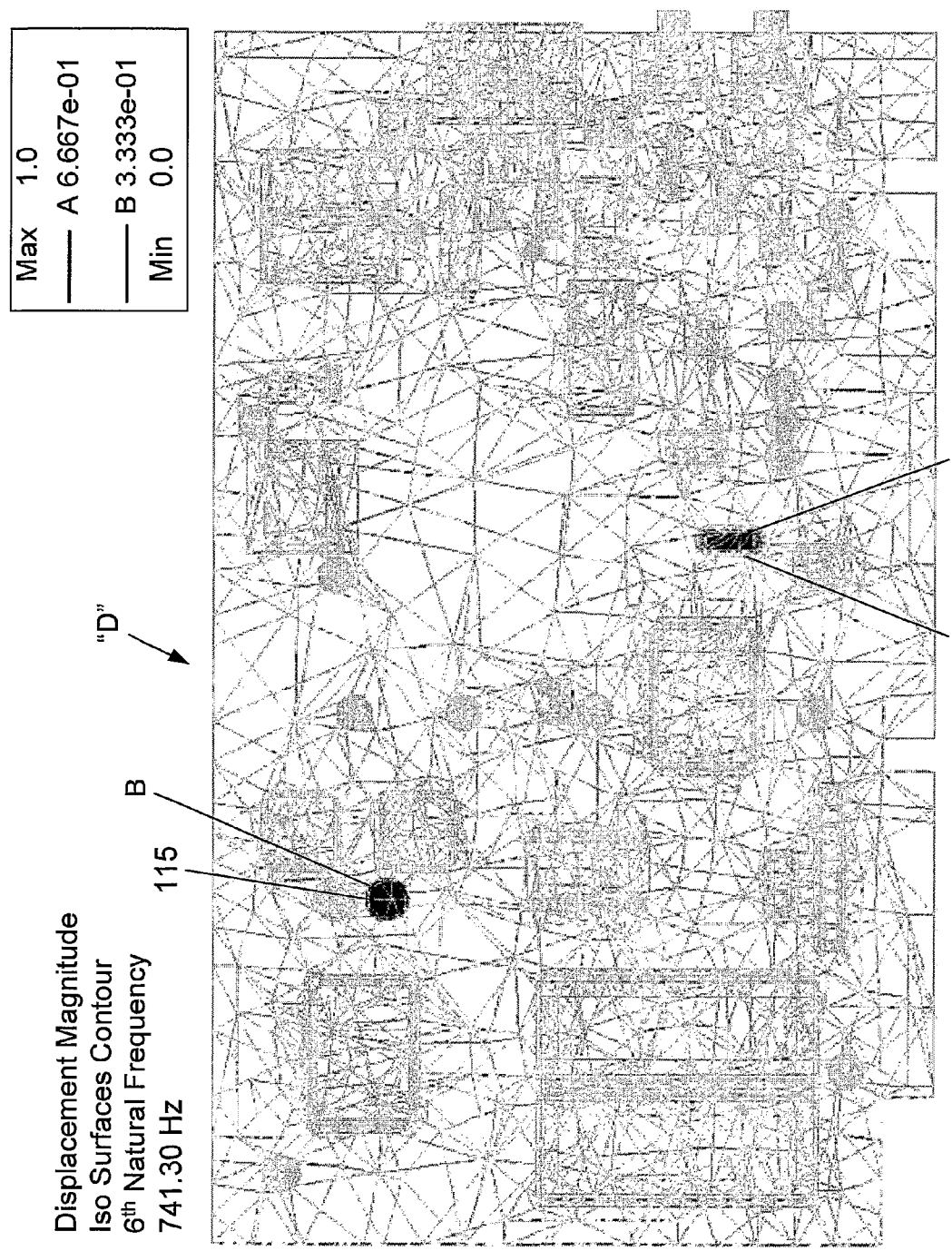

10. Mode Shape Type 10: Mode Shape Type 10 is also similar to Mode Shape Type 4. As in Mode Shape Type 4 a same component oscillates in two or more different natural frequencies. At least one of said oscillations is a Type 3 oscillation of a component, yet at least one another mode shape is a Type 7 or Type 8 oscillation involving a same component and yet an additional component. It has been found that Type 10 oscillation has a very high Threat Weight, higher than Mode Shape Type 3, regarding the component which oscillates in the two or more said natural frequencies. FIGS. 15a and 15b show a drawing of a PCB "D" in top and perspective view respectively. FIG. 15c is a picture showing the same PCB in perspective view. FIGS. 16a and 16b are displacement magnitude iso-surfaces views of two mode shapes referring to the 6$^{th}$ (741.3 Hz) and 7$^{th}$ (774.4 Hz) natural frequencies of the PCB "D" respectively. The figures show a same component, in this case a crystal 110, which oscillates at a pure local oscillation Type 3 in said 7$^{th}$ natural frequency, and at a Mode Shape Type 8 (in this case together with an aluminum electrolytic capacitor 115) in the 6$^{th}$ natural frequency.

Figure 17A:
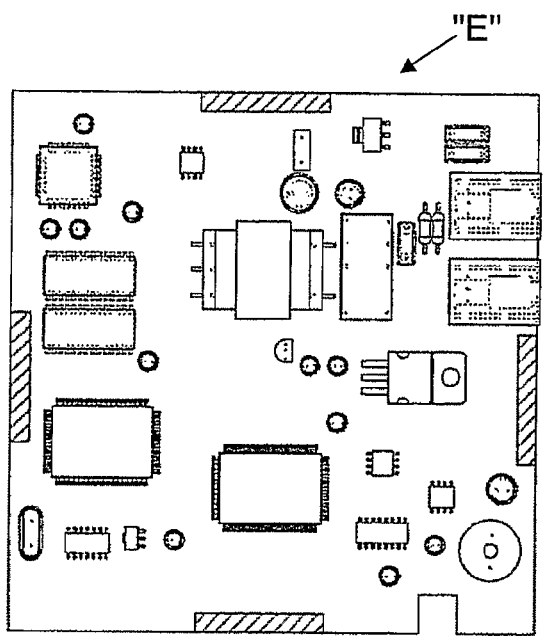
FIGS. 17a and 17b show a drawing of a PCB "E" in top and perspective views respectively.
Figure 17B:
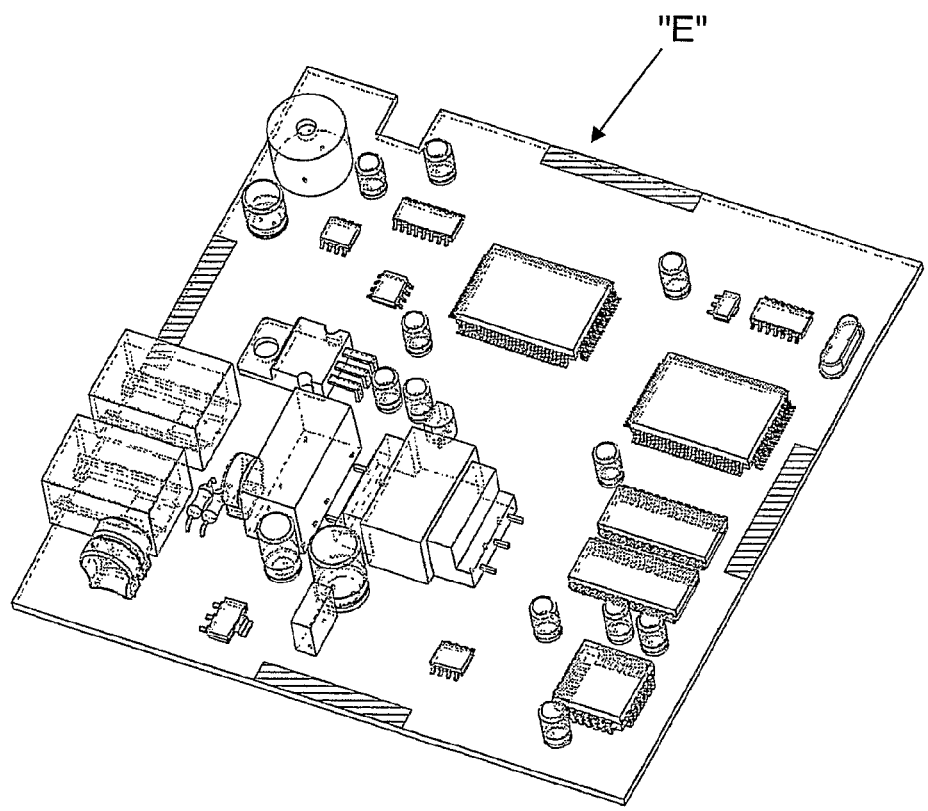
Figure 17C:
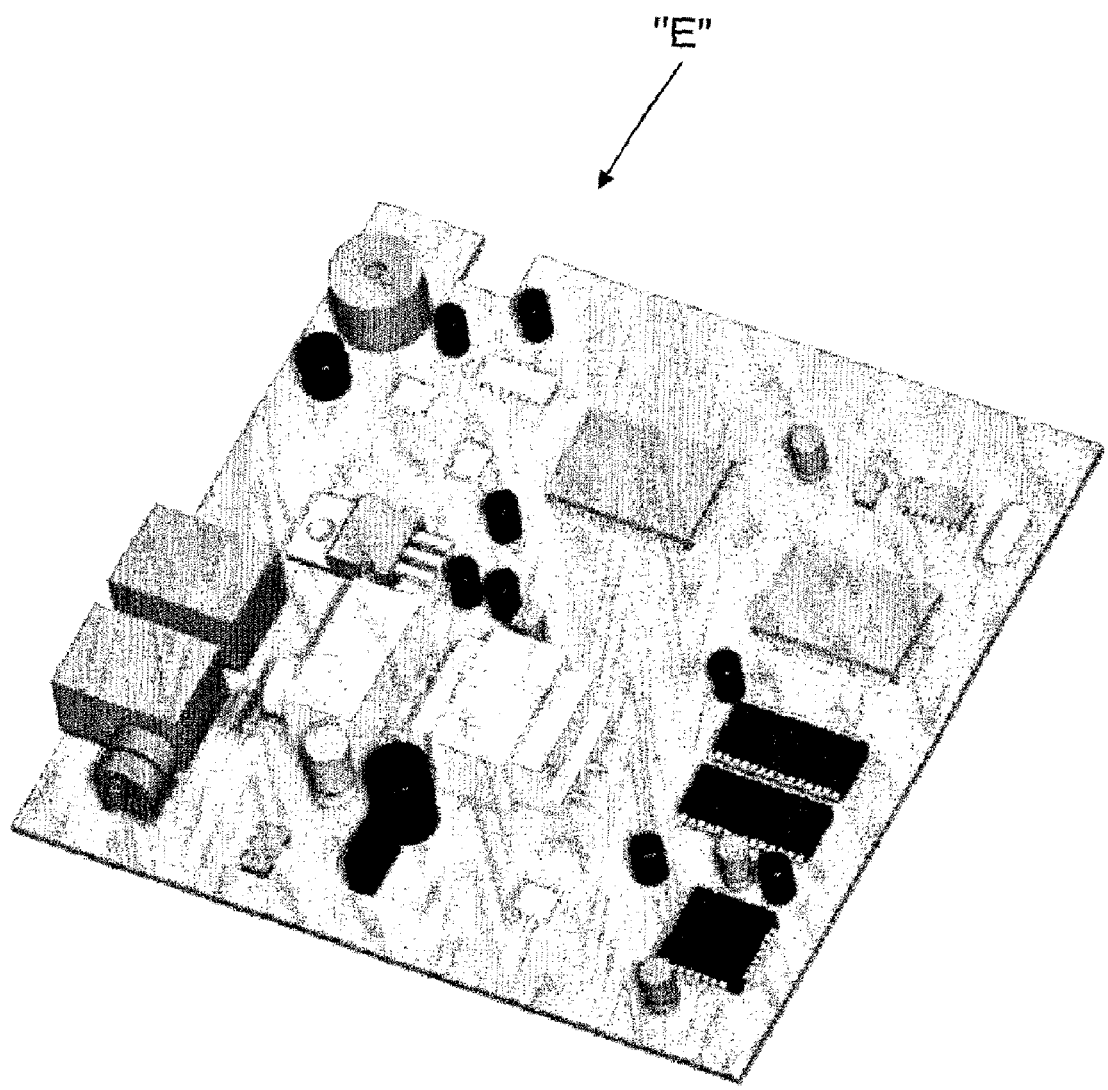
FIG. 17c is a picture showing the same PCB "E" in perspective view. Said PCB "E" is used for describing several of the predefined Mode Shape Types.
Figure 18A:
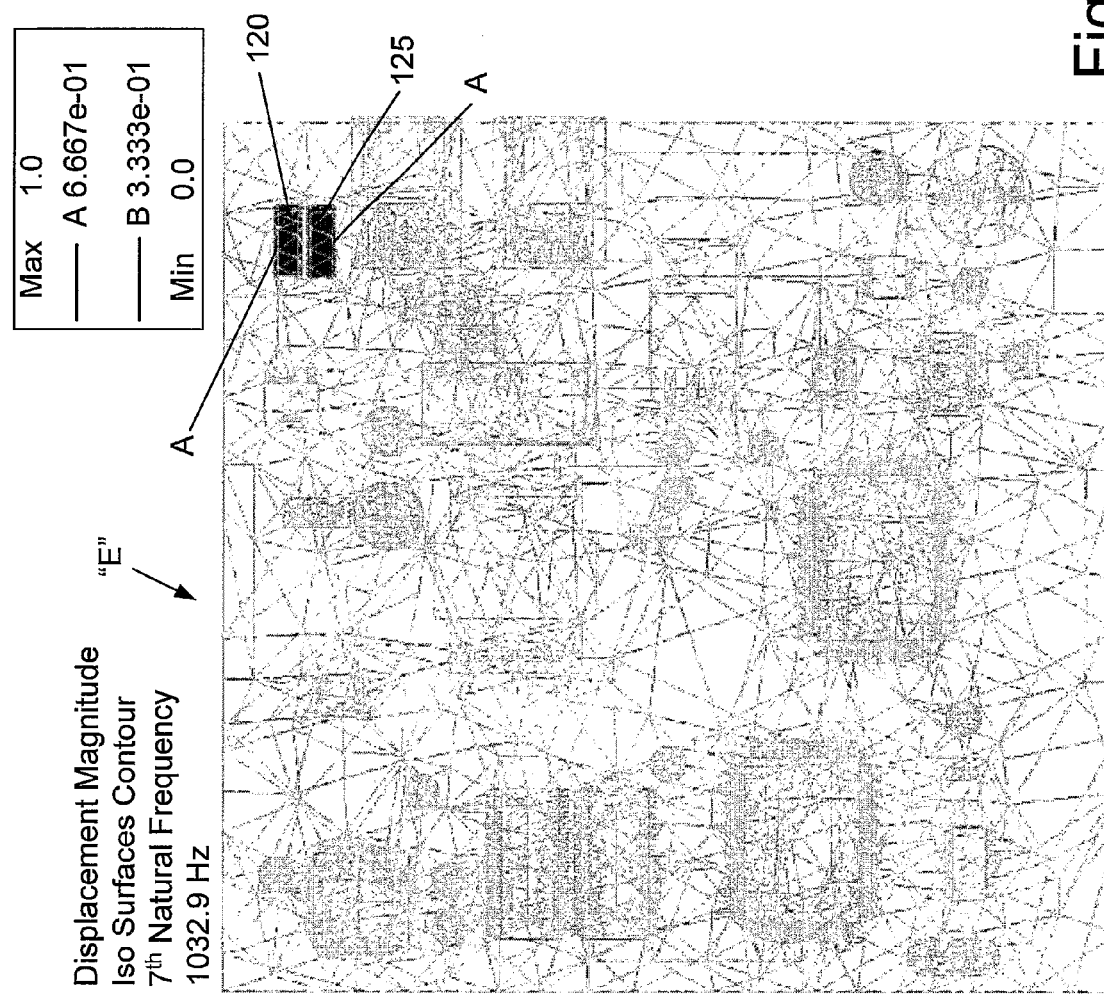
FIGS. 18a and 18b are displacement magnitude iso-surfaces views illustrating Mode Shape Type 11.
Figure 18B:
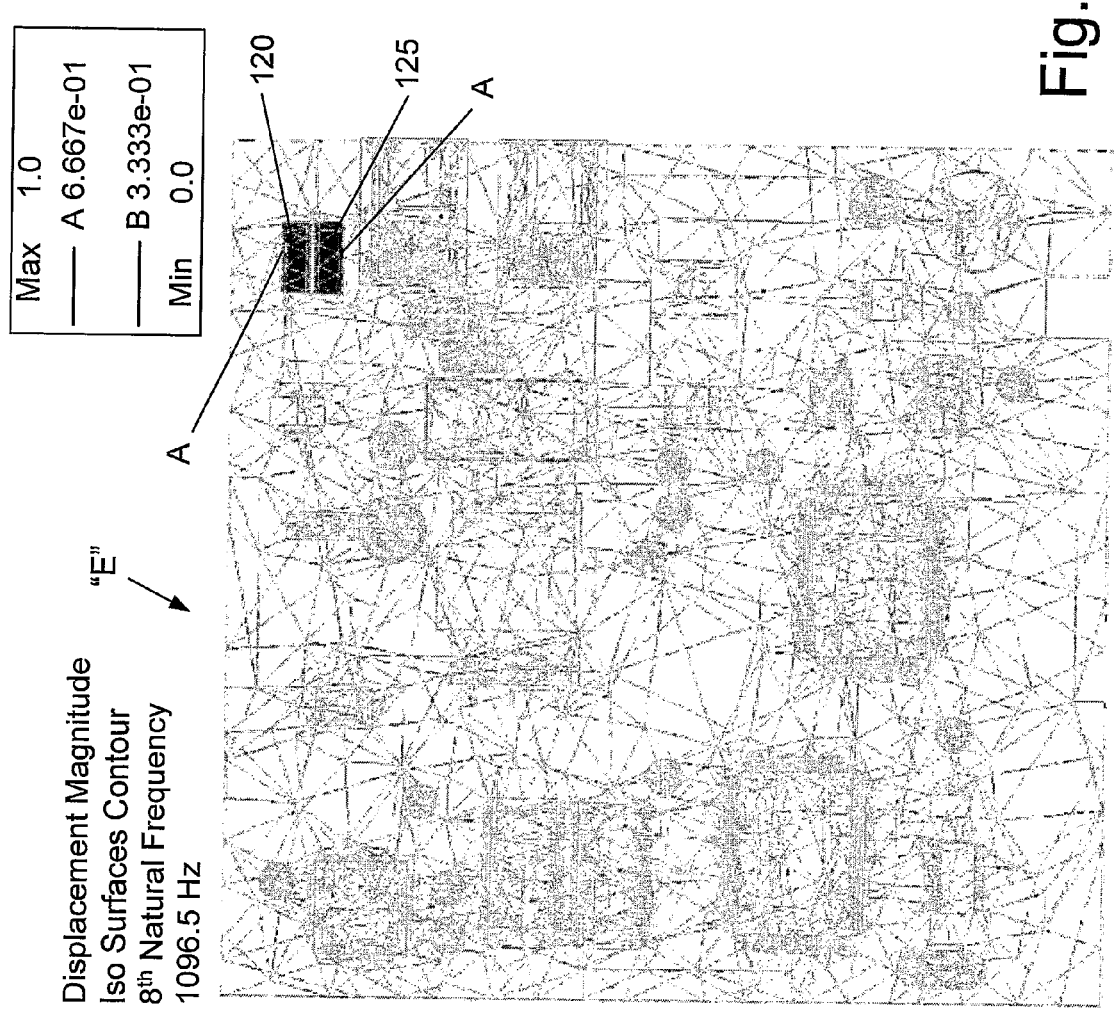

11. Mode Shape Type 11: Mode Shape Type 11 is a combination of Type 4 and Type 7. As in Mode Shape Type 7 two or more components oscillate in a pure local vibration at a certain natural frequency. However, as in Mode Shape Type 4, the same said components oscillate in a pure local vibration, yet in an additional natural frequency. It has been found that Type 11 oscillation has also a very high Threat Weight for the involved components. FIGS. 17a and 17b show a drawing of a PCB "E" in top and perspective views respectively. FIG. 17c is a picture showing the same PCB in perspective view. FIGS. 18a and 18b are displacement magnitude iso-surfaces views of two mode shapes referring to the 7$^{th}$ (1032.9 Hz) and the 8$^{th}$ (1096.5 Hz) natural frequencies of PCB "E" respectively. The figures show two components, in this case ceramic disc capacitors 120 and 125, which oscillate at a pure local oscillation Type 7 at each of said two natural frequencies.

Of course it is possible to find or define other or additional Mode Shape Types to the above list. Such additional Mode Shape Types may be, for example, a combination of one or more of the above Mode Shape Types. Of course, when defining such Mode Shape Types, it is advisable to provide a Threat Weight also to each of the additional Types.

It should be noted that all said Mode Shape Types and related figures have been taken from real PCBs that were both simulated according to the invention and tested by a laboratory HALT machine. It should be noted that the correlation between said simulation and said HALT laboratory test was extremely high. Further examples will be provided hereinafter.

b. Model Creation

Having defined once the Mode Shape Types, and as previously said, a next step is to create a finite elements model of the tested product, i.e., of the PCB assembly. More particularly, a correct, detailed and accurate finite element model of the PCB is created, wherein said model includes both the board and its components. Generally, the components leads must also be correctly represented. The importance of modeling the leads lies in the fact that in many cases the leads are the weakest part of the component, the leads elasticity is often the reason that components oscillate, and the leads often break due to fatigue. It is important to use the right types of elements in the finite elements model, for the purpose of obtaining correct representations of the components and of the board. The elements may be, for example, line elements (e.g. Bar or Beam in MSC.NASTRAN which is a very common commercial finite elements software), or surface elements (triangles or quadrants), or volume elements, or a combination of various types of elements in the same PCB model. If combining elements of different types, which do not match in number of DOF (degrees of freedom) per node (for example combining a volume element of 3 DOF per node with a line element of 6 DOF per node or with a surface element of 5 DOF per node), it might be necessary to define the mathematical relationships required between different DOFs of different elements' nodes, as known in the art (e.g. Multipoint Constraint Equations in MSC.NASTRAN), or to use other known in the art techniques to compensate said DOF mismatch problem. When choosing the meshing strategy, it is required to decide whether "h" elements (linear or parabolic) or "p" elements will be used. (The approach of the "p" method is that mesh refinement is achieved by increasing the polynomial order which defines the element shape functions and the finite elements solution. In "p" method, the mesh remains course, but each element can have more internal nodes, instead of splitting the element to smaller size elements. The approach of the "h" method is that mesh refinement is achieved by using a finer mesh, i.e. a larger number of smaller size elements with a low polynomial order. The symbol "h" refers in the art to the typical size of the element, while the symbol "p" refers in the art to the polynomial order of the element). The preparation strategy of the geometry model prior to meshing, and the meshing strategy itself, should lead to an accurate solution of the natural frequencies and mode shapes/eigenvectors analysis. A misrepresentation of components' leads might prevent finding and extracting local mode shapes of these components. A misrepresentation of the PCB in general might not lead to the accurate detailed required solution of the modal analysis. An example for a suitable element is a "p" type tetrahedron (pyramid element, 4 corners, 3 DOF per node). This element allows the creation of volume finite elements mesh that leads to a precise solution. On the other hand, an "h" type linear tetrahedron is not recommended, considering the required accuracy. The "h" type linear 4 nodes tetrahedron element is very common in many finite elements pre processors in the market, but unlike the "h" type linear 8 corner (box) and 6 corner elements (which may be used, though meshing is considerably complicated), this element is considered to be a "constant strains" element. The reason is that the shape functions of this element, which expands the solution from the nodes to the entire element space, are planar functions, i.e. the displacement solution changes linearly within the element domain (the displacement solution is defined as a linear combination of the shape functions). This leads to constant strains solutions in the element domain, because the strains are the gradients of the displacements in the axes directions. The stresses solution, which is proportional to the strains solution (obtained by multiplying the strains tensor by the matrix of the elasticity modules), is also constant within the element space. Said "h" type linear 4 nodes tetrahedron element can typically provide good static analysis displacements solution, but not accurate stress solution. Said element can also provide a good temperature solution for a thermal problem, where it will function as a constant heat flux element, however, for the natural frequencies dynamic solution, this element has a problem of "over stiffness", which means that the natural frequencies obtained by the simulation will have higher values then the real ones, even if the mesh is very fine. This is an example that illustrates why the commonly used linear 4 nodes tetrahedron element should be avoided. However, a tetrahedron element which is defined with higher polynomial orders (parabolic and up), has no such problem of "over stiffness" and linear shape functions. Thus, using a parabolic "h" type tetrahedron is a reasonable approach for obtaining an accurate and detailed modal analysis solution. A "p" type tetrahedron element is even better for obtaining said desired solution, as it has some additional advantages. First, when using "p" element, a maximal aspect ratio of 30:1 can usually be allowed without affecting the quality of the solution, comparing to a 5:1 maximal ratio usually recommended when using an "h" element. This means that the use of a "p" method leads to a more convenient meshing with a smaller number of DOFs. This is important because anyhow large models with a large number of nodes are expected while attempting to generate such detailed PCB finite elements model. Another advantage of using the "p" method, of course, is its known ability to increase the element polynomial order using an iterative automatic process, until convergence, based on a pre defined convergence criteria. This makes it easier to ensure obtaining the required accuracy level. Yet another advantage of using "p" is that the "p" element generally gives better tools for handling difficult geometry aspect ratio problems. This is important when dealing with a typical PCB geometry. For example, if using "p", a small diameter lead of a component might be represented using a single element along its cross-section, in a way that one side of the element is tangent to one outside fiber of the cross-section, while the opposite side of same element is tangent to the opposite outside fiber of the cross-section. Obviously, it is much easier to mesh this way, because the typical element can be rather large. This is allowed when using "p elements, because during the iterative process of increasing the polynomial order of the element, additional mid-nodes may be added, up to 9 nodes across the section (assuming the solver uses elements with a polynomial order up to 8), or 8 nodes across the section (assuming the solver uses elements with a polynomial order up to 7), etc. This is equivalent to an extremely fine "h" element meshing. It is obvious that the solution obtained using such "p" element can follow high gradients of strains across the cross-section, for example, from a maximal positive value of normal strain at one side, to a maximal negative value of normal strain at the opposite side. This means that the meshing process of "p" is easier, yet the solution quality maintains. All these are some considerations for selecting the optimal element types and meshing techniques, for the specific purpose of the invention.

As said, it is generally important to provide a detailed mesh of the components, including the components leads. However, a typical PCB may include components which are known to be extremely reliable. Such extremely reliable components typically may be, for example, components having a small size, a light weight, and which have a center of gravity which is very close to the board surface, for example, miniature SMT (surface mounting) resistors. If there is an extremely high probability that such a component will not fail, it is not a must to provide said detailed mesh for it. In such a case, for example, an approximate representation might be used, to provide the stiffness contribution or the mass contribution or both stiffness and mass contribution of said components to the simulated PCB. For example, a component might be represented using structural elements defining an approximate box shape (without the component leads). In another example, a component might be represented using a scalar mass element attached to a node belonging to the board's mesh. Still another example, a component might be represented using a scalar mass element attached to a node which is located at the center of gravity of the component, and the node is connected to the board mesh using a rigid body element. Yet in another example, the mesh properties (e.g., modulus of elasticity, and mass density) of the board itself might be locally (or not locally but to the entire board) altered to account for one or more of such components. Yet in another example, a component may be approximated by modeling it without modeling its leads, therefore the contact surface between the component and the board in the model is very approximated and even made to be completely different then the actual contact surface (e.g. one single rectangle-shape contact surface is modeled instead of an accurate representation of the contact surfaces between the component leads and the board), said approximation may be applied to components that based on past experience are known as having a very low potential of field failure.

A multi-layer structure of the board might be represented using, for example, laminate surface (plate) elements, or layers of volume elements. In general, different material properties, isotropic or otherwise, might be used for different parts of the mesh, even in a same component.

It should still be noted that it is possible, and in some cases it might be desirable to represent the soldering joints, either by using suitable finite elements meshing of the soldering joints and corresponding material properties, or by locally altering the properties of the board, and/or components. The same discussion is likewise applied to the coatings of one or more of the components, components leads, and the board.

Boundary conditions (constraints) applied to the model, should represent a HALT test constraints, or other constrains as desired. As known in the art, the terms "boundary conditions" or "constraints" represent herein the manner by which the board is attached to its supporting structure. Obviously, the constraints are applied to specific locations of the board. It should be noted that constraints considerations should be taken into account while creating the mesh itself in order to ensure nodes existence within the borders of the constraints locations. Constraints may be applied to nodes at some or all of these nodes degrees of freedom, in order to correctly represent the actual mounting of the simulated PCB. It should be noted that for some purposes a free body modal analysis of an unconstrained model might also be performed.

c. Performing a Natural Frequencies Simulation

After completion of the PCB modeling, the procedure continues with the step of performing the natural frequencies simulation. As said, in this step, a modal analysis of the PCB is performed, using a finite element solver, resulting in finding the natural frequencies of the model, and their corresponding mode shapes. It should be noted that such step of the procedure is well known in the art. This step is generally performed for a typical relevant predefined frequency range. The range may typically, but not necessarily cover the range used in a specific HALT test. For example, a range of 0 Hz to 2000 Hz is typical for most tests at some HALT laboratories. Thus, the simulation might be set to extract all natural frequencies and mode shapes within the range of 0 Hz to 2000 Hz. Another approach might be setting the finite elements solver to extract a predetermined number of first natural frequencies, For example, to extract the first 8 natural frequencies and corresponding mode shapes. Still another approach may be to combine said approaches, for example, to extract not less then first 20 natural frequencies and not less then all frequencies within the range of 0 Hz to 2000 Hz. It should also be noted that if a "p" solver is used, it is possible also to define at this stage the solution accuracy desired by setting the convergence criteria.

The results of said procedure of the natural frequencies simulation include all the natural frequencies in Hz within the range as predefined in the set-up. For each natural frequency, the results of said procedure also include a corresponding set of eigenvectors, defining the eigenvalue solution for displacement at each node's DOF, as well as other eigenvalue vectors, including strain energy, strains, stress, etc. It is a common practice to graphically represent a massive set of alphanumeric output of vectors. Such a representation, in the context of the present invention, will be demonstrated hereinafter.

d. Analysis and Deriving Conclusions

When the natural frequencies and mode shapes are found within the predefined spectrum, the procedure is ready for the final step of analysis and deriving conclusions. As said, in this step for each natural frequency and corresponding mode shape found in the simulation, a comparison is made with the set of predefined Mode Shape Types, to find matching between each of said found mode shapes and a Mode Shape Type. By finding such a match, the corresponding Threat Weight is also found. The collection of all the mode shapes Types, which correspond to all the mode shapes found in the simulation, point to all the vulnerable components. The term "vulnerable components" refers to components that might fail due to design weakness of the PCB, for example, a field failure, or a failure during a HALT test.

To summarize, the step of analysis and the deriving of conclusions comprises of two sub-steps, as follows: (a) the comparison and finding of matched Mode Shape Types, and corresponding component or components having a significant Threat Weight; and (b) the creation of a total list or graphical representation summarizing all the components, if any, having a significant Threat Weight as found. It should be noted that both of these sub-steps (a) and (b) can be performed either automatically by means of software examining the relevant eigenvectors, or by visually examining the graphical representations of mode shapes.

It should be noted that it is possible to limit the analysis and the deriving of conclusions to the finding of the first predefined number of components having a relatively high potential of field failure, for example, to the finding of the first four components having a mode shape matched with Mode Shape Type 3 (which as said has a very high Threat Weight) or with other Mode Shapes Types that have even higher Threat Weight (such as Mode Shape Type 4). Suppose that in this example, the first four components having Threat Weight as of Type 3 or higher Threat Weight are found after examining the mode shapes of the first 7 natural frequencies. In this case the mode shapes of the $8^{th}$ natural frequency, and up, will not be examined. Still Another example: finding the first two components having a Threat Weight of Type 4 or higher Threat Weight.

To summarize, the number of components to be identified using the invention may be limited by using one limitation or a combination of two or more limitations as follows:

a. limiting the frequency range of the natural frequency simulation;

b. limiting the natural frequency simulation to a predetermined number of first natural frequencies; and c. limiting the method results to the finding of the first predetermined number of components having a relatively high potential of field failure.

So far, during the detailed description of the invention, the mode shape and Mode Shape Types were referred to as relating to displacements. In a more specific manner, these terms were referred to as relating to a spatial displacement i.e. the displacement magnitude deformed shape. However, it should be noted that:

a. It is possible, and in some cases useful, to examine mode shapes and corresponding Mode Shape Types referring to displacement vectors in one specific degree of freedom, e.g., $T_x$—translation along x axis only. Yet in another example, $R_y$—rotation about y axis.

b. It is possible, and in some cases useful, to examine mode shapes and corresponding Mode Shape Types referring to a combination of displacements or rotations vectors, e.g., displacement within a selected plane, e.g., xy plane. In this example, the displacements to be examined for each node will be calculated as $\sqrt{d_x^2+d_y^2}$, wherein $d_x$ indicates a displacement of the node in x direction, and $d_y$ indicates a displacement of the node in y direction. In this example the displacement along z axis is ignored. The use of such technique may in some cases increase the sensitivity of the observations, and reveal some vulnerable components that cannot be observed otherwise.

c. As said, so far the terms "mode shape" and "Mode Shape Type" were referred to as relating to displacements. However, it should be noted that in a similar manner these terms may likewise relate in the context of the present invention to other eigenvectors resulting from the natural frequencies simulation. Such vectors may be, for example but not limited to, strain or stress eigenvectors. In such a case, corresponding sets of Mode Shape Types referring to various stress vectors, strain, strain energy, etc. are defined. Thereafter, the analysis will match the observed mode shapes (for example stress "mode shape") to the corresponding Mode Shape Types. Such stress "mode shape" can be graphically presented in a similar way to a deformation mode shape, for example with known in the art software tools, using iso-surfaces or varying color views where different colors refer to different stress value ranges. It is even possible to graphically present a "deformed shape", by representing the stress levels values (which are normalized between zero and one and then multiplied by a scale factor in order to make the deformed shape visible) with equivalent deformation values at a specific direction (e.g. normal to the board original plane). It is possible to think of these equivalent "deformed shapes" as a virtual oscillation or vibration, which represents cycle changes—not displacement cycles—but cycles of other physical parameters such as stress in this example. Therefore the term "oscillation" in the context of the present invention refers not only to displacement oscillations, but also to stress oscillations, strain oscillations, etc. It has been found by the inventor that in some cases, and for certain types of components, it is useful to implement the method of the present invention with said stress "mode shapes", strain "mode shapes", etc. The procedure remains essentially the same, i.e., the HALT test simulation or a more general components failure-prediction simulation is made by a relatively simple post processing analysis of the natural frequencies and eigenvectors simulation. Just as for stress, same concept is valid for strain "mode shapes", strain energy "mode shapes", etc. For example, a Mode Shape Type 3 in terms of strain oscillations (or strain "mode shapes") may refer to very high strain values at a lead or leads of a single component or at the connection of said lead with the board, while the strain values at all other locations within the model are zero or relatively very small. Therefore, throughout this application, the terms "mode shape" and "Mode Shape Types" can be interpreted in this broader context (i.e., these terms may relate to analysis according to the invention of any or all eigenvectors and combinations of eigenvectors, e.g. strain, stress, etc., and not limited to displacement).

d. The method of the invention may be performed in any of the said forms, i.e., the basic form as described, any of the optional forms (a), (b), or (c) above, or any combination of said four forms.

It should be noted that vibration is the basis for laboratory HALT procedures, and that vibration is the main cause for components failure. However, HALT includes thermal loads as well, both steady state cold and hot steps, and rapid thermal transitions. The method of the invention, as described, provides excellent results, both in the context of HALT simulation, and in the more general context of reliability simulation not relating to the laboratory procedure known as HALT, even without considering thermal aspects. However, thermal aspects can be easily added to the method of the invention. The finite element model used for the invention, as described previously, is suitable for a thermal stress simulation, assuming the coefficient of thermal expansion is defined for each of the model materials. Actually, said model is "overqualified" for the thermal stress simulation, as the mesh requirements for the natural frequencies simulation are much higher. Therefore, the thermal aspects can be added to the method of the invention. This can be done in several aspects. For example, in one aspect of considering the thermal issue, a pre stress analysis can be performed, to compute the thermal stress. Then, the natural frequencies simulation can be performed using the pre-stressed model, with its updated stiffness matrix. Another thermal aspect may involve the direct update of the material properties, prior to running the natural frequencies simulation. For example, the modulus of elasticity of certain materials which varies with temperature may be updated to represent the temperature in which the model is simulated for finding the natural frequencies. It should also be noted that an extra refinement to the consideration of the thermal stress aspects can be achieved by first performing accurate thermal analysis for the purpose of mapping the actual temperature of each node of the model. This can be done having the thermal properties, thermal boundary conditions and thermal loads applied to the model. To summarize: thermal aspects of HALT can be applied to the method of the invention, however it is often unnecessary. It should be noted that one of the main contribution of thermal loading to a laboratory HALT test is that it reduces the time to failure, e.g. a component would fail after 20 minutes of vibration, if thermal load is applied, instead of after 25 minutes of vibration with no thermal load. This explains one main reason why said thermal aspects may often be considered unnecessary in the analysis according to the present invention: The analysis according to the invention recognizes directly (and not via time related excitations) the relevant mode shapes and corresponding Mode Shape Types, with a high Threat Weight of specific components. Time is not a parameter in the analysis according to the invention. Therefore the time saving gained during a laboratory test of HALT by including thermal loads is irrelevant to the invention. HALT laboratory test often utilizes thermal loads for the purpose of increasing the test sensitivity in terms of identifying failure of components sooner. It is therefore an advantage of the invention that it may represent a relatively long lasting HALT test or a severe-conditions HALT test involving high GRMS (Root Mean Square acceleration values in g units) vibration combined with thermal loads, and it is therefore an advantage of the invention that it can be sensitive in terms of identifying failure of components without necessarily involving thermal influence.

It should be noted that the fact that damping is not represented in the eigenvalue solution, and therefore is not taken into consideration during components failure prediction according to the method of the invention is not a problem in the context of the invention, because: (a) damping is not significant in random vibration and therefore is not significant in HALT (unlike frequency response problems where it is extremely significant); and (b) the lack of damping consideration anyway increases the sensitivity of the solution to identify design weaknesses.

It should also be noted that the invention may be applied in a simplified version in which only a single level of a high Threat Weight is defined, which refers to the existence of a Mode Shape Type 3 Family. A Mode Shape Type 3 Family is referred herein as a mode shape which can be identified as having a local dominant mode of vibration or oscillation of a specific component or components of the PCB. Therefore, the Mode Shape Type 3 Family includes the group of Mode Shape Types 3-11 as defined above (or equivalent other Mode Shape Types that may be defined according to the invention). All components identified as having a Type 3 family mode shape will be considered as component expected to have field failure problems.

EXAMPLE 1

Figure 19:
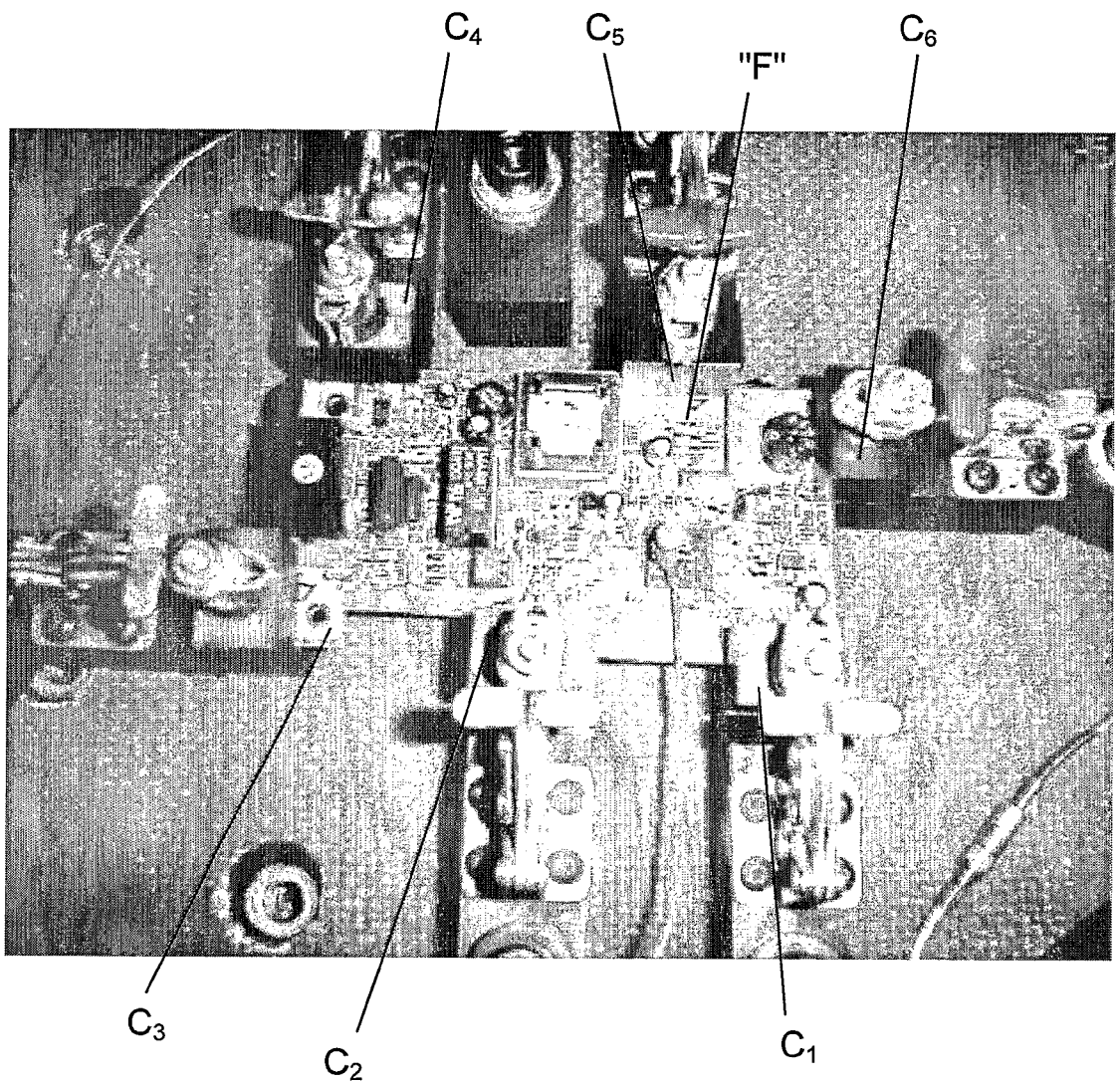
FIG. 19 shows the PCB "F" mounted to a laboratory HALT machine, as simulated in the simulation of Example 1.

A HALT test of a printed circuit board assembly (PCBA) marked as "F" was performed in a laboratory and was also simulated according to the invention. FIG. 19 is a photograph showing PCB "F" mounted to a HALT table of a HALT test machine manufactured by Screening System Inc. in a manner in which PCB "F" was simulated.

Figure 20A:
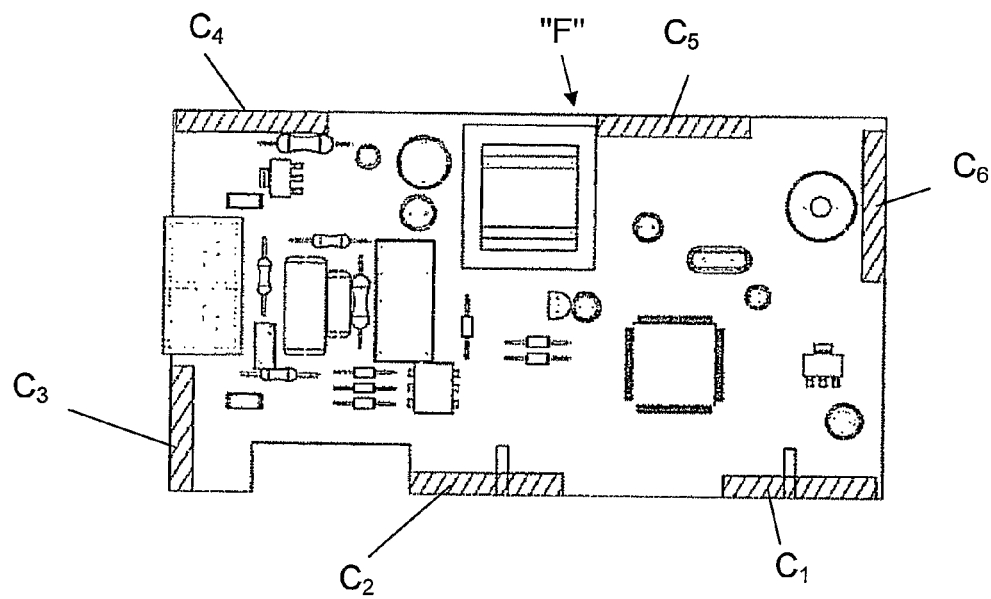
FIGS. 20a and 20b show the drawing of PCB "F" in top and perspective views respectively.
Figure 20B:
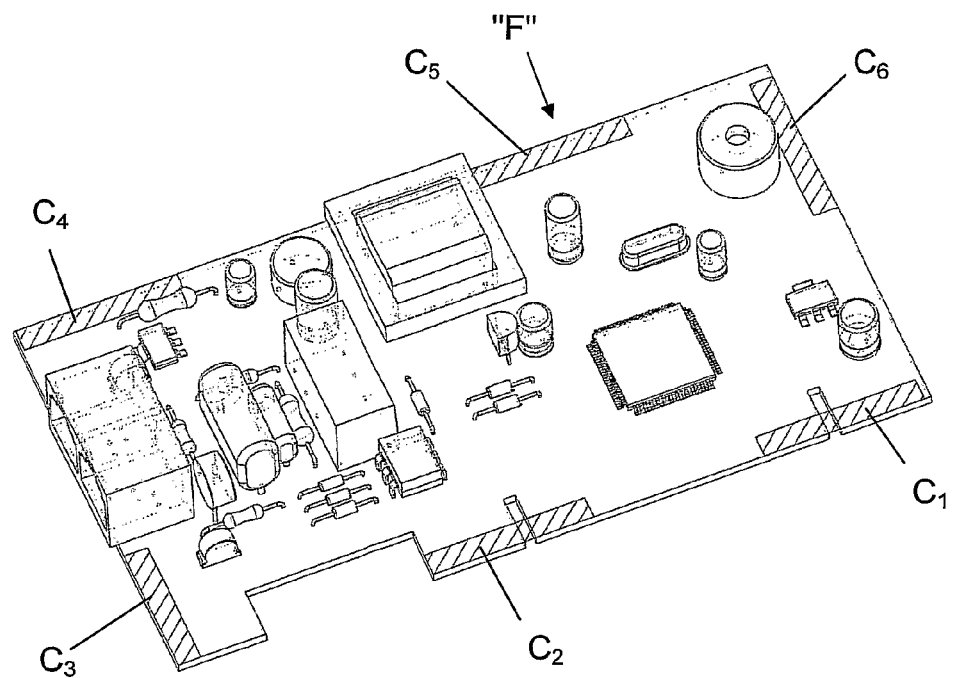
Figure 21:
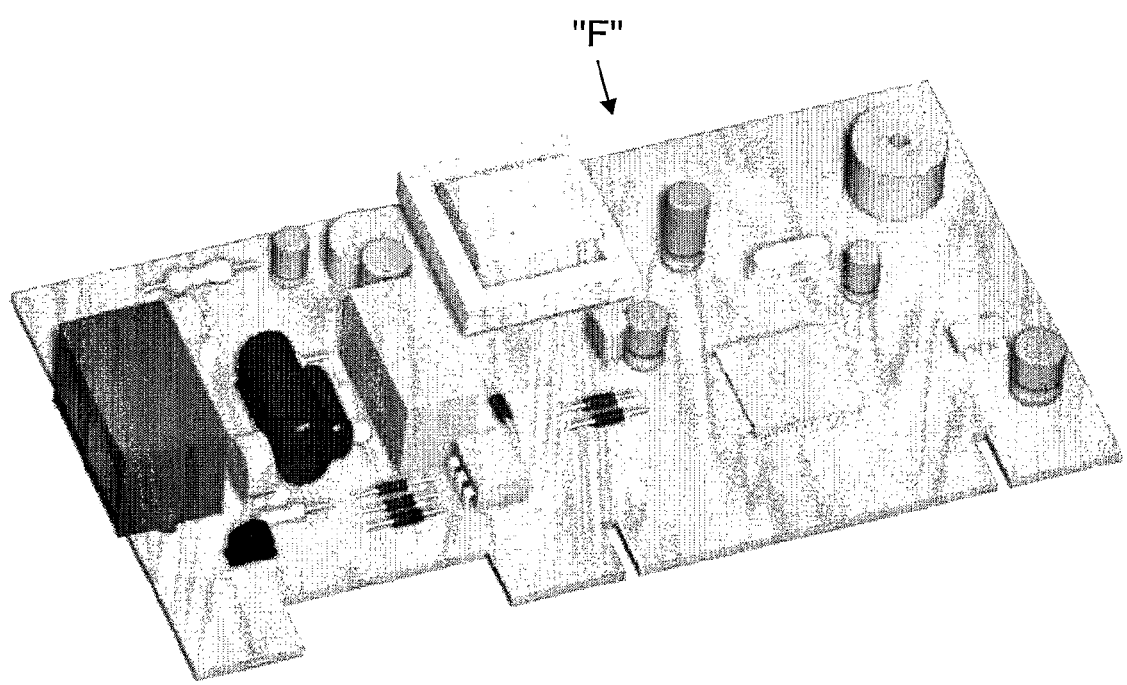
FIG. 21 is a picture showing the same PCB "F"

In order to simulate the PCB "F" for HALT according to the present invention, a 3D solid model of the board and its associated components was created. Then, a solid model of the entire assembly was generated. FIGS. 20a and 20b show the drawing of the solid model of PCB "F" in top and perspective views respectively. FIG. 21 is a picture showing same solid model of PCB "F".

Next, a finite element mesh for the entire assembly (of PCB "F") was created. In this example, all the components, as well as the board itself, were meshed using a volume tetrahedral "p" element with 3 translational degrees of freedom per node. The mesh polynomial order was set to start from 3 and to increase up to 9 as required, based on convergence criteria. Material properties of the model, representing the correct Young Modulus, Poisson's Ratio, mass density etc., of the board and each of the components, including the correct properties for the components leads were also added.

In the next step the boundary conditions were applied to the model. Said boundary conditions represented the constraints that were applied by the machine table jigs to the PCBA during the HALT laboratory test. The jigs are those shown in FIG. 19, and marked as $C_1$ to $C_6$. The six areas of the board to which constraints were applied in the model are indicated by cross hatching in the PCBA drawing of FIGS. 20a and 20b, and also marked as $C_1$ to $C_6$. Each of said areas is rectangular. The mesh included a node at each corner of said rectangular areas. A 3 degrees of freedom constraint (all translation DOFs) was applied to these nodes (24 nodes, i.e., 6 areas, 4 corners in each area). The entire mesh of said model consisted of 18259 elements, and an initial amount of 334875 equations, referring to 334875 degrees of freedom (initially, all the elements' polynomial order was 3).

Figure 22A:
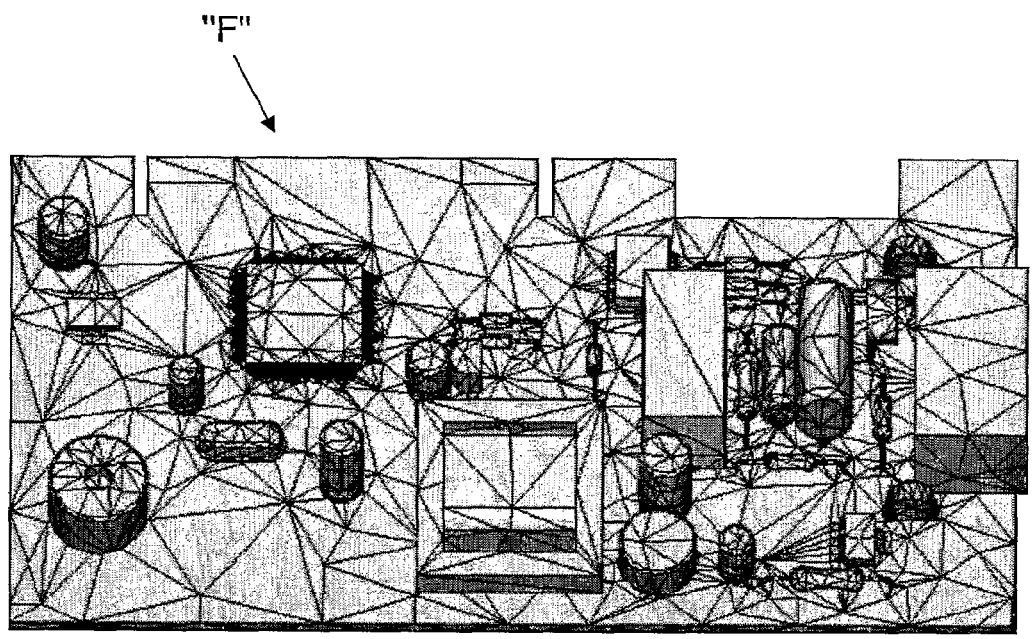
FIG. 22a illustrates a finite element "p" mesh of the model of example 1.
Figure 22B:
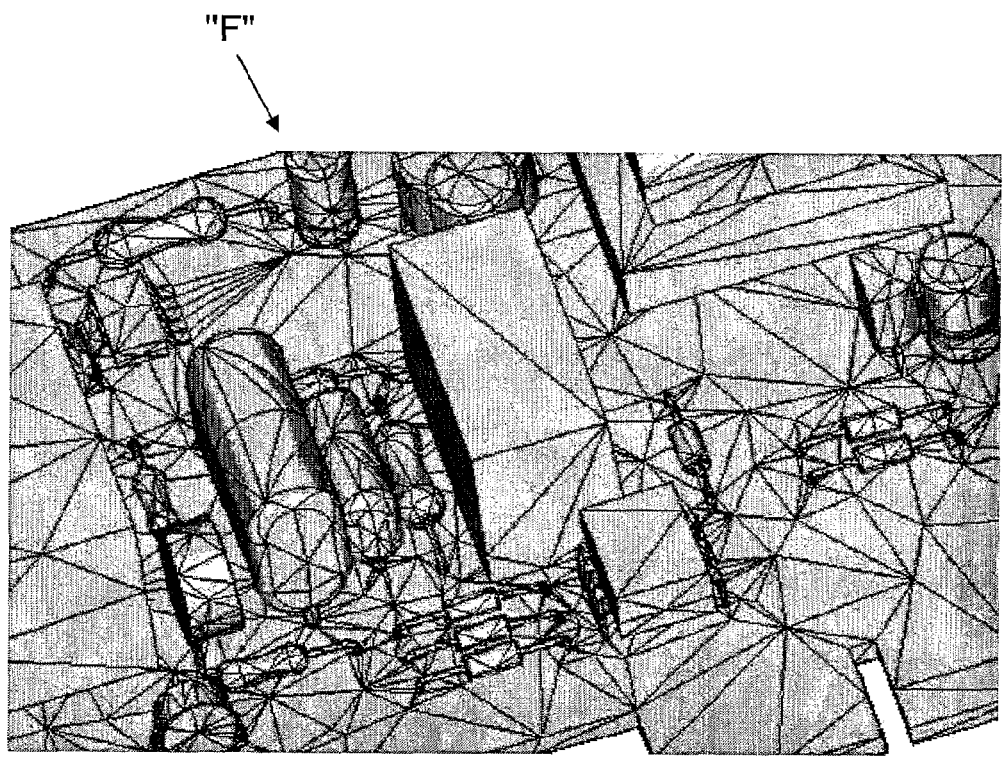
FIG. 22b is an enlarged view of a portion of this model.

A Pro/Mechanica solver (by Parametric Technology Corporation) was set to extract all natural frequencies at a range of 0 [Hz]-1500 [Hz], which was the required, predefined frequency spectrum. The convergence criterion was set to be 1% for all natural frequencies within said range. A convergence was obtained at a maximal polynomial order of 5, and a total of 385867 equations. FIG. 22a illustrates the finite element "p" mesh of the model. FIG. 22b is an enlarged view of a portion of this model.

Figure 23A:
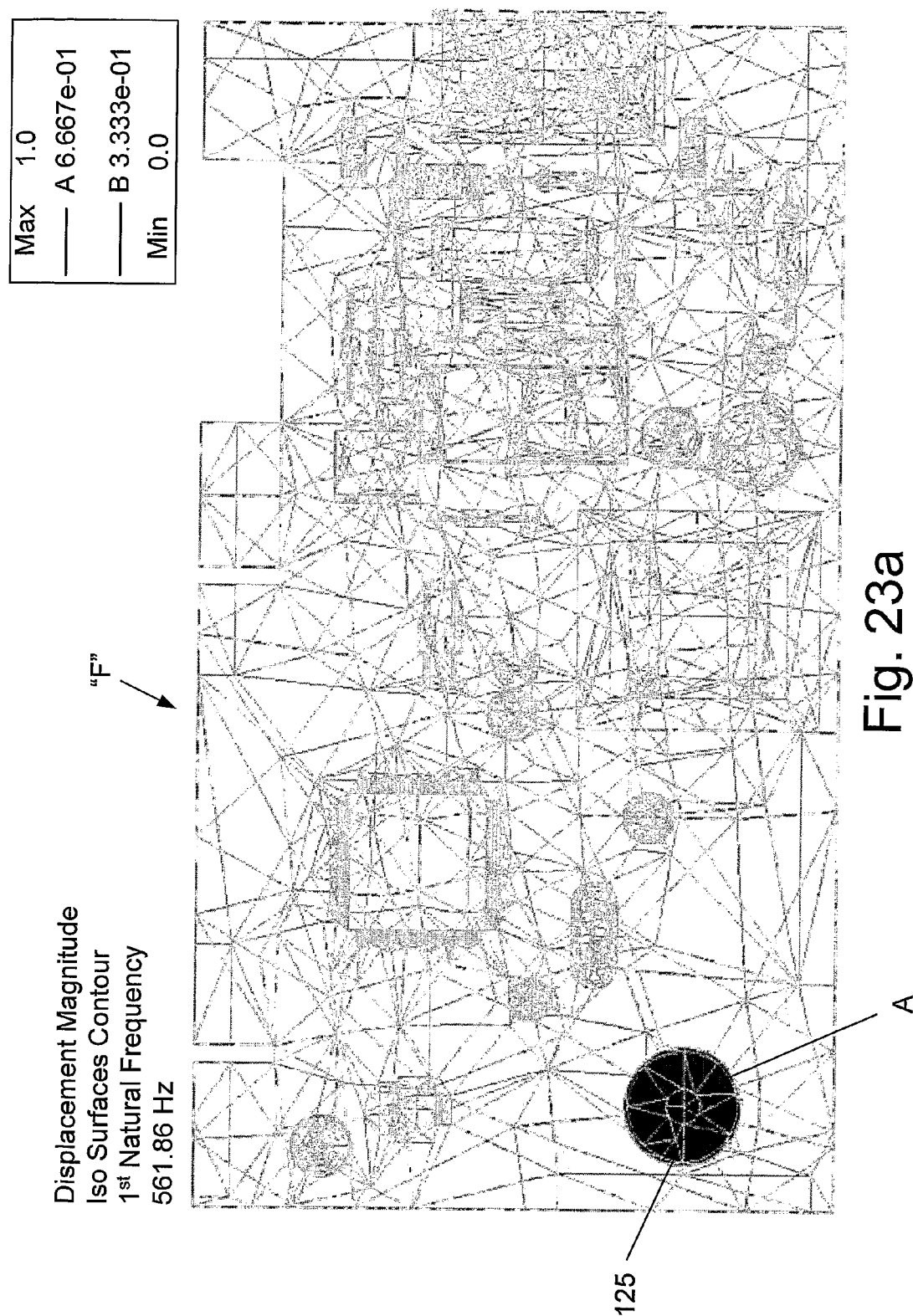
FIG. 23a is a displacement magnitude iso-surfaces view.
Figure 23B:
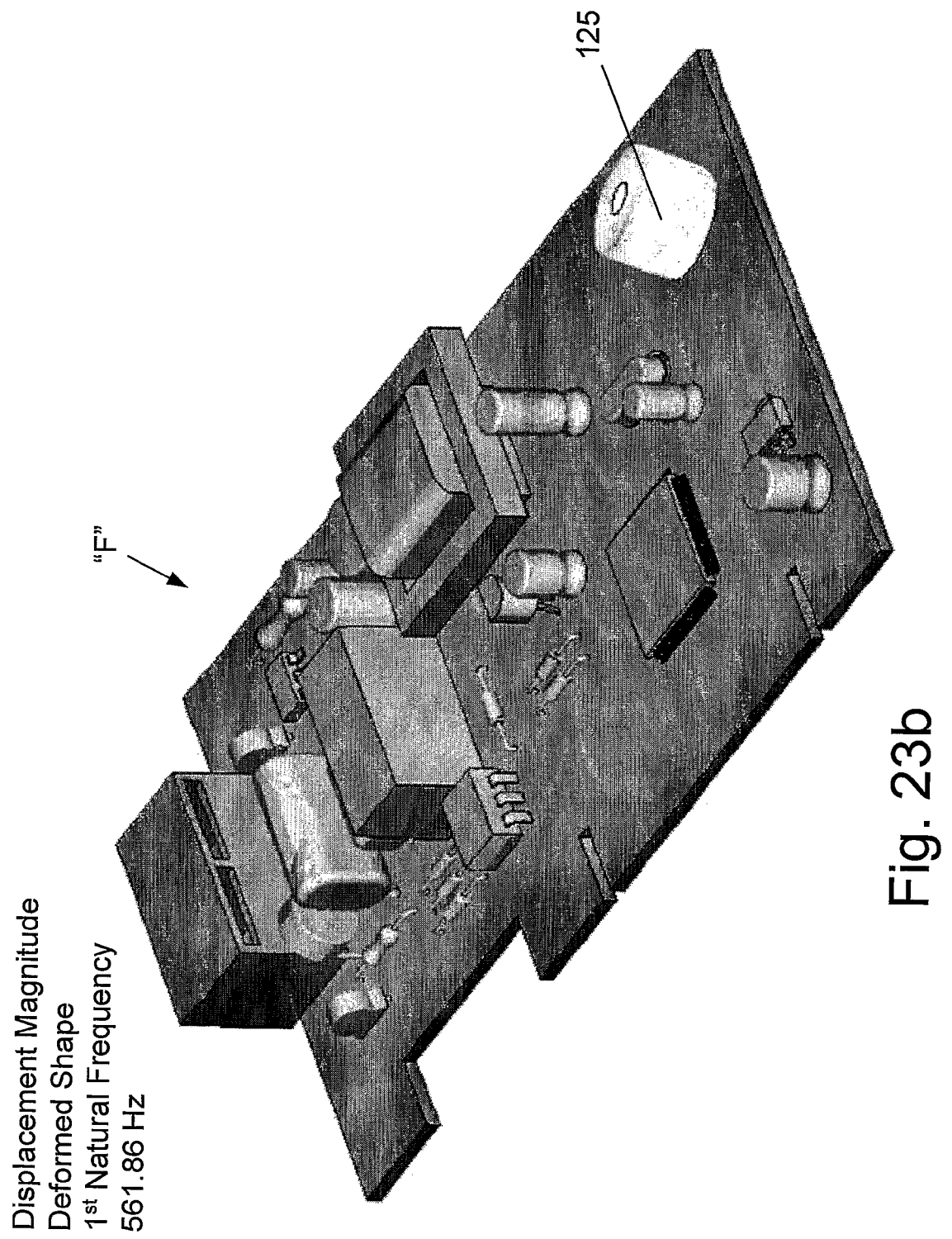

Next, a picture of the mode shape amplitude for the total 3D translation of the model for each of the natural frequencies was obtained. The $1^{st}$ natural frequency, 561.9 [Hz] has been found to be a pure local mode of Type 3 of a component marked as component 125—which is a speaker (see FIG. 23a). FIG. 23a shows a displacement magnitude iso-surfaces mode shape view of said $1^{st}$ natural frequency of said PCB "F". Border A indicates an iso-surfaces contour having a 66.6% of the maximal displacement magnitude. FIG. 23b is a displacement magnitude deformed shape view of the same $1^{st}$ natural frequency mode shape and FIG. 23c is an enlarged view focusing on the region of component 125.

Figure 24:
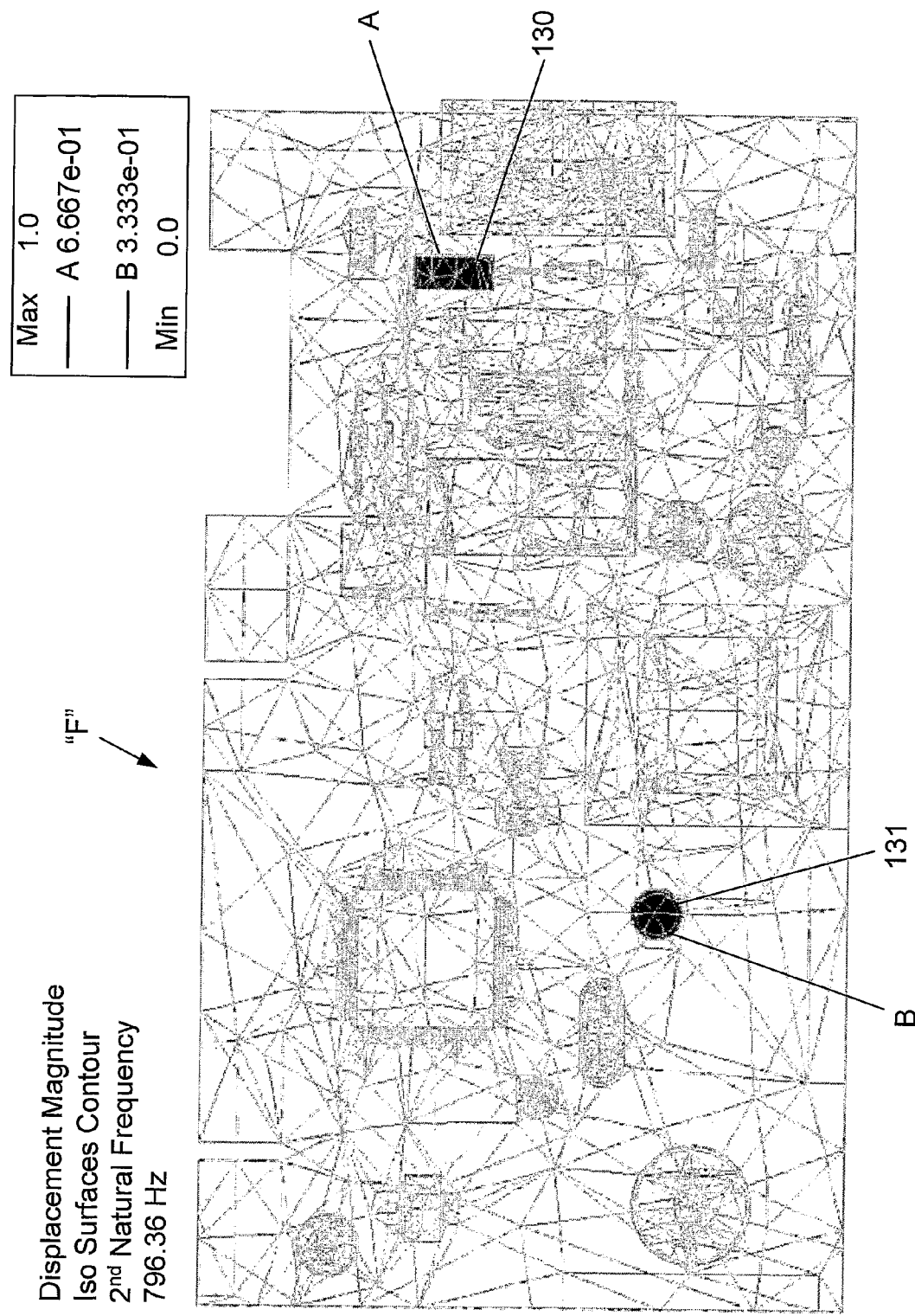
FIG. 24 is a displacement magnitude iso-surfaces view relating to mode shape of the second natural frequency of PCB "F"

As shown in FIG. 24, in the $2^{nd}$ natural frequency, 796.4 [Hz], a Mode Shape Type 8 with a pure local displacement of a component 130, which is a ceramic disc capacitor, together with a pure local displacement, though less dominant, of a component 131, which is an aluminum electrolytic capacitor, was found. The border A which is located on the outline of component 130 indicates that the displacement magnitude of this component is in the range of 66.6% to 100% of the maximal displacement magnitude of said natural frequency mode shape. Likewise, the border B which is located on the outline of component 131 indicates that the displacement magnitude of this component is in the range of 33.3% to 66.6% of the maximal displacement magnitude of said natural frequency mode shape.

Figure 25A:
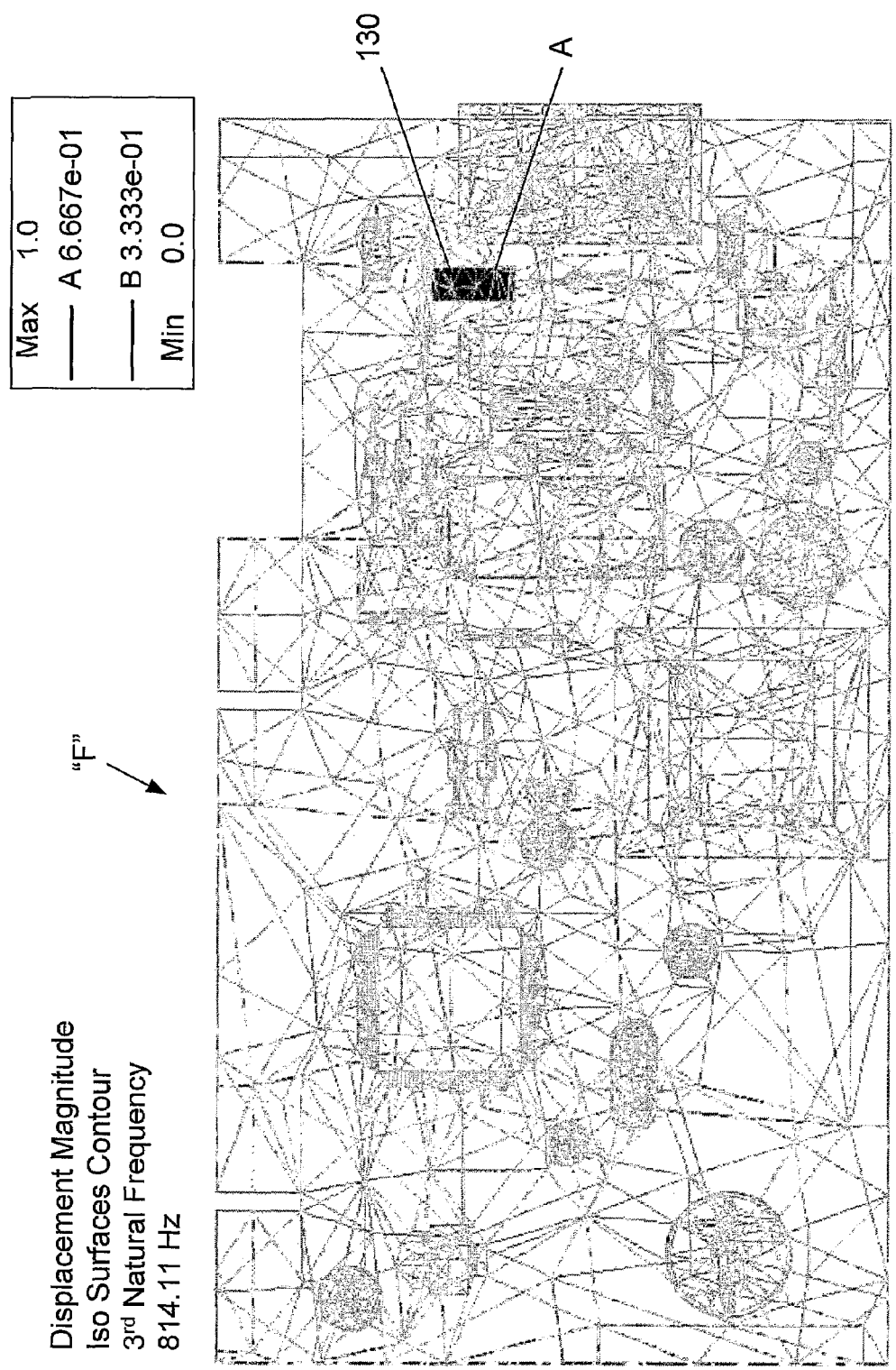
FIGS. 25a and 25b are mode shape views relating to the third natural frequency of PCB "F"
Figure 25B:
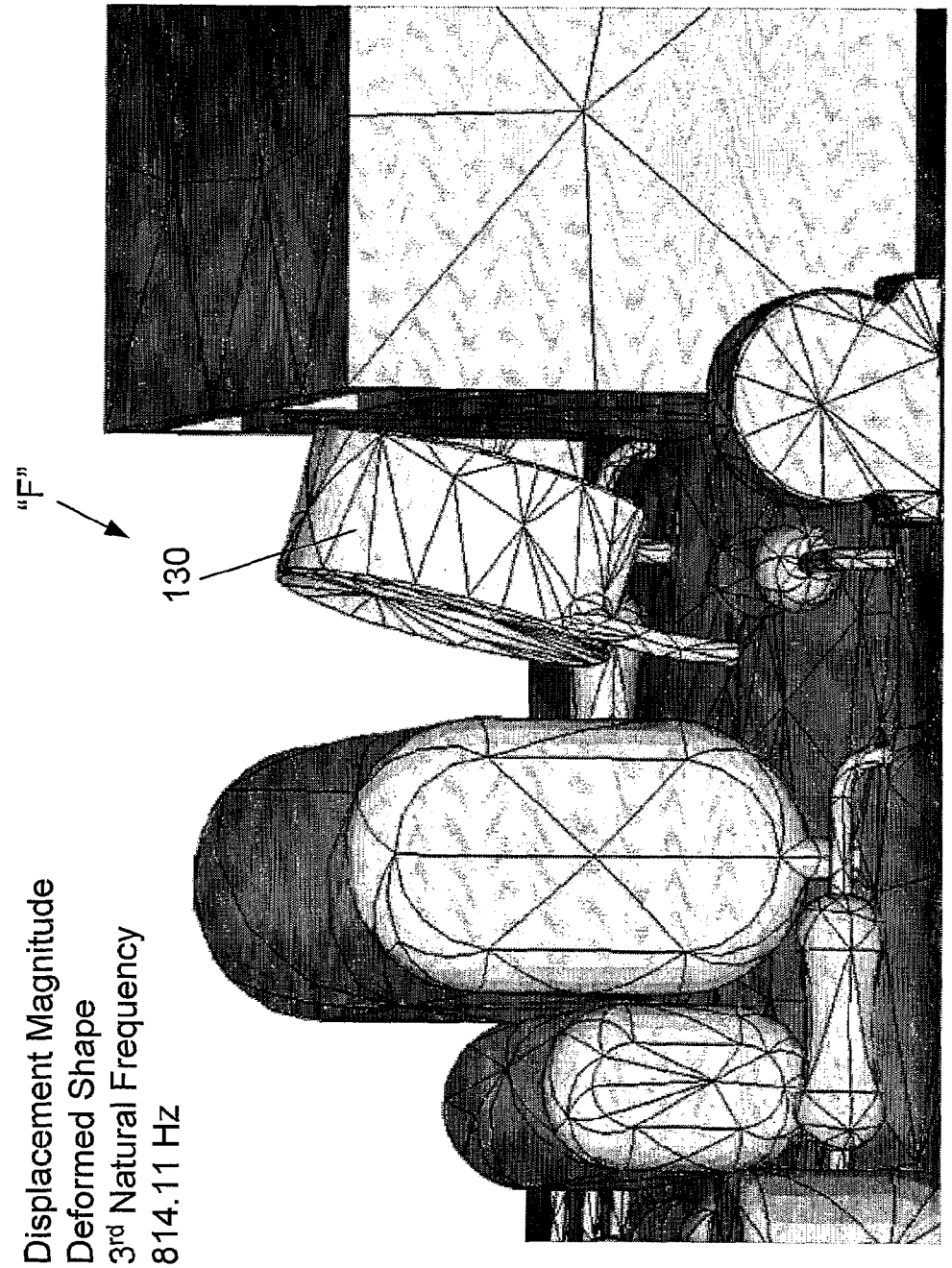

As shown in FIGS. 25a and 25b, in the $3^{rd}$ natural frequency, 814.1 [Hz], a pure local vibration of Mode Shape Type 3 of component 130 was found. With respect to component 130, and together with the previously discussed $2^{nd}$ natural frequency mode shape, this is by definition a Mode Shape Type 10.

Figure 26:
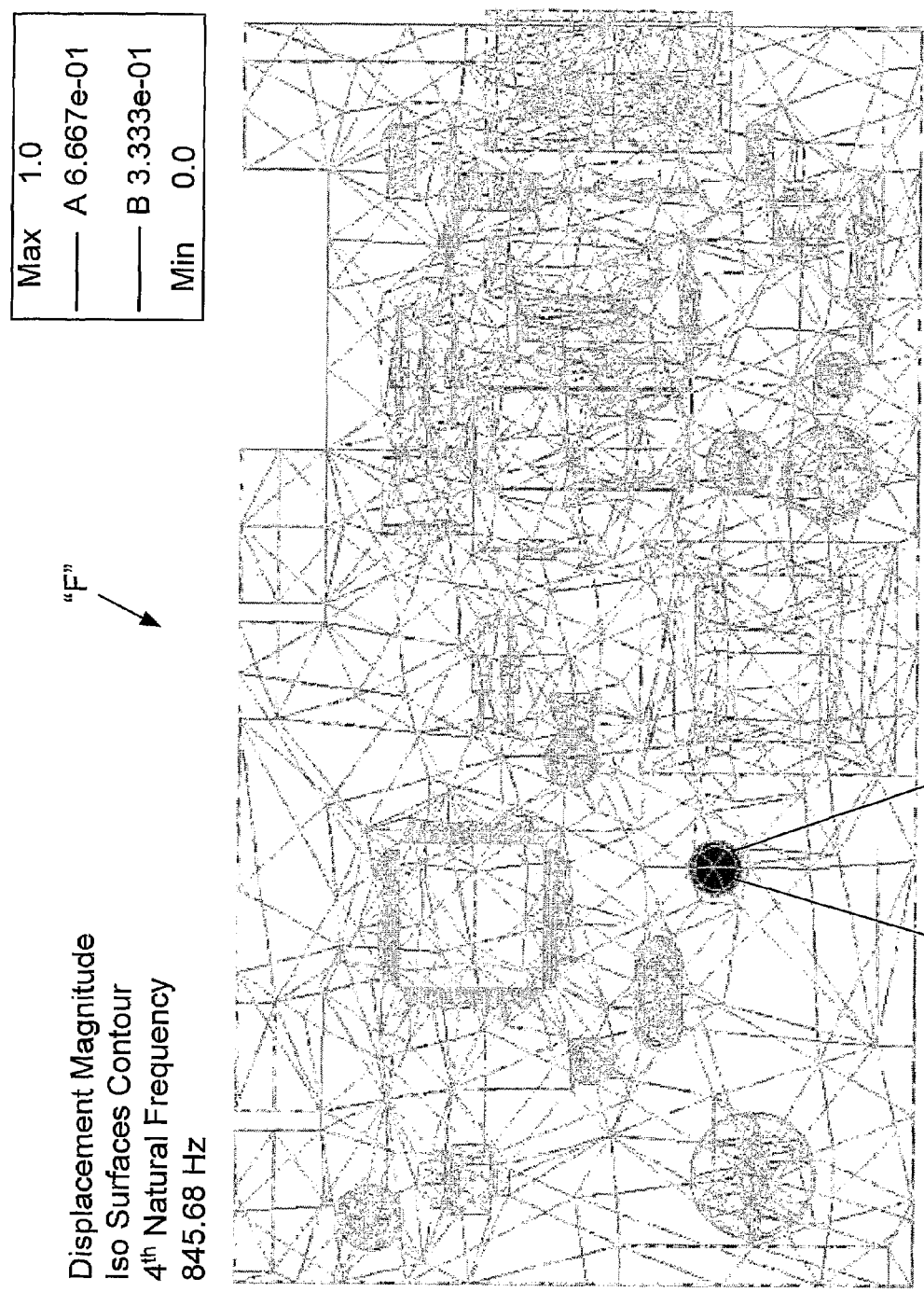
FIG. 26 is a mode shape view relating to the fourth natural frequency of PCB "F"

As shown in FIG. 26, in the $4^{th}$ natural frequency, 845.7 [Hz], a pure local vibration of Mode Shape Type 3 of component 131 was found. With respect to component 131, and together with the previously discussed second natural frequency mode shape, this is again by definition a Mode Shape Type 10.

Figure 27A:
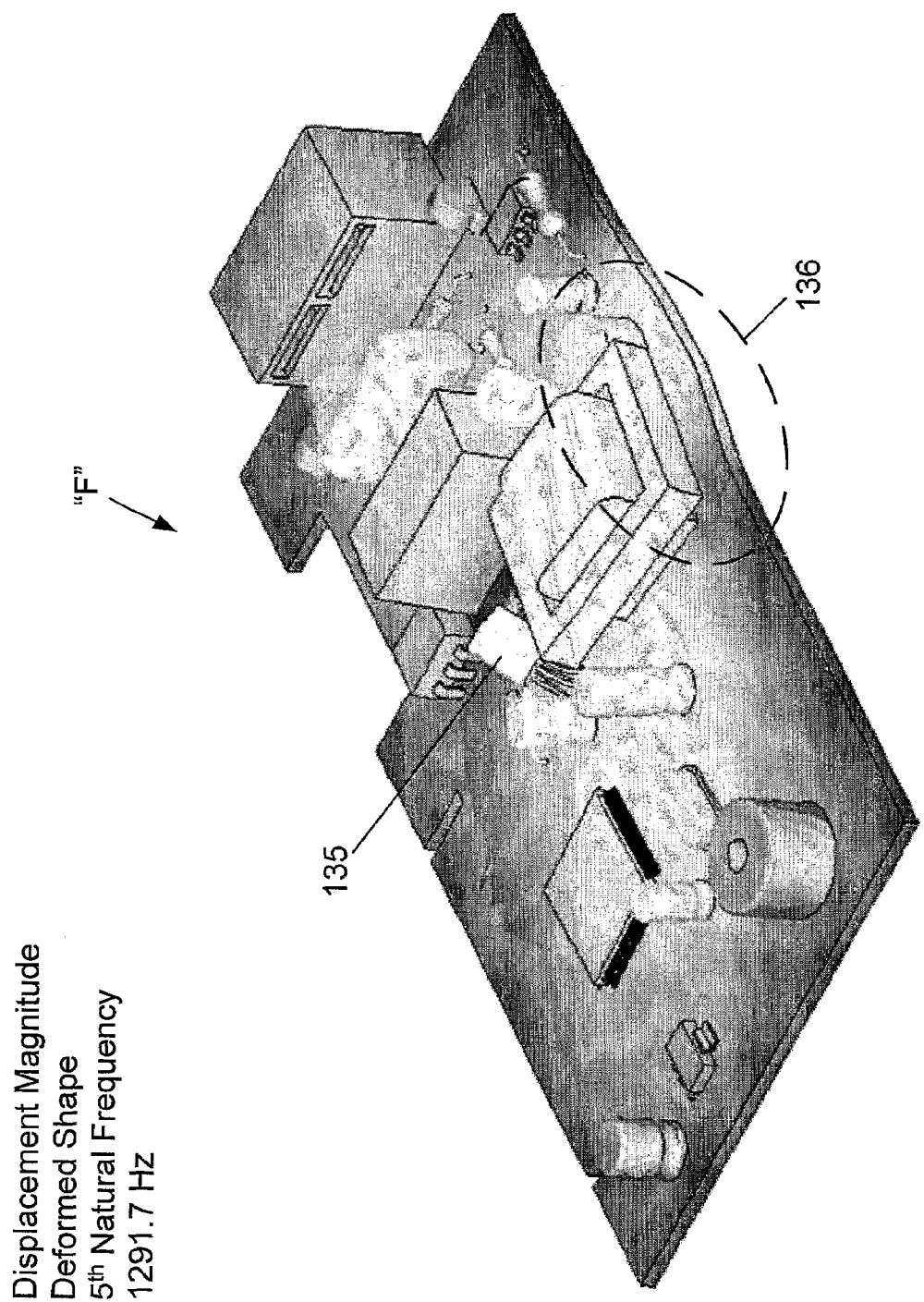
FIGS. 27a and 27b are mode shape views relating to the fifth natural frequency of PCB "F"
Figure 27B:
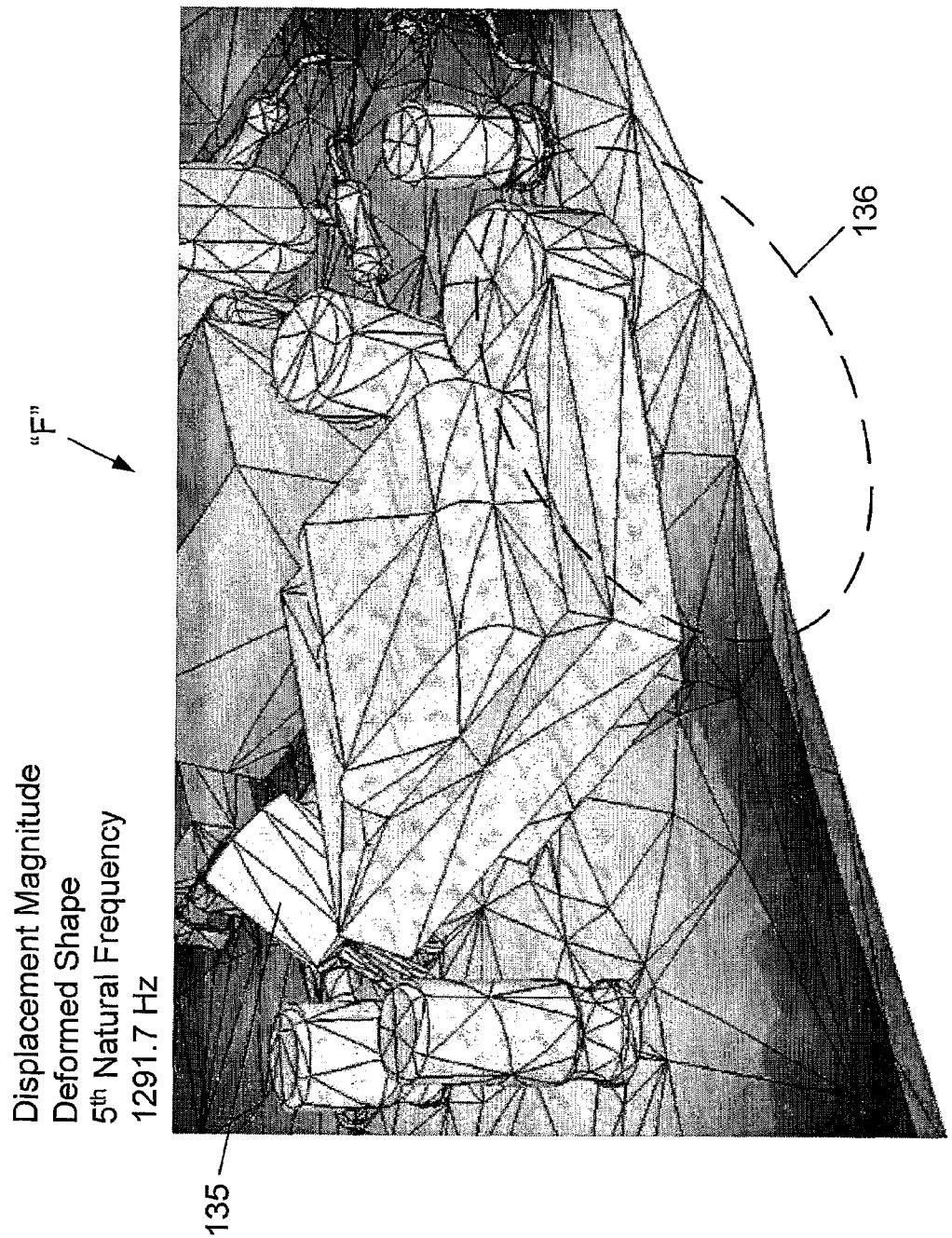

As shown in FIGS. 27a and 27b, in the $5^{th}$ natural frequency, 1291.7 [Hz], a Mode Shape Type 6 vibration was found. As shown, component 135, which is a transistor, vibrates in a dominant local vibration (which is by itself, i.e., if isolated, could be considered as a Type 3 mode shape), and region 136 of PCB "F" vibrates in a general (non-local) vibration (which is by itself i.e., when isolated, a Type 1 mode shape).

Figure 28A:
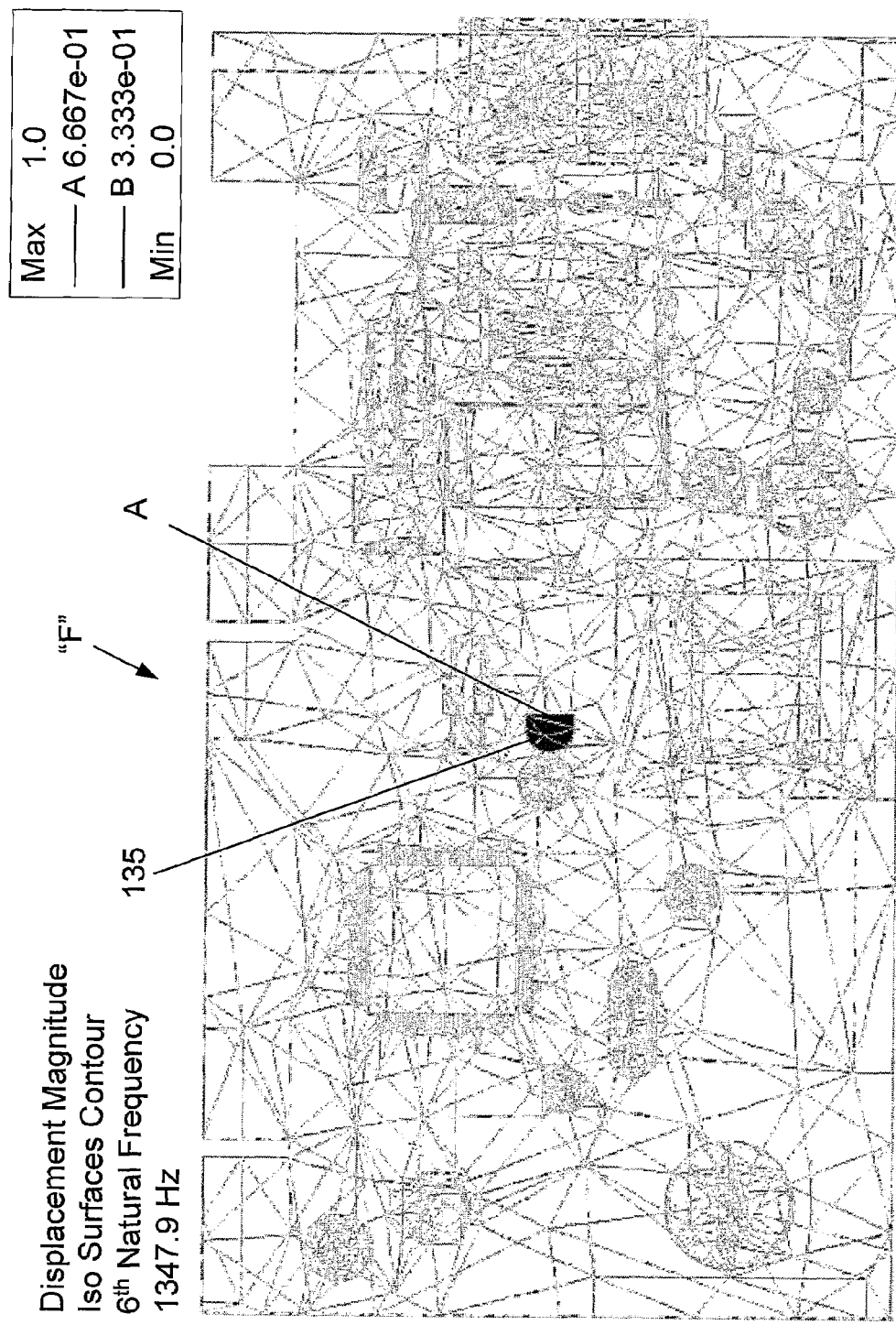
Figure 28B:
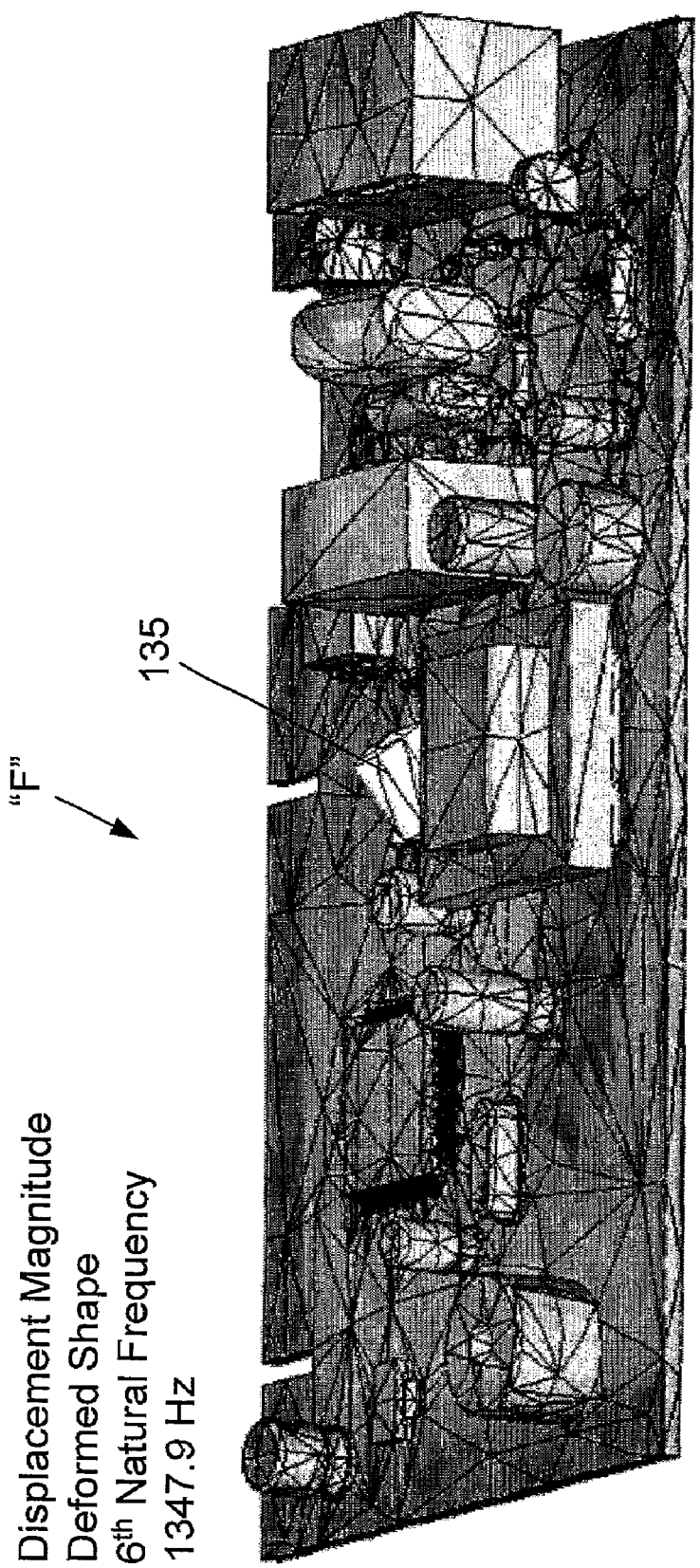

As shown in FIGS. 28a and 28b, in the $6^{th}$ natural frequency, 1347.9 [Hz], a pure local vibration of Mode Shape Type 3 of component 135 was found. With respect to said component 135, and together with the previously discussed $5^{th}$ natural frequency mode shape, this is by definition a Mode Shape Type 9.

This is the last mode shape (i.e., the last natural frequency and corresponding mode shape) in the scanned frequency range. The results of the simulation according to the invention are summarized in Table 1.

TABLE 1

PCB "F"

| Natural Frequencies in which a failure has been identified | | Mode Shape Type | Components that were identified by the simulation |
|---|---|---|---|
| [Hz] | Frequency Number | | |
| 561.8 | $1^{st}$ | 3 | 125 |
| 796.4 | $2^{nd}$ | 8 | 130 |
| 814.1 | $3^{rd}$ | 3 | |
| 796.4 | $2^{nd}$ | 8 | 131 |
| 845.7 | $4^{th}$ | 3 | |
| 1291.7 | $5^{th}$ | 6 | 135 |
| 1347.9 | $6^{th}$ | 3 | |

To Summarize:

Component 125: Threat Weight Type 3.

Component 130: Threat Weight Type 10 (defined as a combination of Mode Shape Type 8 and Mode Shape Type 3).

Component 131: Threat Weight Type 10 (defined as a combination of Mode Shape Type 8 and Mode Shape Type 3).

Component 135: Threat Weight Type 9 (defined as a combination of Mode Shape Type 6 and Mode Shape Type 3).

Figure 29:
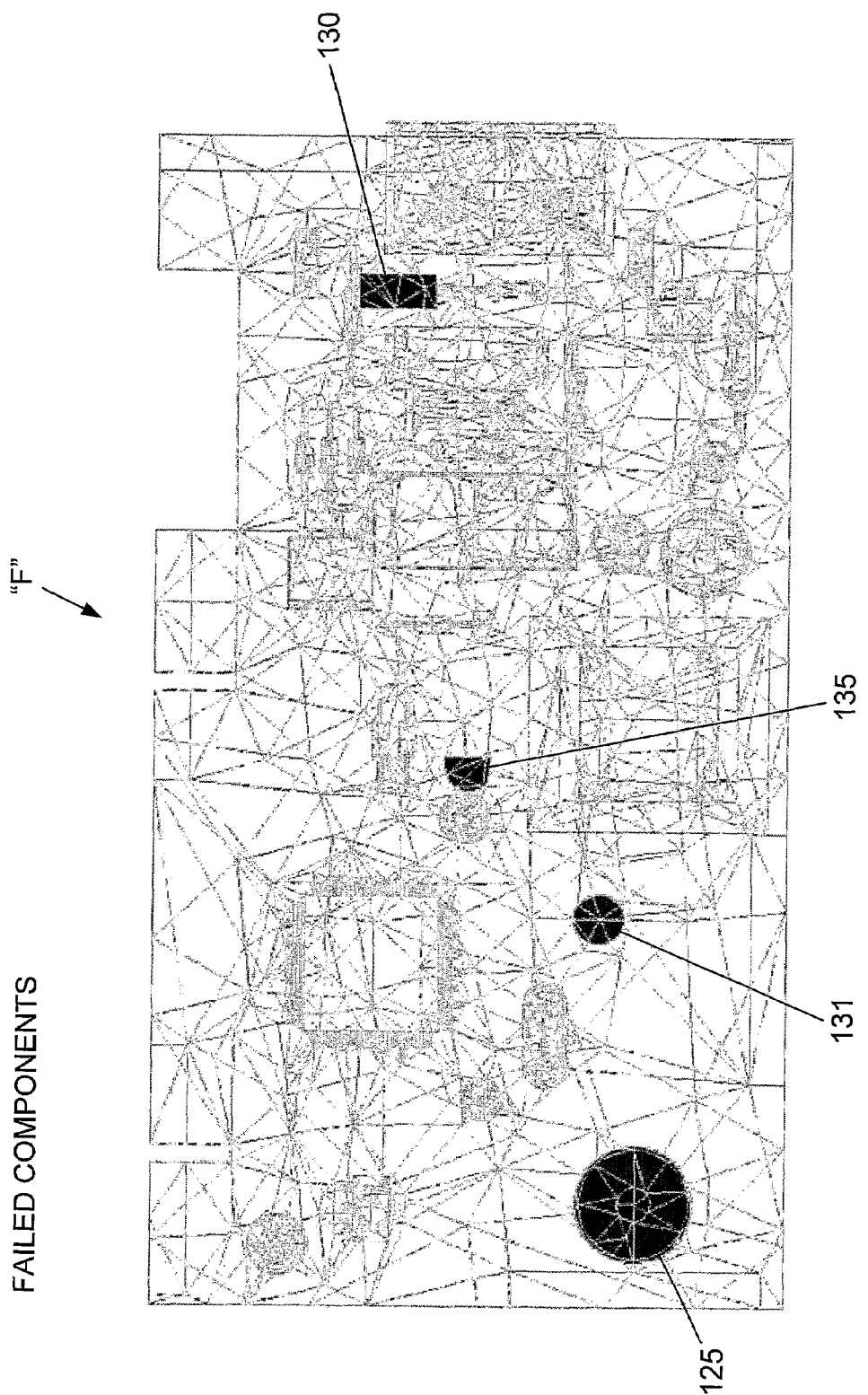
FIG. 29 shows the PCB "F" in a manner summarizing all the failed components of Example 1.

FIG. 29 summarizes and shows all the failed components that were detected by the simulation according to the invention. The figure shows a superposition of the above results relating to components that were detected as having a high Threat Weight.

As said, a HALT laboratory test was also performed on the same PCB. The laboratory HALT test has detected the failure of exactly same four components 125, 130, 131, and 135. This example shows a 100% correlation between the simulation results and the HALT laboratory test results.

EXAMPLE 2

This example compares the results of real HALT tests which were performed on 10 different PCB assemblies, to the results of corresponding simulations according to the invention which were performed on same PCBs. Said PCBs were tested in a HALT laboratory of ECI Ltd., Israel, which is the largest HALT laboratory in Israel, and is the only Israeli HALT laboratory which is accredited by A2LA (American Association for Laboratories Accreditation). The tested PCBs comprised of variety of board types having variety of components. The total number of components in all 10 PCBs was 1488 components. The frequency range for the 6 DOF vibration of the HALT chamber was set to be 0 Hz to 2000 Hz. The report of the HALT laboratory tests indicated a failure which varied from one component per board to 9 components per board. The total number of failed components in the HALT tests of all 10 boards together, was 54 components (out of 1488 components).

A simulation was made on the same 10 PCBs according to the method of the present invention. The simulation range was set to be 0 Hz to 2000 Hz. The analysis results according to the invention indicated failure of 50 out of said 54 components which failed in the HALT laboratory test, i.e., 92.6% of the total number of components which have failed in the tests were detected by the simulation of the present invention. In addition to said 50 components, the simulation has detected 19 additional components (in all 10 PCBs together). In other words, while the HALT tests have detected 54 failed components (3.6% of the total 1588 components) the simulation has detected 69 components (i.e., 4.6% of the total 1588 components). Out of said 50 components detected by the simulation, 11 were detected within a frequency range of 0-500 Hz (i.e., the natural frequency of the mode shape that matched a Mode Shape Type having a high Threat Weight was in this range), 23 components were detected within a frequency range of 500 Hz to 1000 Hz, 12 components were detected within a frequency range of 1000 Hz to 1500 Hz, and 4 more components were detected within a frequency range of 1500 Hz to 2000 Hz. The table of FIG. 30 summarizes the results of the simulation and the comparison to the HALT tests.

As can be seen, based on the simulation results, it would be possible to consider limiting the simulation to a frequency range of 0 Hz to 1500 Hz. Out of 50 components, only 4 were detected within a frequency range of 1500 Hz to 2000 Hz. The use of a range of 0 Hz-2000 Hz provides in this case a relatively minor increase of the sensitivity of the analysis in term of the number of detected components. Reducing the range to 0 Hz to 1200 Hz will further reduce the sensitivity of the solution, yet this may be still considered as an effective range, as in this range 42 out of the 50 components are identified by the simulation. It should also be noted that less than the first 15 natural frequencies were required for the purpose of revealing said failed components in 9 of the 10 PCBs. One PCB required the first 17 natural frequencies. Therefore, one may find it suitable to set up the simulation by defining the first X natural frequencies, rather than by defining a frequency range. However, the default reasonable frequency range of the simulation is 0 Hz to 2000 Hz, which match the frequency range used in the HALT laboratory.

As said, the analysis according to the invention revealed 50 out of the 54 components (altogether within said 10 PCBs) that failed the HALT laboratory tests performed on said 10 PCBs. It should be noted that there is a possibility that the failure of said additional 4 components in the laboratory tests resulted from the fact that said 4 components were damaged during production of their corresponding PCBs, or were damaged during post production events (i.e., during shipping or usage etc). By definition, the purpose of HALT is to detect design faults only. It is a disadvantage of the HALT laboratory tests that production faults or post production damages may cause components failures during the laboratory test. It is an advantage of the invention that such false alarms cannot occur and are eliminated.

As said, the analysis according to the invention revealed additional 19 (in all 10 PCBs together) failed components, (i.e., components which were detected as having high Threat Weight). These 19 components were not detected during the HALT laboratory tests of said 10 PCBs. Indeed, it is expected that the method of the present invention might be, in some cases, more sensitive in term of revealing design weaknesses of more components in comparison to a HALT laboratory test. The reasons for this observation are: (a). The HALT test often leads to components failure due to accumulating fatigue. In this context, the longer the HALT test duration, the more components will fail. However, HALT procedure is, in general, loosely defined. This means that there is no one "right" way to perform HALT in the laboratory (After all, the purpose of the test is to stimulate and force components failure, not to reach a predefined specification). The laboratory HALT, by its nature, cannot have a defined specification. The duration of the test, as well as the GRMS levels of the PSD excitations that are applied by the HALT machine may vary from one laboratory to another and even from one test to another within a same laboratory. Sometimes, the decision of when to terminate the physical test, (e.g. how long should it last and what levels of GRMS should be applied), is derived by time and cost considerations. The more the test continues, the more failed components are expected to be revealed, leading to an improved and more robust design. Therefore, if for example the laboratory tests discussed in Example 2 of said 10 PCBs would have been lasted longer, more components would have probably failed. It is likely that there would be a match between said more components that are expected to be revealed in the physical test and the additional 19 components identified using the analysis according to the present invention. Therefore, the invention is advantageous by being able to reveal threshold components which are close to failure during HALT laboratory test. A laboratory test will miss these components that are revealed in the simulation of the invention. Indeed, HALT laboratory test can predict many expected field failures, but not all of them. The invention is typically more sensitive, and can reveal more design weaknesses in comparison with HALT test results.

It should also be noted that two different HALT machines of two different manufacturers might lead to different laboratory test results. In other words, if running a HALT laboratory test on two different HALT machines, each testing a same design of PCB (i.e., identical twins PCBs)) for an equal test duration and equal levels of GRMS PSD acceleration (for example, 30 minutes at 15 GRMS, followed by 30 minutes at 20 GRMS, followed by 30 minutes at 25 GRMS), the two machines' test results might be different. A HALT machine of one manufacturer may lead to more failed components then the other. One reason for this difference is that although the GRMS levels of the PSD acceleration at the two machines are identical, the PSD value (at $g^2/Hz$) might have different values for different frequency levels, in HALT machines of two different manufacturers. This means that testing said 10 PCBs of Example 2 using a HALT machine of another manufacturer might have lead to more failed components. Again it is likely that there would be a match between said more components and the additional 19 components identified using the analysis according to the invention.

It is still an additional important advantage of the invention that it uses objective measures to reveal failures, while the laboratory test includes "noises" (i.e., inaccuracies and unknowns) which affect the results. The purpose of HALT laboratory test is to identify design weaknesses. HALT laboratory test is not intended to observe the design behavior at specific environmental conditions. HALT test is intended to find the robustness of the design in general, i.e., characteristics of the tested PCB itself. However, a HALT laboratory test uses an indirect approach: it applies an external loading. This applies "noise" to the test conclusions, for example, variations in the loading excitation such as differences between two different HALT machines, which lead to variations in the test results. On the other hand, the simulation according to the inventions is objective because it is based on observing the self properties of the tested product only, and avoiding other, non objective, factors such as those evolving from the test machine characteristics.

The invention attends and answers relevant questions, such as:
(a) Does a component have a local dominant mode of vibration (for example Mode Shape Type 3 as defined in the present invention) within a given spectrum?;
(b) How many local dominant modes of vibration, if any, (i.e. mode shapes indicating a high Threat Weight), a component has within a given spectrum?; or:
(c) Does a component have a local dominant mode of vibration which belongs to the low index group of the natural frequencies of the board? (i.e. the group of the first predetermined number of natural frequencies, e.g., the first 10 natural frequencies, which, in many cases, may be easily excited, and are more dominant).

The laboratory test does not attend and does not answer these questions. The laboratory test provides results; however, it cannot isolate relevant results from "noise" related results. One example, as mentioned, is that the HALT laboratory test indicates failure of components whose weakness relates to a manufacturing fault, rather than to a design fault. Yet another example which emphasizes certain advantages of the present invention is as follows:

EXAMPLE 3

Figure 31:
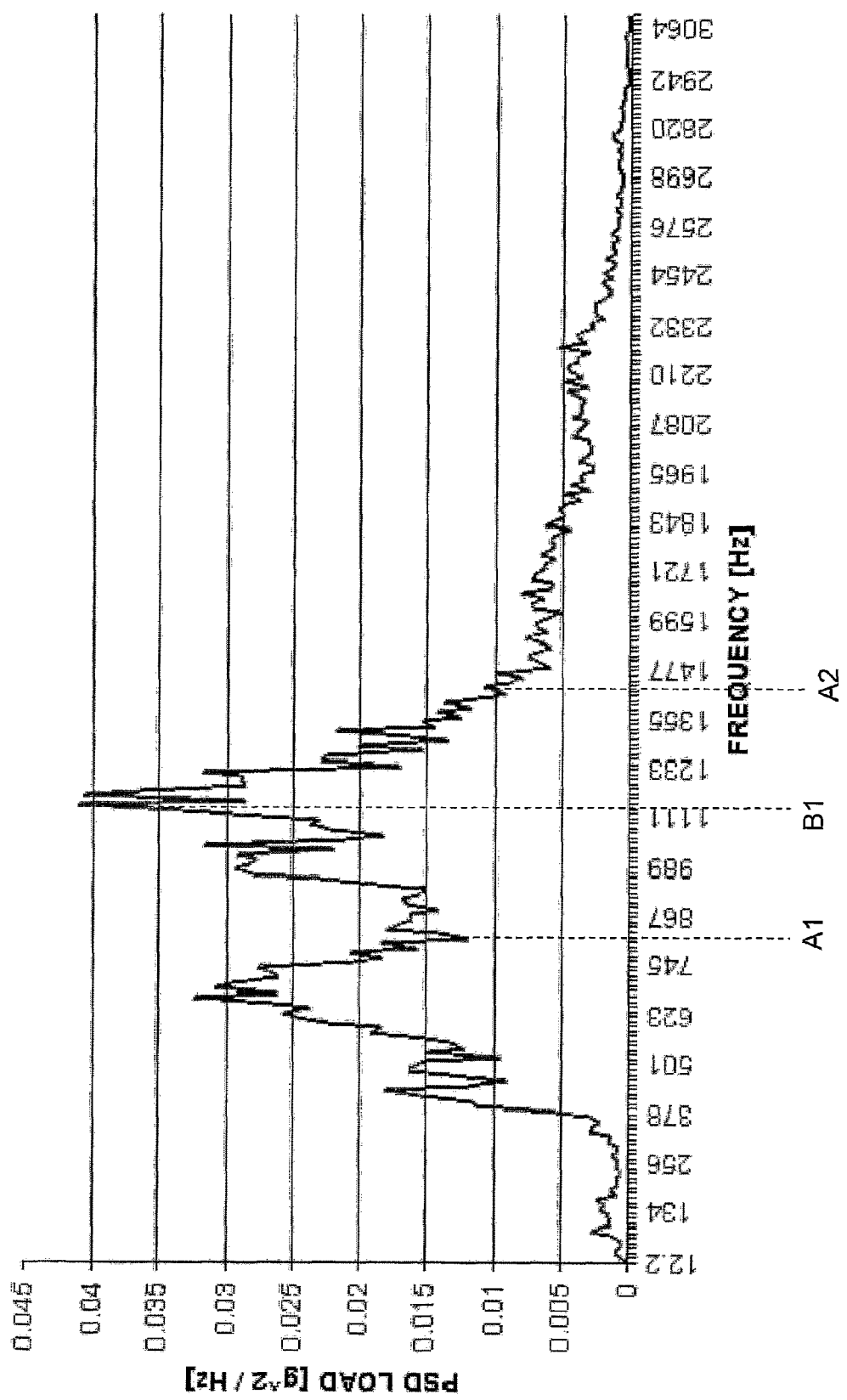
FIG. 31 shows a specific PSD acceleration loading curve of a specific HALT machine.

FIG. 31 shows a typical PSD acceleration loading curve of a specific HALT machine used by a specific HALT laboratory in Israel. This curve is "typical" as it relates to a specific GRMS level. Suppose that a hypothetical PCB assembly is both laboratory tested and analyzed using the method of invention. Suppose that said PCB assembly includes two different components, A and B, each having a different location on the PCB. By analyzing the PCB using the method of the invention in a spectrum range of 0 Hz to 2000 Hz, suppose that the analysis indicates that component A has a Type 4 mode shape, meaning a natural frequency of a pure local oscillation at both A1=803 Hz and A2=1391 Hz.

Yet, suppose that the analysis also indicates that component B has a Type 3 mode shape, meaning a natural frequency of a pure local oscillation at B1=1112 Hz. Therefore, according to the present invention both components have a high Threat Weight indicating a design weakness. However, based on the present invention it is concluded that the Threat Weight for component A having a Mode Shape Type 4 is even higher than the Threat Weight of component B having a Mode Shape Type 3. It is likely that during a HALT laboratory test for a spectrum range of 0 Hz to 2000 Hz at said HALT machine using said typical PSD loading, component B will fail prior to component A, as its resonance frequency happens to be at the pick value of the PSD typical load obtained at this specific said machine. The laboratory team will assume that component B is more vulnerable then component A, but it is not. As the simulation of the invention reveals, component B is more vulnerable. The mechanical structure of HALT machines leads to PSD acceleration which is unavoidably not coherent, but is rather inconsistent and provides different acceleration PSD levels at different frequencies. Moreover, it should be noted that the PSD levels in $g^2/Hz$ of the HALT machine whose curve is shown in FIG. 31, and of many other typical HALT machines as well, are typically extremely low at the low frequency range of 0 Hz to about 400 Hz. Therefore, components that according to the invention are at a high risk as they have a high Threat Weight due to Mode Shape Type 3 or similar which is observed at a relatively low natural frequency, might sometimes be hardly traced or even missed in a HALT test. It can therefore be concluded that the analysis of the invention provides more objective criteria to components failure, and it eliminates "noise" factors. However, for some industry needs or commercial considerations, it is possible to calibrate the analysis of the present invention to be in higher compatibility with a specific HALT machine of a specific manufacturer, (i.e., to be compatible with a specific machine having specific PSD curves). Said calibration may be carried out by somewhat increasing the Threat Weight if the frequency involved in a specific Mode Shape Type happens to be a frequency to which said machine provides a relatively high PSD level of $g^2/Hz$ compared to other frequencies within the relevant frequencies range, and vise versa, by somewhat decreasing the Threat Weight if the frequency involved in a specific Mode Shape Type happens to be a frequency to which said machine provides a relatively low PSD level of $g^2/Hz$ comparing to other frequencies within the relevant frequencies range. It is possible to further enhance said calibration by correlating the Threat Weight level when related to a component with the GRMS level in which said component fails. Alternatively, the calibration may be enhanced by correlating the Threat Weight level when related to a component with the vibrating duration until said component fails. In still another option, the calibration may be correlated to both the GRMS level, and the vibration duration. The higher the Treat Weight related to a component is, the lower the GRMS level in which the component is expected to fail. The higher the Treat Weight related to a component is, the shorter the duration until failure of the component is. On the other hand, if such calibration is avoided, the analysis results may be considered to be more objective, i.e. referring to objective reliability characteristics of the PCB rather than aiming to a specific HALT machine. After all, it is the general purpose of the invention to predict field failure, whether in the context of simulating HALT or other tests, or in the more general context of reliability which may or may not relate to test procedures).

In still another embodiment of the invention, the Threat Weight level when related to a component, may be correlated with the duration until failure, or may be correlated with a vibration acceleration level that causes failure, or with both, without any relation to a specific HALT machine.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A computer implemented method of simulation for identifying those components of a Printed Circuit Board (PCB) assembly that are most expected to suffer from field failure, comprising the steps of:
   a). pre-defining Mode Shape Types and assigning a Threat Weight to each Mode Shape Type;
   b). creating on a computer a computerized model of the PCB assembly from which natural frequencies, and mode shapes of the PCB assembly and its components can be determined;
   c). performing on said computerized PCB assembly model a natural frequencies simulation and determining natural frequencies, and mode shapes of said PCB assembly and its components; and
   d). from said determined natural frequencies and mode shapes, identifying local dominant oscillations of components, wherein each component identified as having a local dominant oscillation in at least one of said determined mode shapes is concluded to have higher probability for field failure compared to the other components of said PCB assembly, and further for each component having a local dominant oscillation, matching between the determined mode shapes and said predefined Mode Shape Types, thereby determining a corresponding Threat Weight for each of said identified components, and wherein a component higher Threat Weight means a shorter duration until a component failure.

2. The method according to claim 1, wherein two or more Mode Shape Types relating to a local dominant oscillation appearing in a same component in more than one natural frequency indicate a higher Threat Weight in comparison to a case when a single Mode Shape Type relating to a local dominant oscillation appears in a same component in only one natural frequency.

3. The method according to claim 1, wherein a Mode Shape Type relating to a dominant pure local oscillation of a component indicates a higher Threat Weight to said component, in comparison to a Mode Shape Type of a dominant local oscillation of same component which is not pure.

4. The method according to claim 1, further comprising one or more of the following limitations:
   a) limiting the frequency range of natural frequencies within the simulation;
   b) limiting the natural frequency simulation to a range of a predetermined number of first natural frequencies; and
   c) limiting the method results to the finding of the first predetermined number of components having a higher probability for field failure compared to the other components on the board.

5. The method according to claim 1, including utilizing the steps of the method to simulate the results of a Highly Accelerated Life Testing (HALT) laboratory test.

6. The method according to claim 5 wherein the utilizing step includes setting parameters employed in the method to resemble a specific HALT machine of a specific manufacturer, for better compatibility with a HALT test performed by said machine.

7. The method according to claim 6 wherein said machine has specific Power Spectral Density (PSD) loading regime curves, and said parameters are obtained by considering a higher threat to components having a dominant local oscillation which happens to be within a frequency spectrum in which said machine provides a higher PSD level of $g^2/Hz$ compared to other frequencies within the relevant frequencies range, and vise versa, by considering a lower threat to components having a dominant local oscillation which happens to be within a frequency spectrum in which said machine provides a lower PSD level of $g^2/Hz$ compared to other frequencies within said relevant frequencies range.

8. The method according to claim 7, further including correlating a Threat Weight level when related to a component with a G Root Mean Square (GRMS) level in which said component fails.

9. The method according to claim 7, further including correlating a Threat Weight level when related to a component with the vibration duration until said component fails.

10. The method according to claim 7, in which the parameters are correlated with both a G Root Mean Square (GRMS) level and a vibration duration.

11. The method according to claim 1, wherein the method is utilized for obtaining via simulation the expected results of a laboratory test, and including finding a design weakness and identifying components of a PCB assembly that are most expected to suffer from field failure relative to other components of the PCB assembly.

12. The method according to claim 1, including utilizing the steps of the method at an early stage of a PCB assembly design, which is earlier than the stage in which a prototype of the PCB assembly is available.

13. The method according to claim 1, including utilizing the method steps as a complementary process to a Highly Accelerated Life Testing (HALT) laboratory test.

14. The method according to claim 1, wherein the created model is a finite element model.

15. The method according to claim 14, wherein the model is a "p element" mesh.

16. The method according to claim 15, wherein the entire mesh is a volume "p element" mesh.

17. The method according to claim 14, wherein a stiffness matrix of said finite element model is updated based on a pre thermal-stress analysis.

18. The method according to claim 1, wherein the creating step includes modeling of the PCB components leads.

19. The method according to claim 18, wherein the creating step includes modeling of the soldering joints.

20. The method according to claim 1, wherein the creating step includes modeling of coatings.

21. The method according to claim 1, wherein the model is a finite element "h" model.

22. The method according to claim 1, wherein the model is a finite differences model.

23. The method according to claim 1, wherein the model is a finite volume model.

24. The method according to claim 1, wherein the model is a boundary element model.

25. The method according to claim 1, wherein the creating step includes creating a detailed model of some components and an approximated model of other components.

26. The method according to claim 1, wherein the determined mode shapes each presents displacement vectors.

27. The method according to claim 26, wherein said displacement vectors are spatial displacement vectors.

28. The method according to claim 26, wherein the determined mode shapes each presents displacement vectors in only one degree of freedom out of available-up to six possible degrees of freedom.

29. The method according to claim 1, wherein the determined mode shapes each defines displacement vectors in only one plane.

30. The method according to claim 1, wherein the determined mode shapes each presents stress vectors.

31. The method according to claim 1, wherein the determined mode shapes each presents strain vectors.

32. The method according to claim 1, wherein the determined mode shapes each presents strain energy vectors.

33. The method according to claim 1, wherein the determined mode shapes each presents available eigenvectors from a natural frequency simulation.

34. The method according to claim 1, wherein the determined mode shapes each presents a vector which is calculated as any mathematical combination of two or more eigenvectors available from a natural frequency simulation.

35. The method according to claim 34, wherein a high probability of field failure of a component is defined by examining two or more of said vectors.

36. The method according to claim 1, wherein the determined mode shapes each presents a vector which is calculated as any mathematical combination of two or more eigenvectors available from a natural frequency simulation.

37. The method according to claim 36, wherein a Threat Weight is defined by examining two or more of said vectors.

38. The method according to claim 1, wherein the creation of the model ignores some of the components.

39. The method according to claim 38, wherein the ignored components are those known as having one or more of the following:
   a) extremely high reliability;
   b) a very small size;
   c) a very light weight;
   d) a center of gravity which is very close to the board surface.

40. The method according to claim 1, wherein the creation of the model approximates some of the components.

41. The method according to claim 40, wherein the ignored components are those known as having one or more of the following:
   a) extremely high reliability;
   b) a very small size;
   c) a very light weight;
   d) a center of gravity which is very close to the board surface.

42. The method according to claim 40, wherein said components are represented by only considering their contribution to the mass of the model.

43. The method according to claim 40, wherein said components are represented by considering their contribution to both the mass of the model and the stiffness of the model.

44. The method according to claim 40, wherein said approximated components are represented by altering properties of the modeling of the board itself.

45. The method according to claim 1, wherein the board of the PCB assembly is modeled using a multi-layer laminate composite plate element.

46. The method according to claim 1, wherein the board of the PCB assembly is modeled using layers of volume elements.

47. The method according to claim 1, wherein the board of the PCB assembly is modeled as a single isotropic layer.

48. The method according to claim 1, wherein thermal aspects are considered.

49. The method according to claim 1, wherein material properties applied to the model are updated based on temperature-related assumptions prior to the step of performing a natural frequencies simulation.

50. The method according to claim 49, wherein the temperature assumptions are based on a thermal mapping obtained from a steady state or transient thermal simulation.

51. The method according to claim 1, wherein said model includes the PCB assembly together with its enclosure.

52. The method according to claim 1, wherein said model includes more than one PCB assembly, together with the PCB assemblies casing.

53. The method according to claim 1 wherein said model includes an entire assembly of electronic boards together with one or more additional parts.

54. The method according to claim 1 wherein some of the components are modeled with their leads and some other components are approximated.

55. The method according to claim 54 wherein said approximation is achieved by modeling said components without modeling their leads.

56. The method according to claim 54 wherein said approximated components are components that based on past experience are known as having a low probability for field failure.

57. The method according to claim 1, wherein a Threat Weight level when related to a component is correlated with a vibration acceleration level that causes failure, without any relation to a specific Highly Accelerated Life Testing (HALT) machine.

58. The method according to claim 1, wherein a Threat Weight level when related to a component is correlated with both a vibration acceleration level that causes failure, and with a duration until failure, without any relation to a specific Highly Accelerated Life Testing (HALT) machine.

* * * * *